US011121903B2

(12) United States Patent
Torbatian et al.

(10) Patent No.: US 11,121,903 B2
(45) **Date of Patent: *Sep. 14, 2021**

(54) DISTRIBUTION MATCHING FOR PROBABILISTIC CONSTELLATION SHAPING WITH AN ARBITRARY INPUT/OUTPUT ALPHABET

(71) Applicant: Infinera Corporation, Sunnyvale, CA (US)

(72) Inventors: Mehdi Torbatian, Ottawa (CA); Deyuan Chan, Kanata (CA); Han Henry Sun, Ottawa (CA); Sandy Thomson, Ottawa (CA); Kuang-Tsan Wu, Ottawa (CA)

(73) Assignee: Infinera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/152,351

(22) Filed: Oct. 4, 2018

(65) Prior Publication Data

US 2019/0149242 A1 May 16, 2019

Related U.S. Application Data

(60) Provisional application No. 62/567,937, filed on Oct. 4, 2017.

(51) Int. Cl.
*H04B 10/61* (2013.01)
*H04L 25/03* (2006.01)
(Continued)

(52) U.S. Cl.
CPC ....... *H04L 27/362* (2013.01); *H04B 10/0779* (2013.01); *H04B 10/5161* (2013.01);
(Continued)

(58) Field of Classification Search
CPC ................ H04B 10/611; H04B 10/612; H04L 25/03286
See application file for complete search history.

(56) References Cited

U.S. PATENT DOCUMENTS

2016/0323091 A1* 11/2016 Inoue ...................... H04L 27/38
2019/0089466 A1* 3/2019 Li ...................... H04B 10/5161

OTHER PUBLICATIONS

Böcherer et al., "Fast Probabilistic Shaping Implementation for Long-Haul Fiber-Optic Communication Systems," 2017 European Conference on Optical Communication (ECOC), Gothenburg, Sep. 17-21, 2017, pp. 1-3.; http://ieeexplore.ieee.org/stamp/stamp.jsp?tp=&arnumber=8346147&isnumber=8345823 (Year: 2017).*

* cited by examiner

*Primary Examiner* — Nathan M Cors
(74) *Attorney, Agent, or Firm* — David L. Soltz

(57) ABSTRACT

Consistent with the present disclosure, an encoder circuit is provided at a transmit side of an optical fiber link that maps an input sequence of bits of fixed length k a sequence of symbols of a codeword of length n, such that the symbols of the codeword define a predetermined transmission probability distribution. Preferably, each symbol of the codeword is generated during a corresponding clock cycle, such that after n clock cycles, a complete codeword corresponding to the input bit sequence is output. On a receive end of the link, a decoder is provided that outputs the k-bit sequence every n clock cycles. Accordingly, buffers need not be provided at the output of the encoder and the input of the decoder, such that processing of the input sequence, codewords, and output sequence may be achieved efficiently without large buffers and complicated circuitry. Moreover, the input sequence, with any binary alphabet may be matched to a desired output distribution with any arbitrary alphabet. Accordingly, probabilistic constellation shaping may be achieved over constel-
(Continued)

lations of arbitrary size. In addition, relatively long codewords, may be encoded and decoded with the apparatus and method disclosed herein. Accordingly, for a fixed SNR a higher SE (more bits per symbol) can be achieved. Alternatively, for a fixed SE, a lower SNR may be sufficient. Moreover, the resulting SE may be finely tailored to a particular optical link SNR to provide data transmission rates that are higher than the low order modulation formats that would otherwise be employed for optical signals carried by such links.

33 Claims, 43 Drawing Sheets

(51) Int. Cl.
*H04L 27/36* (2006.01)
*H04L 25/06* (2006.01)
*H04L 1/00* (2006.01)
*H04L 27/34* (2006.01)
*H04L 25/49* (2006.01)
*H04B 10/54* (2013.01)
*H04B 10/516* (2013.01)
*H04B 10/077* (2013.01)
*H04J 14/02* (2006.01)

(52) U.S. Cl.
CPC ........ *H04B 10/541* (2013.01); *H04J 14/0205* (2013.01); *H04J 14/0226* (2013.01); *H04L 1/005* (2013.01); *H04L 1/0041* (2013.01); *H04L 1/0042* (2013.01); *H04L 1/0057* (2013.01); *H04L 25/067* (2013.01); *H04L 25/49* (2013.01); *H04L 27/3433* (2013.01); *H04L 2025/03611* (2013.01)

Fig. 10

| Input Bit sequence | 000 | 001 | 010 | 011 | 100 | 101 | 110 | 111 |
|---|---|---|---|---|---|---|---|---|
| Codewords | 00111 | 01011 | 01101 | 01110 | 10101 | 10110 | 11001 | 11010 |

1000

1100

1500

2400

| Clock | B1 Finalized Bits | B2 Latest "0" bit, nb | B3 Run of "1"s of length rl | B4 w+1 ("x") | B5 Carry Bit | B6 eBits |
|---|---|---|---|---|---|---|
| t1 | | | | 6 | 0 | 00 |
| t2 | | 0 | | 12 | 0 | 00 |
| t3 | | 0 | 1 | 14 | 1 | 01 |
| t4 | 101 | | | 10 | 1 | 11 |
| t5 | 101 | | | 0 | 1 | 1 |

Fig. 28

| Input bit sequence | Codeword |
|---|---|
| 11111 | 210100 |
| 11110 | 210001 |
| 11101 | 201010 |
| 11100 | 200110 |
| 11011 | 200011 |
| 11010 | 120100 |
| 11001 | 120001 |
| 11000 | 112000 |
| 10111 | 110020 |
| 10110 | 102100 |
| 10101 | 102001 |
| 10100 | 101020 |
| 10011 | 100210 |
| 10010 | 100120 |
| 10001 | 100021 |
| 10000 | 100012 |
| 01111 | 021010 |
| 01110 | 020110 |
| 01101 | 020011 |
| 01100 | 012010 |
| 01011 | 011200 |
| 01010 | 011002 |
| 01001 | 010201 |
| 01000 | 010120 |
| 00111 | 010021 |
| 00110 | 002110 |
| 00101 | 002011 |
| 00100 | 001201 |
| 00011 | 001102 |
| 00010 | 001012 |
| 00001 | 000121 |
| 00000 | 000112 |

Fig. 34

DISTRIBUTION MATCHING FOR PROBABILISTIC CONSTELLATION SHAPING WITH AN ARBITRARY INPUT/OUTPUT ALPHABET

This application claims priority under 35 U.S.C. § 119 to U.S. Provisional Patent Application No. 62/567,937, filed on Oct. 4, 2017, the entire content of which is incorporated by reference herein in its entirety.

Optical communication systems are known in which data is carried over amplitude/phase modulated optical signals that are transmitted along an optical fiber link to a receiver node. Such optical signals may be transmitted in accordance with a variety of standard modulation formats using polarization multiplexing (also known as dual polarization), such as binary phase shift keying (BPSK), 3-quadrature amplitude modulation (3-QAM), quadrature phase shift keying (QPSK, or 4-QAM), 8-QAM, 16-QAM, 32-QAM, and 64-QAM, with fixed spectral efficiency (SE) of 2, 3, 4, 6, 8, 10, and 12 b/dual-pol-symbol, respectively. These modulation formats are uniformly distributed, such that transmission of each symbol, each of which having a corresponding constellation point, is equally probable. Put another way, the probability of any signal point of the constellation or constellation point is the same as the probability of occurrence of any other signal point of the constellation.

For communication systems in which symbols are transmitted in accordance with uniform discrete signal constellations, the required signal power to noise power ratio (SNR) for error free communication is normally away from the Shannon limit regardless of the strength of the employed forward error correction (FEC). This gain loss, which increases at higher spectral efficiency, reaches to up to 1.53 dB for a n-dimensional (n-D) cube constellations, which are square constellations expanded over n complex dimensions, as n goes to infinity.

Optical signals or channels may be transmitted along optical fiber that constitute at least part of an optical communication path. The noise associated with such path has been determined in many instances to be Gaussian in nature, and such noise has been termed additive white Gaussian noise (AWGN) in a linear power limited regime. Optimal capacity for optical signals propagating in an AWGN channel has been achieved with Gaussian probability distributions in which transmission probability of symbols (and their corresponding constellation points) correspond to a Gaussian distribution. Such Gaussian probability distributions are not uniform and are therefore different from the uniform distribution that normally exists on the standard modulation formats noted above.

For a given optical fiber path distance and at a desired SNR margin from the forward error correction (FEC) threshold, there is an optimal SE for which the transmission rate is maximized. Typically, however, such optimal SE cannot be achieved with the standard modulation formats noted above, because the fixed SEs with coarse granularities associated with such modulation formats may either be too high or too low for the link. Thus, the deployed transmission data rate on the link is normally less than what the link ideally can carry.

An alternative approach to minimize the gain loss due to non-ideal input distribution is referred to as constellation shaping. In constellation shaping, the signal space is encoded such that the distribution of the projection of the n-D constellation on each of the real and the imaginary dimensions of the constellation follows a desired probability distribution, which may be Gaussian. In probabilistic constellation shaping, the input information data bits are encoded such that when they are mapped to a specific 2-D constellation, the probability of occurrence of each of the constellation points follows a desired probability distribution. In other words, unlike standard modulation formats, in which symbols associated with each constellation point are transmitted with equal probability, in probabilistic shaping, certain symbols associated with particular constellation points are transmitted more frequently, i.e., have a higher likelihood or probability of transmission, compared to other symbols corresponding to other constellation points. It has been shown that probabilistic constellation shaping may be able to recover the shaping gain that is lost when standard uniform modulation formats are deployed.

A given spectral efficiency (SE) may be associated with a specific probability distribution for a corresponding constellation. Thus, different SEs may be obtained by changing the probability distribution. This is equivalent to designing a single circuit to accommodate many different modulation formats to approximate the Shannon capacity limit for a given link. Thus, in addition to improved SNR gain, probabilistic constellation shaping provides a mechanism to finely tune the SE to maximize the transmission data rate over a communication link at a fixed desired SNR margin.

Current probabilistic constellation shaping schemes include: JPEG based arithmetic coding, constant composition distribution matching (CCDM), enumerative coding, and m-out-of-n coding. In each such techniques an incoming bit stream is encoded into a codeword indicative of the transmission probability distribution. Each of these techniques, however, suffer from the disadvantages described below.

Arithmetic coding, which is a loss-less source entropy coding approach widely used in different image/video coding standards such as JPEG, has been considered for probabilistic shaping encoding and decoding. Such arithmetic coding, however, is not based on fixed-to-fixed encoding/decoding. That is, different input bit sequences of fixed length may be mapped to different unique codewords of possibly different length. In addition to increasing the complexity in buffer handing, using basic arithmetic compression/decompression for such implementations may cause significant error propagation, which is not limited to a maximum fixed number of information bits.

CCDM is a variant of the arithmetic coding approach which has been specifically designed for constellation shaping. This algorithm guarantees a fixed-to-fixed mapping between input bit sequences and output codewords. However, CCDM is not a practical solution as it is a floating-point scheme, which requires infinite bit precision to create the one-to-one mapping between input bit sequences and the codewords of the desired distribution. Such infinite bit precision requires complex computing of the codewords and excessively large buffers, and, therefore, CCDM is impractical.

Enumerative coding represents a simple index coding algorithm for lossless entropy coding of information sources. Unlike arithmetic coding, enumerative coding provides a fixed-to-fixed encoding/decoding approach for probabilistic shaping. Further, unlike CCDM, it is a fixed-point algorithm. However, the amount of memory required to store the necessary lookup tables is excessive and dramatically increases with the alphabet size of the output codewords. This restricts usage of the enumerative coding technique to small size constellations with very limited number of amplitude levels at each dimension.

m-out-of-n code is an alternative solution which deploys the arithmetic coding ideas to create the one-to-one mapping between input binary sequences of length k and output binary sequences of length n and hamming weight m. It provides a fixed-to-fixed encoding/decoding approach which implements the distribution matching between binary sources and binary codewords in a fixed-point precision fashion. The output alphabet of the codebook is restricted to {0,1}, however, which limits the application of the algorithm to constellations with only 2 amplitude levels.

SUMMARY

Consistent with the present disclosure, a distribution mapping (DM) or probabilistic shaping method and related apparatus are provided which may provide the benefits without the disadvantages noted above. As opposed to the arithmetic coding technique, a one-to-one mapping may be employed between input information bit sequences and the output codewords in a fixed-to-fixed fashion. Unlike CCDM, however, the fixed-point precision format of the algorithm is presented. Moreover, unlike the m-out-of-n codes and enumerative coding techniques, output codebooks with an arbitrarily large alphabet size may be supported.

Consistent with an additional aspect of the present disclosure, an apparatus is provided that includes an encoder circuit that receives an input data sequence, the input data sequence including k bits, where k is an integer, the encoder circuit outputting a codeword, based on the input data sequence and fixed-point representations of the input data sequence, the codeword including n codeword symbols. The apparatus also includes a clock circuit that generates a clock signal having a plurality of clock cycles, each of the n codeword symbols being output from the encoder circuit during a respective one of the plurality of clock cycles. A laser is also provided, as well as a modulator that receives light from the laser. In addition, a drive circuit is provided that supplies a drive signal, based on the codeword, to the modulator. The modulator supplies a modulated optical signal based on the drive signal, and the modulated optical signal carries modulation symbols based on the codeword. The modulated optical signal being modulated in accordance with an m-quadrature amplitude modulation, where m is greater than or equal to 16. The codeword is indicative of a distribution of the modulation symbols, wherein first ones of the modulation symbols having an associated first amplitude are transmitted more frequently than second ones of the modulation symbols having an associated second amplitude that is different than the first amplitude.

Consistent with a further aspect of the present disclosure, an apparatus is provided that includes a local oscillator laser that supplies local oscillator light, and an optical hybrid circuit that receives an incoming optical signal modulated in accordance with an m-quadrature modulated optical signal (QAM), where m is greater than or equal to 16, and the local oscillator light. A photodetector circuit is provided a photodetector circuit that receives an optical output from the optical hybrid circuit and generates electrical signals. In addition, the apparatus includes a decoder circuit that receives a plurality of codewords based on the electrical signals. Each of the plurality of codewords includes n codeword symbols, where n is an integer, wherein the codeword is indicative of a distribution of modulation symbols of an optical signal such that first ones of the modulation symbols having an associated first amplitude are transmitted more frequently than second ones of the modulation symbols having an associated second amplitude that is different than the first amplitude. A clock circuit is also provided that generates a clock signal, wherein the decoder circuit outputs, during each of a corresponding one of a plurality of time periods, each of a plurality of data sequences based on a respective one of fixed-point representations of the plurality of codewords. Each of the time periods having a duration of n clock cycles of the clock signals, and each of the data sequences having k bits, where k is an integer.

Consistent with a further aspect of the present disclosure, a binary input distribution may be matched to the desired output distribution with any arbitrary alphabet. Accordingly, probabilistic constellation shaping may be achieved over constellations of arbitrary size, including constellations m-QAM modulation formats, where m is greater than or equal to 16, e.g., 16 QAM, 64 QAM and 256 QAM modulation formats. For example, each symbol of the codeword may have values other than "0" or "1". Accordingly, since each codeword symbol may correspond to a particular amplitude of a point in a constellation, probability distributions for constellation having more than two amplitudes may be represented by codewords consistent with the present disclosure. Thus, as noted above, codewords for encoding amplitudes for any m-QAM constellations may be realized, where m is an integer, such as 16, 64, and 256.

In addition, encoding, consistent with the present disclosure, may be carried out on a symbol-by-symbol basis in which at each time instance or clock cycle one encoded symbol is generated. Accordingly, a buffer is not required at the output of the encoder to store encoded symbols.

Moreover, decoding, consistent with the present disclosure, may be carried out on a symbol-by-symbol basis in which at each time instance or clock cycle one encoded symbol is processed. As a result, a buffer is not required at the input of the decoder to store encoded symbols.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

FIG. 10 illustrates a table that lists examples of input bit sequences and corresponding codewords consistent with a further aspect of the present disclosure;

FIG. 28 illustrates contends of buffers at various steps of the method shown in FIGS. 27*a*-27*c;*

FIG. 34 shows a table that lists input bit sequences and corresponding codewords consistent with an aspect of the present disclosure;

DESCRIPTION OF THE EMBODIMENTS

Consistent with the present disclosure, an encoder circuit is provided at a transmit side of an optical fiber link that maps an input sequence of bits of fixed length k to a sequence of symbols of a codeword of length n, such that the symbols of the codeword define a predetermined transmission probability distribution. Preferably, a fixed-point precision process in which, based on a fixed-point representation of the input bit sequence, each symbol of the codeword is generated during a corresponding clock cycle, such that after n clock cycles, a complete codeword corresponding to the input bit sequence is output. On a receive end of the link, a decoder is provided that outputs the k-bit sequence every n clock cycles based on a fixed-point representation of the codeword. Accordingly, buffers need not be provided at the output of the encoder and the input of the decoder, such that processing of the input sequence, codewords, and output sequence may be achieved efficiently without large buffers and complicated circuitry. Moreover, the input sequence, with any binary alphabet may be matched to a desired output distribution with any arbitrary alphabet. Accordingly, probabilistic constellation shaping may be achieved over constellations of arbitrary size.

In addition, relatively long codewords, may be encoded and decoded with the apparatus and method disclosed herein. Accordingly, for a fixed SNR a higher SE (more bits per symbol) can be achieved. Alternatively, for a fixed SE, error free or substantially error-free communication on a link may be provided at the lower required SNR. Moreover, the resulting SE may be finely tailored to a particular optical link SNR to provide data transmission rates that are higher than the lower order modulation formats that would otherwise be employed for optical signals carried by such links.

Reference will now be made in detail to the present exemplary embodiments of the present disclosure, which are illustrated in the accompanying drawings. Wherever possible, the same reference numbers will be used throughout the drawings to refer to the same or like parts.

The present disclosure is organized as follows: Section 1—Description of an optical communication system incorporating and encoder and decoder consistent with the present disclosure; Section 2—Encoding Input Bit Sequences to Generate Codewords; and Section 3—Decoding Codewords to Generate and Output Bit Sequence.

Figure 1:
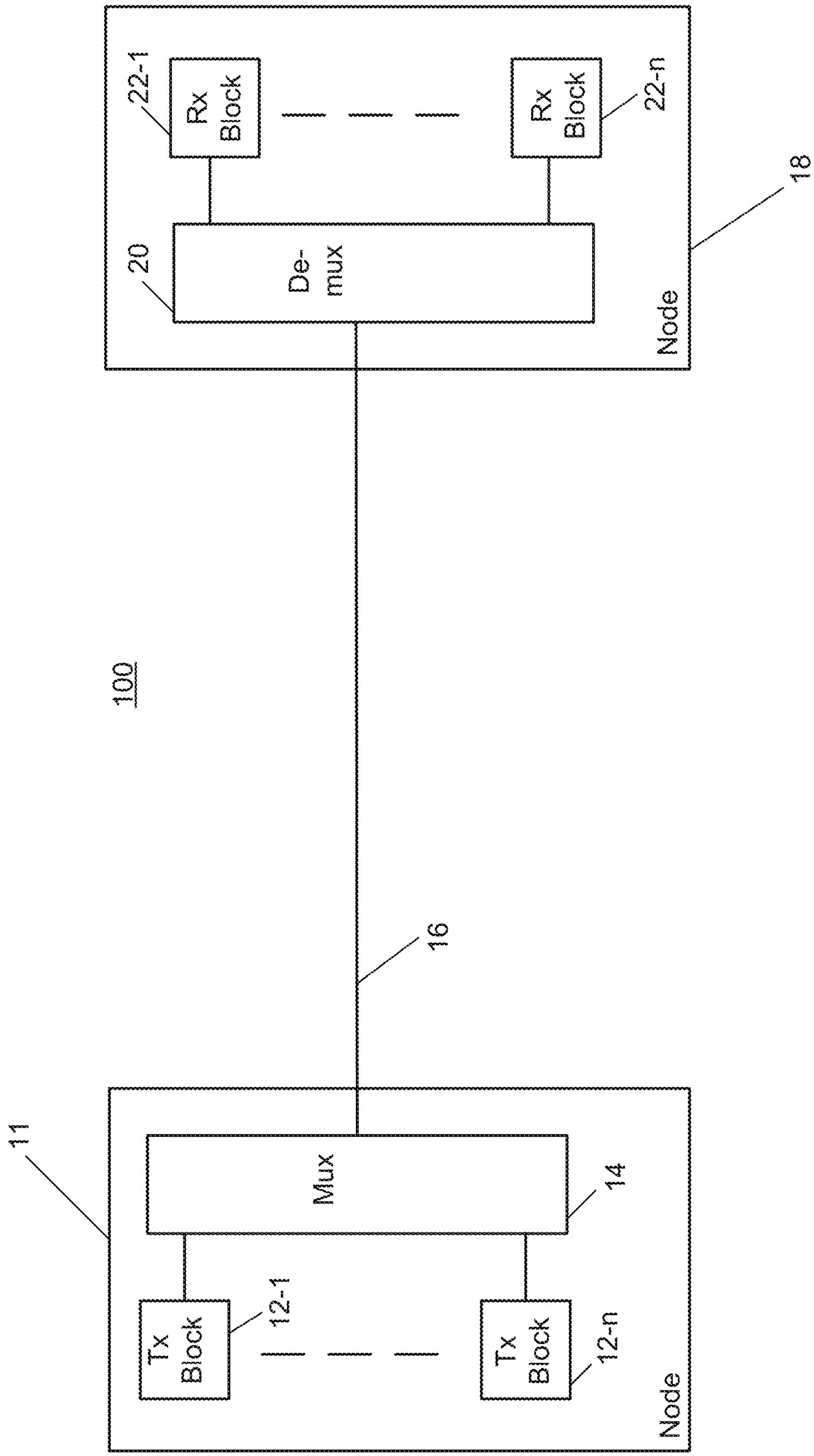
FIG. 1 illustrates a block diagram of an optical communication system consistent with an aspect of the present disclosure.

Section 1—Description of an Optical Communication System Incorporating and Encoder and Decoder Consistent with the Present Disclosure FIG. 1 illustrates an optical link of optical communication system 100 consistent with an aspect of the present disclosure. Optical communication system 100 includes a plurality of transmitter blocks (Tx Block) 12-1 to 12-*n* provided in a transmit node 11. Each of transmitter blocks 12-1 to 12-*n* receives a corresponding one of a plurality of data or information streams Data-1 to Data-n, and, in response to a respective one of these data streams, each of transmitter blocks 12-1 to 12-*n* may output a group of optical signals or channels to a combiner or multiplexer 14. Each optical signal carries an information stream or data corresponding to each of data streams or input sequences Data-1 to Data-n. Multiplexer 14, which may include one or more optical filters, for example, combines each of group of optical signals onto optical communication path 16. Optical communication path 16 may include one or more segments of optical fiber and optical amplifiers, for example, to optically amplify or boost the power of the transmitted optical signals.

As further shown in FIG. 1, a receive node 18 is provided that includes an optical combiner or demultiplexer 20, which may include one or more optical filters, for example, optical demultiplexer 20 supplies each group of received optical signals to a corresponding one of receiver blocks (Rx Blocks) 22-1 to 22-*n*. Each of receiver blocks 22-1 to 22-*n*, in turn, supplies a corresponding copy of data or information streams Data-1 to Data-n in response to the optical signals.

It is understood that each of transmitter blocks 12-1 to **12-*n* has the same or similar structure and each of receiver blocks 22-1 to 22-*n*** has the same or similar structure.

Figure 2:
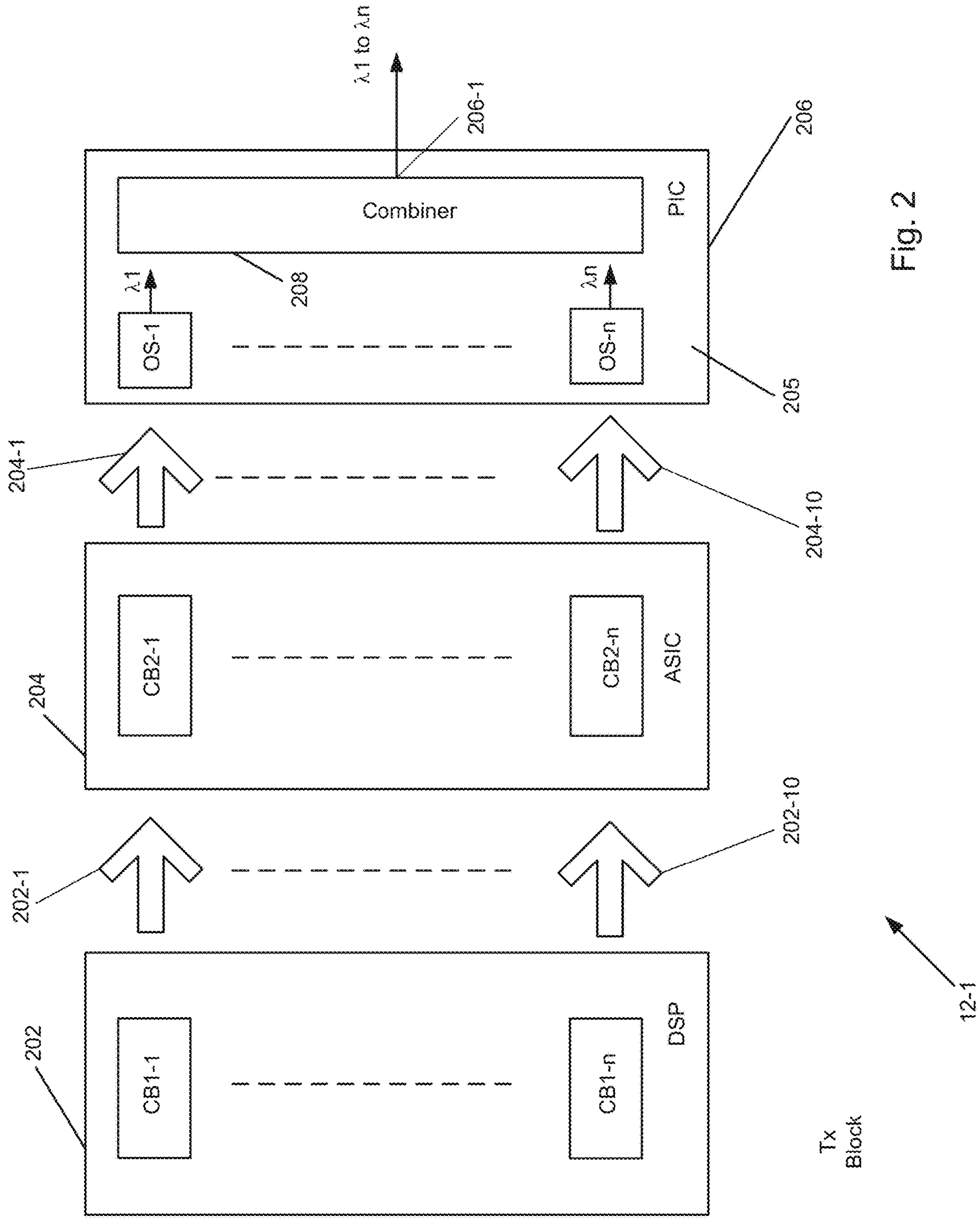
FIG. 2 illustrates a diagram of a transmit block, including a transmission circuit, consistent with an additional aspect of the present disclosure.

FIG. 2 illustrates one of transmitter blocks 12-1 in greater detail. Transmitter block 12-1 may include a digital signal processor (DSP) 202 including circuitry or circuit blocks CB1-1 to CB**1-*n*, each of which receiving, for example, a corresponding portion of Data-1 and supplying a corresponding one of outputs or electrical signals 202-1 to 202-*n* to a circuit, such as application specific integrated circuit (ASIC) 204. ASIC 204 include circuit blocks CB2-1 to CB2-*n*, which supply corresponding outputs or electrical signals 204-1 to 204-*n* to optical sources or transmitters OS-1 to OS-2 provided on transmit photonic integrated circuit (PIC) 205. As further shown in FIG. 2, each of optical sources OS-1 to OS-2 supplies a corresponding one of modulated optical signals having wavelengths λ1 to λ10, respectively. The optical signals are combined by an optical combiner or multiplexer, such as arrayed waveguide grating (AWG) or power combiner 208, for example, and combined into a band or group of optical signals supplied by output 206-1. Optical sources OS-1 to OS-n and multiplexer 208 may be provided on substrate 205, for example. Substrate 205 may include indium phosphide or other semiconductor materials. It is understood, that optical sources OS-1 to OS-n, as well as multiplexer 208, may be provided as discrete components, as opposed to being integrated onto substrate 205 as PIC 206. Alternatively, selected components may be provided on a first substrate while others may be provided on one or more additional substrates in a hybrid scheme in which the components are neither integrated onto one substrate nor provided as discrete devices. In addition, components and/or devices in each of circuit blocks CB1, CB2, and optical sources OS and combiner 208** may be integrated with one or more of such components and/or devices or may be provided as discrete devices or components.

DSP and ASIC 202 may collectively constitute a transmission circuit that supplies drive signals (electrical signals) to the modulators in optical source OS-1 as well as the remaining optical sources.

Figure 3:
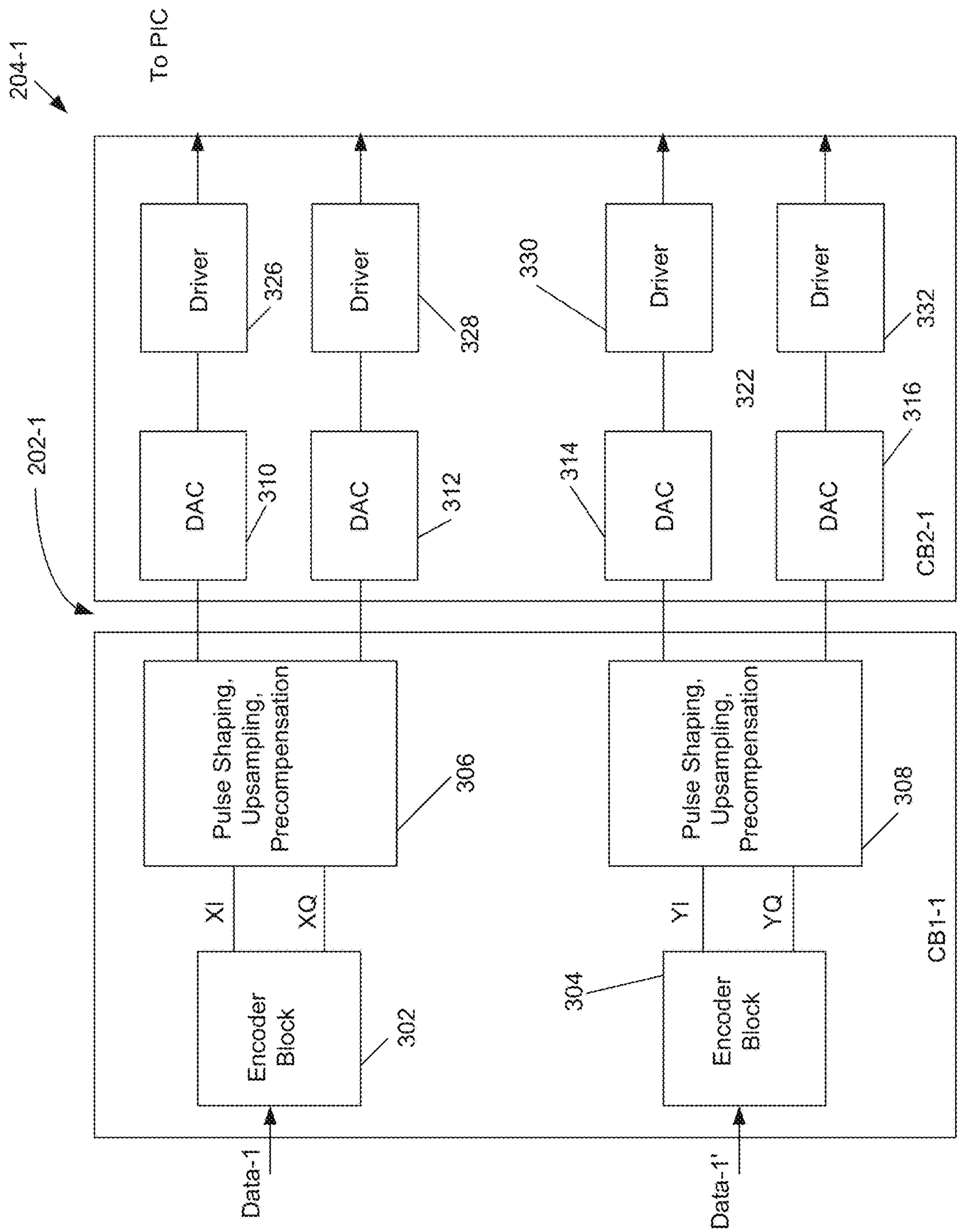
FIG. 3 illustrates features of a digital signal processor and application specific integrated circuit consistent with an aspect of the present disclosure.

FIG. 3 illustrates a portion of transmission circuit 1, namely, circuit block CB1-1 of DSP 202 in greater detail. Circuit block CB-1 includes an encoder block 302 that supplies in-phase (XI) and quadrature (XQ) symbols for modulating the X (or transverse electric—TE) polarization of the transmitted optical signal.

Figure 4A:
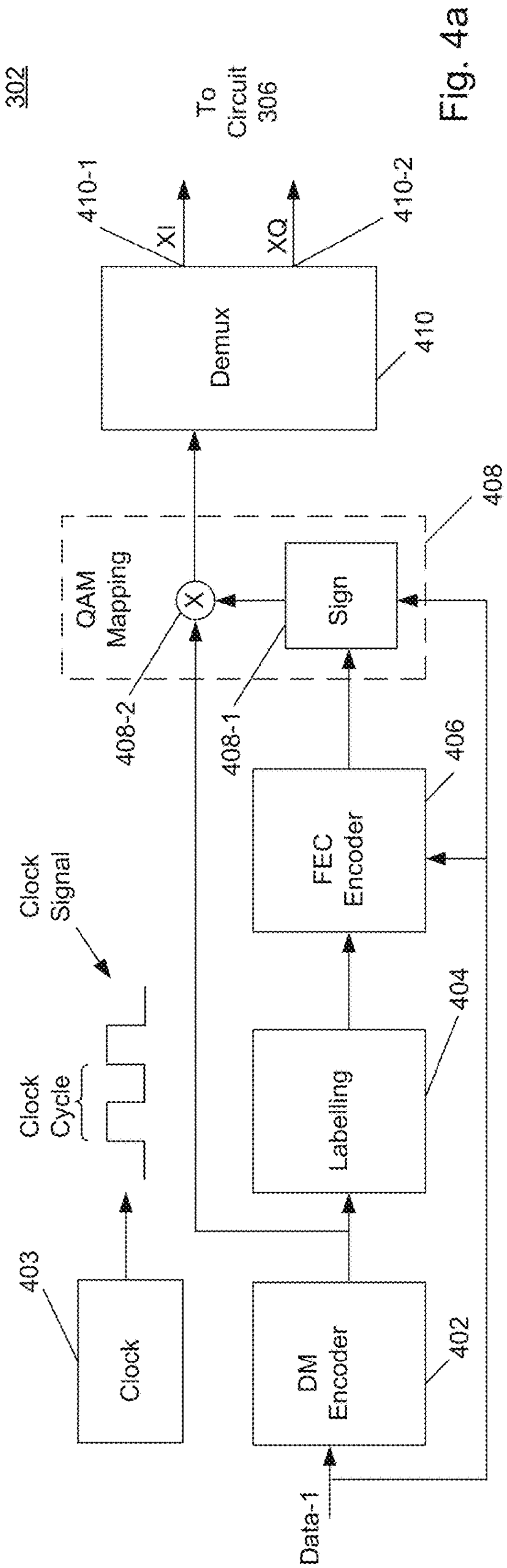
FIGS. 4*a* and 4*b* illustrate features of an encoder circuit consistent with a further aspect of the present disclosure.
Figure 4B:
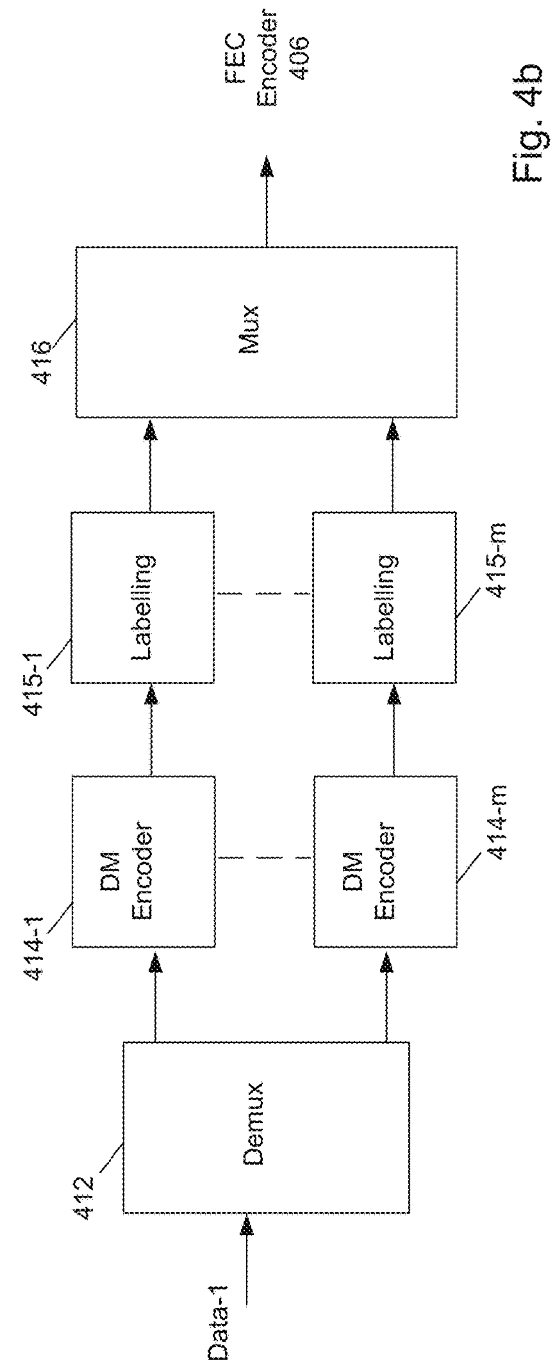

Encoder block 302 is shown in greater detail in FIG. **4*a*. As shown in FIG. 4*a*, Encoder block 302 include distribution matching (DM) encoder 402 that may receive input bit sequences Data-1, each having a length of k-bits, and supply codewords, each having n symbols, to a labelling circuit 404. Each symbol of the codeword corresponds to an amplitude of a constellation point of a transmitted symbol on the real or imaginary axes (I or Q signal components). As discussed in greater detail below, DM encoder 402 outputs a codeword symbol during each clock cycle of the clock signal output from clock circuit 403, such that a codeword is output from DM encoder 402 after n clock cycles based on fixed-point operations or fixed-point representations of the input data sequence. Labelling circuit 404 assigns each symbol of the codeword a unique binary label suitable for Gray coding the label may also be non-binary. The binary or non-binary labels are next supplied to a forward error correction encoder circuit 406, which provides encoded symbols based on the received labels and the input data sequence. The encoded symbols are next fed to a quadrature amplitude modulation (QAM) mapper circuit 408, which includes a sign circuit 408-1 and a multiplier 408-2. Sign circuit 408-1 determines a sign of the I and Q symbols for identifying a particular quadrant of the constellation in which a point associated with a particular transmitted symbol is located. Such location is determined based on the received encoded symbols and input sequence. The sign information output from sign circuit 408-1 is provided to multiplier 408-2, which multiplies each symbol of each codeword by the sign information to generate, in one example, a stream of alternating in-phase and quadrature symbols. Demultiplexer 410 receives the stream of in-phase and quadrature symbols and supplies the in-phase symbols (XI) at a first output 410-1 and the quadrature symbols (XQ) at a second output 410-2**.

It is noted that encoder block 304 shown in FIG. 3 has the same or similar structure as encoder 302 but provides in-phase (YI) and quadrature (YQ) symbols for modulating the Y (or transverse magnetic—TM) component of the transmitted optical signal.

FIG. **4*b* shows an alternative implementation of a DM encoder having a parallel structure. Here the input sequence is supplied to a demultiplexer 412 which supplies input data segments to each of DM encoder 414-1 to 414-*m* having the same or similar structure as DM encoder 402. Each of DM encoder 414-1 to 414-*m* may output a separate codeword, for example, to a corresponding one of labelling circuits 415-1 to 415-*m*, which in turn, supply labels to multiplexer 416. Multiplexer 416 may multiplex the labels associated with each codeword, which may be subject to the processing noted above with respect to FIG. 4*a* to generate symbols XI, XQ, YI, and YQ. The circuitry shown in FIG. 4*a*** may be employed to calculate relatively long codewords of arbitrary length and including arbitrary alphabets, such as codewords having a length approximately equal to a thousand symbols, in one example.

Returning to FIG. 3, outputs XI and XQ are provided to pulse shaping, upsampling, and precompensation circuitry 306, which in turn, supplies outputs to digital to analog converters (DACs) 310 and 312. Similarly, outputs Yi and YQ are provided to pulse shaping, upsampling, and precompensation circuitry 308, which similarly supplies outputs to DACs 314 and 316.

As further shown in FIG. 3, DACs 310/312 and 314/316 output corresponding analog signals, which are filtered by low-pass or roofing filters (not shown) to thereby remove, block or substantially attenuate higher frequency components in these analog signals. Such high frequency components or harmonics are associated with sampling performed by DACs 310/312, 314/316 and are attributable to known "aliasing." The filtered analog signals may next be fed to corresponding driver circuits 326/328 and 332/330, which supply modulator driver signals that have a desired current and/or voltage for driving modulators present in PIC 206 (or provided as discrete devices) to provide modulated optical signals having the symbol probability distributions noted above.

Optical source OS-1 on PIC 206 will next be described with reference to FIG. 5. It is understood that remaining optical sources OS-1 to OS-n have the same or similar structure as optical source OS-1.

Optical source OS-1 may be provided on substrate 205 and may include a laser 508, such as a distributed feedback laser (DFB) that supplies light to at least four (4) modulators 506, 512, 526 and 530. DFB 508 may output continuous wave (CW) light at wavelength λ1 to a dual output splitter or coupler 510 (e.g. a 3 db coupler) having an input port and first and second output ports. Typically, the waveguides used to connect the various components of optical source OS-1 may be polarization dependent. A first output 510*a* of coupler 510 supplies the CW light to first branching unit 511 and the second output 510*b* supplies the CW light to second branching unit 513. A first output 511*a* of branching unit 511 is coupled to modulator 506 and a second output 511*b* is coupled to modulator 512. Similarly, first output 513*a* is coupled to modulator 526 and second output 513*b* is coupled to modulator 530. Modulators 506, 512, 526 and 530 may be, for example, Mach Zehnder (MZ) modulators. Each of the MZ modulators receives CW light from DFB 508 and splits the light between two (2) arms or paths. An applied electric field in one or both paths of a MZ modulator creates a change in the refractive index to induce phase and/or amplitude modulation to light passing through the modulator. Each of the MZ modulators 506, 512, 526 and 530, which collectively can constitute a nested modulator, are driven with data signals or drive signals supplied via driver circuits 326, 328, 330, and 332, respectively. The CW light supplied to MZ modulator 506 via DFB 508 and branching unit 511 is modulated in accordance with the drive signal supplied by driver circuit 326. The modulated optical signal from MZ modulator 506 is supplied to first input 515*a* of branching unit 515. Similarly, driver circuit 328 supplies further drive signals for driving MZ modulator 512. The CW light supplied to MZ modulator 512 via DFB 508 and branching unit 511 is modulated in accordance with the drive signal supplied by driver circuit 328. The modulated optical signal from MZ modulator 512 is supplied to phase shifter 514 which shifts the phase of the signal 90° (π/2) to generate one of an in-phase (I) or quadrature (Q) components, which is supplied to second input 515*b* of branching unit 515. The modulated data signals from MZ modulator 506, which include the remaining one of the I and Q components, and the modulated data signals from MZ modulator 512, are supplied to polarization beam combiner (PBC) 538 via branching unit 515.

Modulators 506, 512, 526, and 530 may be individually or collectively referred to here in as a "modulator".

Modulator driver 330 supplies a third drive signal for driving MZ modulator 526. MZ modulator 526, in turn, outputs a modulated optical signal as either the I component or the Q component. A polarization rotator 524 may optionally be disposed between coupler 510 and branching unit 513. Polarization rotator 524 may be a two port device that rotates the polarization of light propagating through the device by a particular angle, usually an odd multiple of 90°. The CW light supplied from DFB 508 is rotated by polarization rotator 524 and is supplied to MZ modulator 526 via first output 513*a* of branching unit 513. MZ modulator 526 then modulates the polarization rotated CW light supplied by DFB 508, in accordance with drive signals from driver circuit 330. The modulated optical signal from MZ modulator 526 is supplied to first input 517*a* of branching unit 517.

A fourth drive signal is supplied by driver 332 for driving MZ modulator 530. The CW light supplied from DFB 508 is also rotated by polarization rotator 524 and is supplied to MZ modulator 530 via second output 513*b* of branching unit 513. MZ modulator 530 then modulates the received optical signal in accordance with the drive signal supplied by driver 432. The modulated data signal from MZ modulator 530 is supplied to phase shifter 528 which shifts the phase the incoming signal 90° (π/2) and supplies the other of the I and Q components to second input 517*b* of branching unit 517. Alternatively, polarization rotator 536 may be disposed between branching unit 517 and PBC 538 and replaces rotator 524. In that case, the polarization rotator 536 rotates both the modulated signals from MZ modulators 526 and 530 rather than the CW signal from DFB 508 before modulation. The modulated data signal from MZ modulator 526 is supplied to first input port 538*a* of polarization beam combiner (PBC) 538. The modulated data signal from MZ modulator 530 is supplied to second input port 538*b* of polarization beam combiner (PBC) 538. PBC 538 combines the four modulated optical signals from branching units 515 and 517 and outputs a multiplexed optical signal having wavelength λ1 to output port 538*c*. In this manner, one DFB laser 508 may provide a CW signal to four separate MZ modulators 506, 512, 526 and 530 for modulating at least four separate optical channels by utilizing phase shifting and polarization rotation of the transmission signals. Although rotator 536 and PBC 538 are shown on the PIC, it is understood that these devices may instead be provided off-PIC.

In another example, splitter or coupler 510 may be omitted and DFB 508 may be configured as a dual output laser source to provide CW light to each of the MZ modulators 506, 512, 526 and 530 via branching units 511 and 513. In particular, coupler 510 may be replaced by DFB 508 configured as a back facet output device. Both outputs of DFB laser 508, from respective sides 508-1 and 508-2 of DFB 508, are used, in this example, to realize a dual output signal source. A first output 508*a* of DFB 508 supplies CW light to branching unit 511 connected to MZ modulators 506 and 512. The back facet or second output 508*b* of DFB 508 supplies CW light to branching unit 513 connected to MZ modulators 526 and 530 via path or waveguide 543 (represented as a dashed line in FIG. 5*a*). The dual output configuration provides sufficient power to the respective MZ modulators at a power loss far less than that experienced through 3 dB coupler 510. The CW light supplied from second output 508*b* is supplied to waveguide 543 which is either coupled directly to branching unit 513 or to polarization rotator 524 disposed between DFB 508 and branching unit 513. Polarization rotator 524 rotates the polarization of CW light supplied from second output 508*b* of DFB 508 and supplies the rotated light to MZ modulator 526 via first output 513*a* of branching unit 513 and to MZ modulator 530 via second output 513*b* of branching unit 513. Alternatively, as noted above, polarization rotator 524 may be replaced by polarization rotator 536 disposed between branching unit 517 and PBC 538. In that case, polarization rotator 536 rotates both the modulated signals from MZ modulators 526 and 530 rather than the CW signal from back facet output 508*b* of DFB 508 before modulation.

As noted above, the modulated optical signals output from each of modulators 506, 512, 526, and 530 carry modulation symbols that are carried by the modulated optical signals in accordance with a transmission probability distribution in accordance with a corresponding codeword(s) output from the DM encoder(s). Each of the modulated optical signals, therefore, may have a desired SE.

As noted above, optical signals output from transmitter block 12-1 are combined with optical signals output from remaining transmitter blocks 12-2 to 12-*n* onto optical communication path 16 and transmitted to receive node 18 (see FIG. 1). In receive node 18, demultiplexer 20 divides the incoming signals into optical signal groupings, such that each grouping is fed to a corresponding one of receiver blocks 22-1 to 22-*n*.

Figure 6:
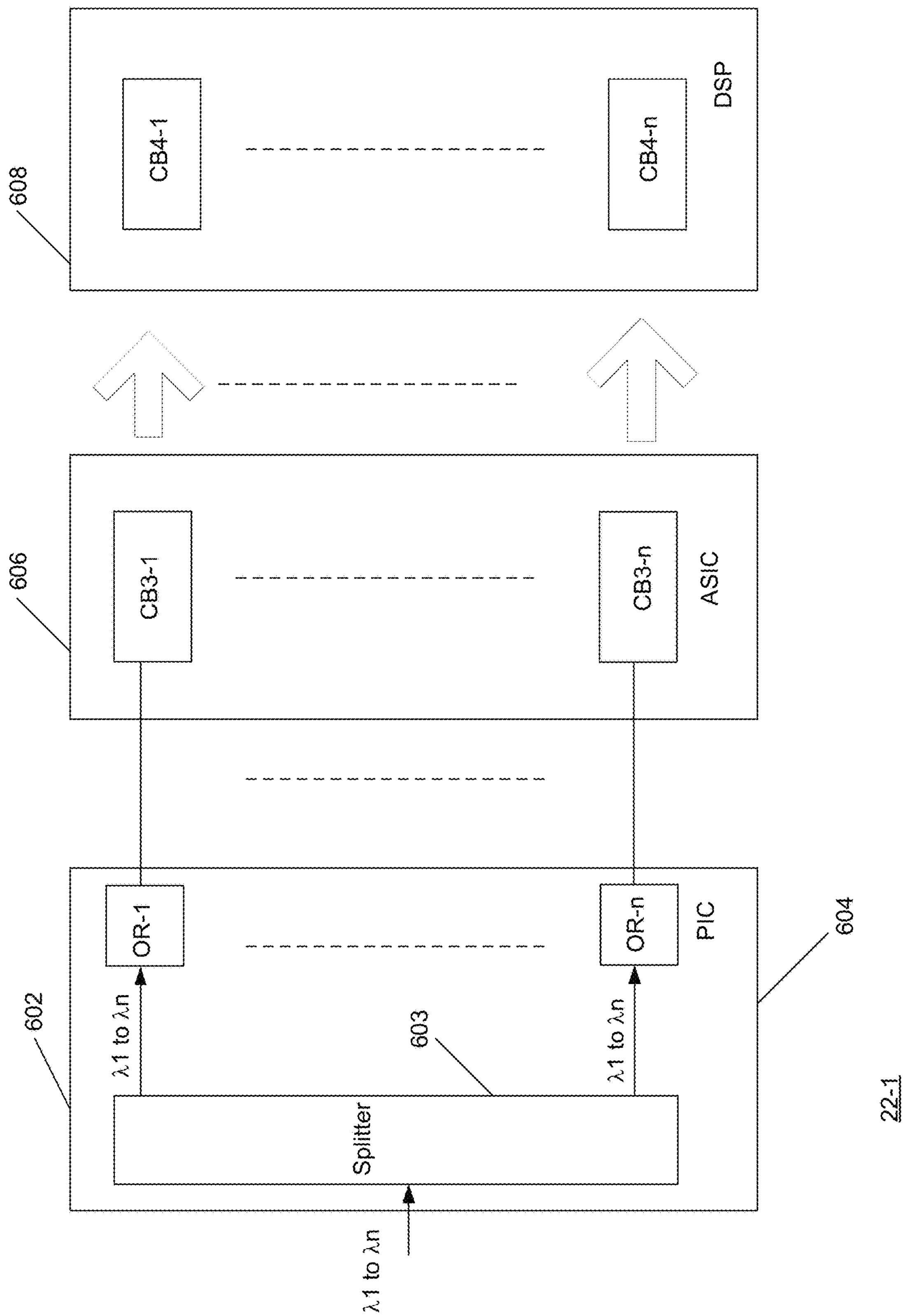
FIG. 6 illustrates a block diagram of a receive block consistent with an aspect of the present disclosure.

One of receiver blocks 22-1 is shown in greater detail in FIG. 6. It is understood that remaining receiver circuitry or blocks 22-2 to 22-*n* have the same or similar structure as receiver block 22-1.

Receiver block 22-1 includes a receive PIC 602 provided on substrate 604. PIC 602 includes an optical power splitter 603 that receives optical signals having wavelengths λ1 to λ10, for example, and supplies a power split portion of each optical signal (each of which itself may be considered an optical signal) to each of optical receivers OR-1 to OR-n. Each optical receiver OR-1 to OR-n, in turn, supplies a corresponding output to a respective one of circuit blocks CB3-1 to CB3-*n* of ASIC 606, and each of circuit blocks CB3-1 to CB3-*n*, supplies a respective output to a corresponding one of circuit blocks CB4-1 to CB4-*n* of DSP 608. DSP 608, in turn, outputs a copy of data Data-1 in response to the input to circuit blocks CB4-1 to CB4-*n*.

Figure 7:
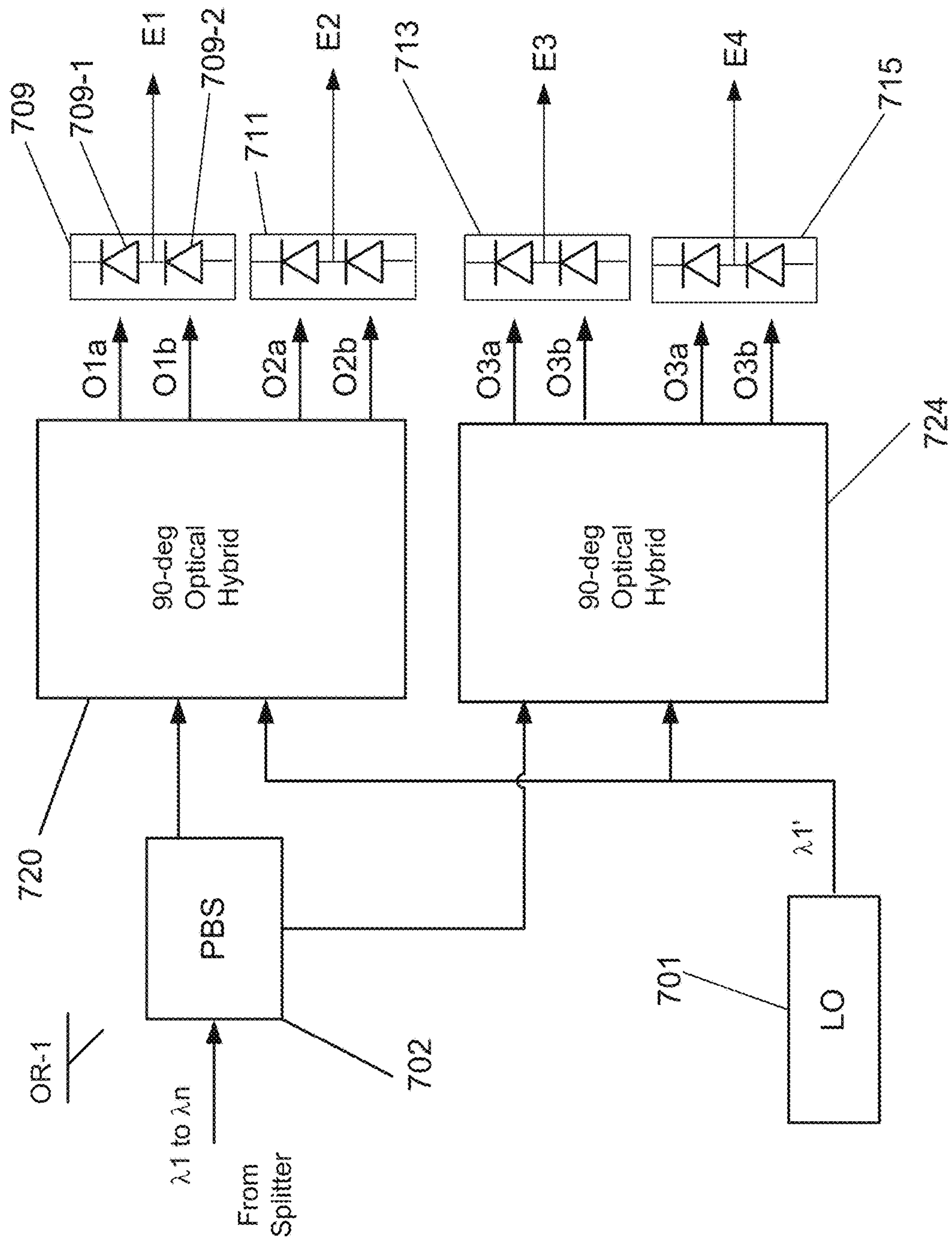
FIG. 7 illustrates a portion of a receiver photonic integrated circuit consistent with the present disclosure.

Optical receiver OR-1 is shown in greater detail in FIG. 7. It is understood that remaining optical receivers OR-2 to OR-n have the same or similar structure as optical receiver OR-1. Optical receiver OR-1 may include a polarization beam splitter (PBS) 702, which may be provided on or off substrate 604 operable to receive polarization multiplexed optical signals λ1 to λ10 and to separate the signal into X and Y orthogonal polarizations, i.e., vector components of the optical E-field of the incoming optical signals transmitted on optical communication path 16. The orthogonal polarizations are then mixed in 90-degree optical hybrid circuits ("hybrids") 720 and 724 with light from local oscillator (LO) laser 701 having wavelength λ1 or a wavelength that differs slight from wavelength λ1 so that the incoming light "beats" with the local oscillator light. Hybrid circuit 720 outputs four optical signals O1*a*, O1*b*, O2*a*, O2*b* and hybrid circuit 724 outputs four optical signals O3*a*, O3*b*, O4*a*, and O4*b*, each representing the in-phase and quadrature components of the optical E-field on X (TE) and Y (TM) polarizations, and each including light from local oscillator 701 and light from polarization beam splitter 702. Optical signals O1*a*, O1*b*, O2*a*, O2*b*, O3*a*, O3*b*, O4*a*, and O4*b* are supplied to a respective one of photodetector circuits 709, 711, 713, and 715. Each photodetector circuit, for example, may include a pair of photodiodes (such as photodiodes 709-1 and 709-2) configured as a balanced detector, for example, and each photodetector circuit supplies a corresponding one of electrical signals E1, E2, E3, and E4. Alternatively, each photodetector may include one photodiode (such as photodiode 709-1) or single-ended photodiode. Electrical signals E1 to E4 are indicative of data carried by optical signals λ1 to λ10 input to PBS 702 demodulated with LO 701 (λ1). For example, these electrical signals may comprise four base-band analog electrical signals linearly proportional to the in-phase and quadrature components of the optical E-field on X and Y polarizations.

Figure 8:
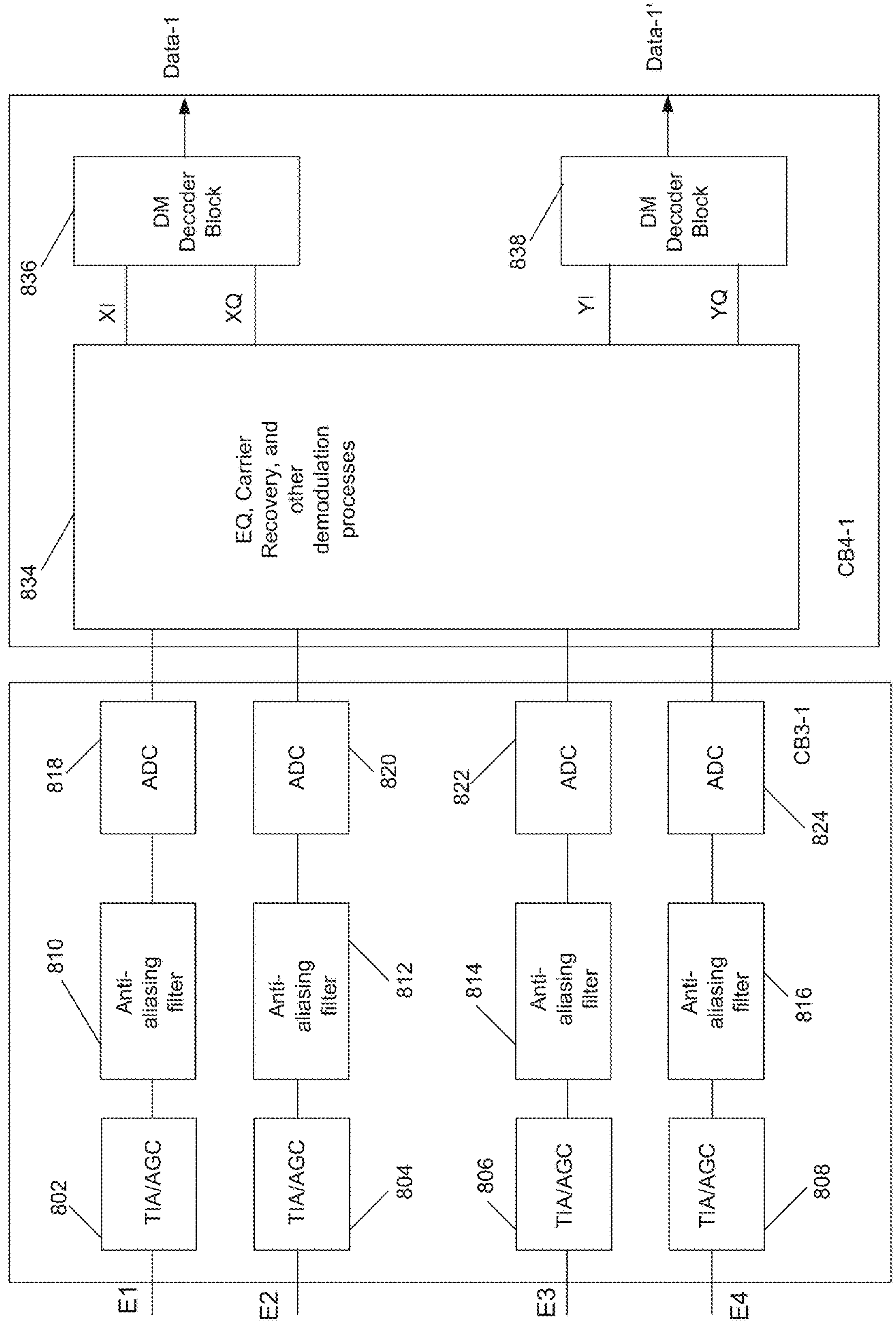
FIG. 8 illustrates a portion of the receive block shown in FIG. 6.

FIG. 8 shows circuitry or circuit blocks CB3-1 and CB4-1 in greater detail. It is understood that remaining circuit blocks CB3-2 to CB3-*n* of ASIC 606 have a similar structure and operate in a similar manner as circuit block CB3-1. In addition, it is understood that remaining circuit blocks CB4-2 to CB4-*n* of DSP 608 have a similar structure and operation in a similar manner as circuit block CB4-1.

Circuit block CB3-1 includes known transimpedance amplifier and automatic gain control (TIA/AGC 802) circuitry 802, 804, 806, and 808 that receives a corresponding one of electrical signals E1, E2, E3, and E4. Each of circuitry 802, 804, 806, and 808, in turn, supplies corresponding electrical signals or outputs to respective ones of anti-aliasing filters 810, 812, 814, and 816, which, constitute low pass filters that further block, suppress, or attenuate high frequency components due to known "aliasing". The electrical signals or outputs form filters 810, 812, 814, and 816 are then supplied to corresponding ones of analog-to-digital converters (ADCs) 818, 820, 822, and 824.

ADCs 818, 820, 822, and 824, may sample at the same or substantially the same sampling rate as DACs 310, 312, 314, and 316 discussed above. Preferably, however, circuit block CB4-1 and DSP 608 have an associated sampling rate that is less than the DAC sampling rate, as described in greater detail in U.S. Pat. No. 8,477,056, the entire contents of which are incorporated herein by reference.

As further shown in FIG. 8, digital outputs of ADCs 818, 820, 822, and 824 are supplied to circuit block 834, which may carry out equalization, carrier recovery, and other demodulation processing on such ADC outputs to provide outputs XI, XQ, Yi, and YQ corresponding to XI, XQ, YI, and YQ discussed above in connection with FIGS. 3 and 4*a* above. Outputs XI and XQ are provided to decoder block 836, and YI, and YQ are provided to DM decoder block 838 (see FIG. 8).

Figure 9:
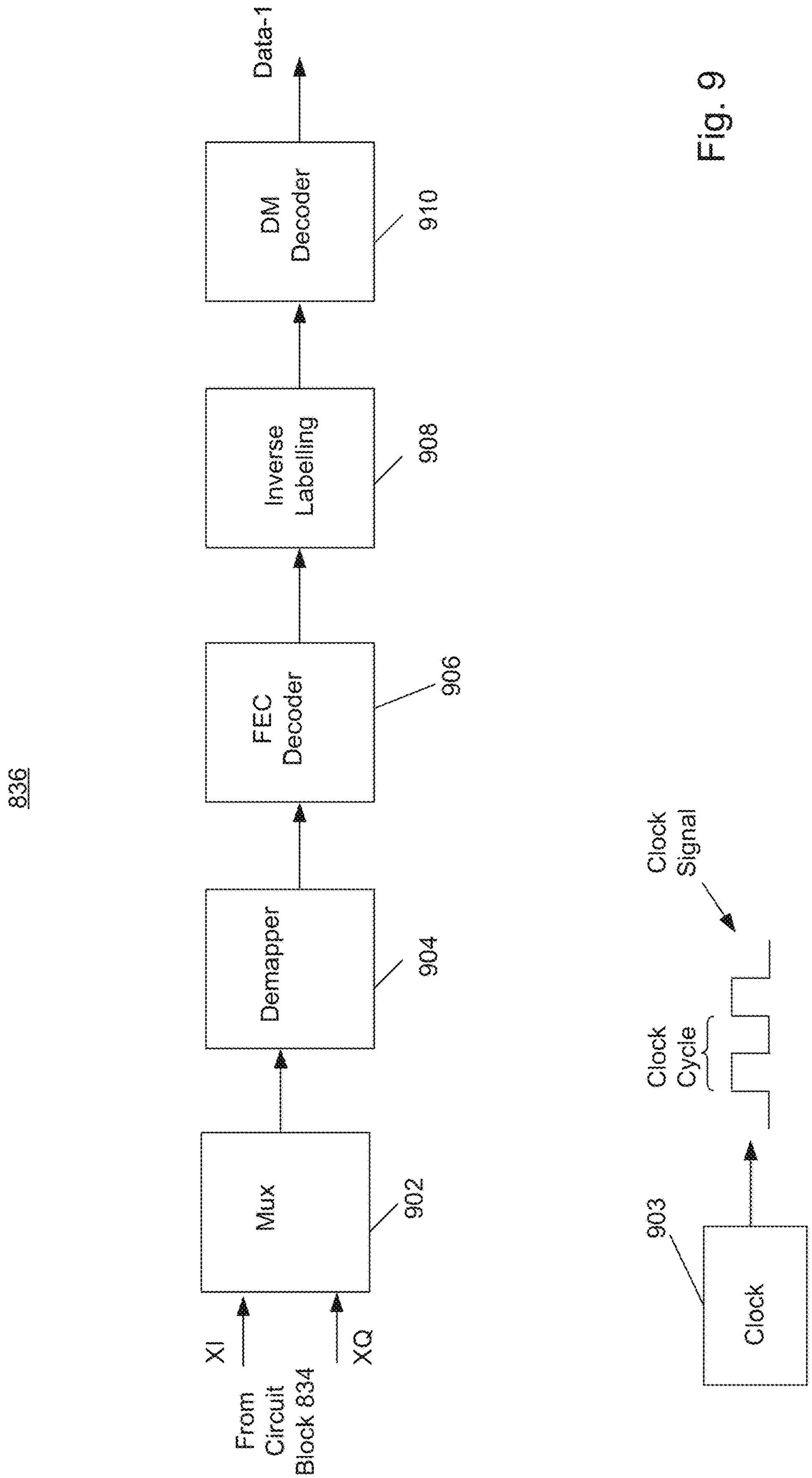
FIG. 9 illustrates a decoder circuit consistent with an additional aspect of the present disclosure.

FIG. 9 shows decoder block 836 in greater detail. It is understood that decoder block 838 has the same or similar structure as decoder block 836. In addition, decoder block 838 operates in the same or similar manner as decoder block 836.

Decoder block 834 may include a multiplexer 902 that multiplexes the in-phase (XI) and quadrature (Q) symbols output from circuit block 834. The multiplex output is supplied to a demapper circuit 904, which calculates soft or hard information regarding the bits that are carried by the symbols and supplies an output to FEC decoder 906. FEC decoder 906 decodes the encoded symbols and outputs labels (corresponding to the labels output from labelling circuit 404) to inverse labelling circuit 908, which assigns each label to a corresponding codeword symbol, and thus carries out the inverse operation as labelling circuit 404. DM decoder 910 next decodes the codeword symbols of each codeword to provide a copy of each input data sequence (Data-1) supplied to DM encoder 402 every n clock signals of the clock signal output from clock 903. The codeword is based on electrical signals, such as E1 and E2 output from balanced photodiodes shown in FIG. 7. Such decoding may be in accordance with fixed-point representations of the of the codeword. The operation of DM decoder 910 is discussed in greater detail below.

Section 2—Encoding Input Bit Sequences to Generate Codewords

Details of the operation of DM encoder 402 will next be described with reference to FIGS. 10-19*c*.

FIG. 10 illustrates an example of a series of input bit sequences, each having k=3 bits, and corresponding codewords, each having n=5 symbols. Here, each symbol of the codeword is represented by a single bit. It is within the scope of the present disclosure, however, that multi-bit symbols may represent each codeword, wherein the codeword symbols may constitute any arbitrary alphabet, i.e., codeword symbols having values other than "0" and "1", may be encoded. The encoding described in the present examples may employ fixed-point precision in which the input data sequences, for example, are represented by a fixed number of digits or fixed-point representations. It is understood that the encoding and decoding described herein is exemplary. Other codeword lengths and other arbitrary alphabets are contemplated. In addition, the encoding and decoding described herein may be employed to encode and decode codewords indicative of the probability distributions associated with symbols and constellations points carried by optical signals modulated in accordance with an m-QAM modulation form, where m is greater than or equal to 16. Such modulation formats may have three, four, five or more amplitude levels.

Figure 11:
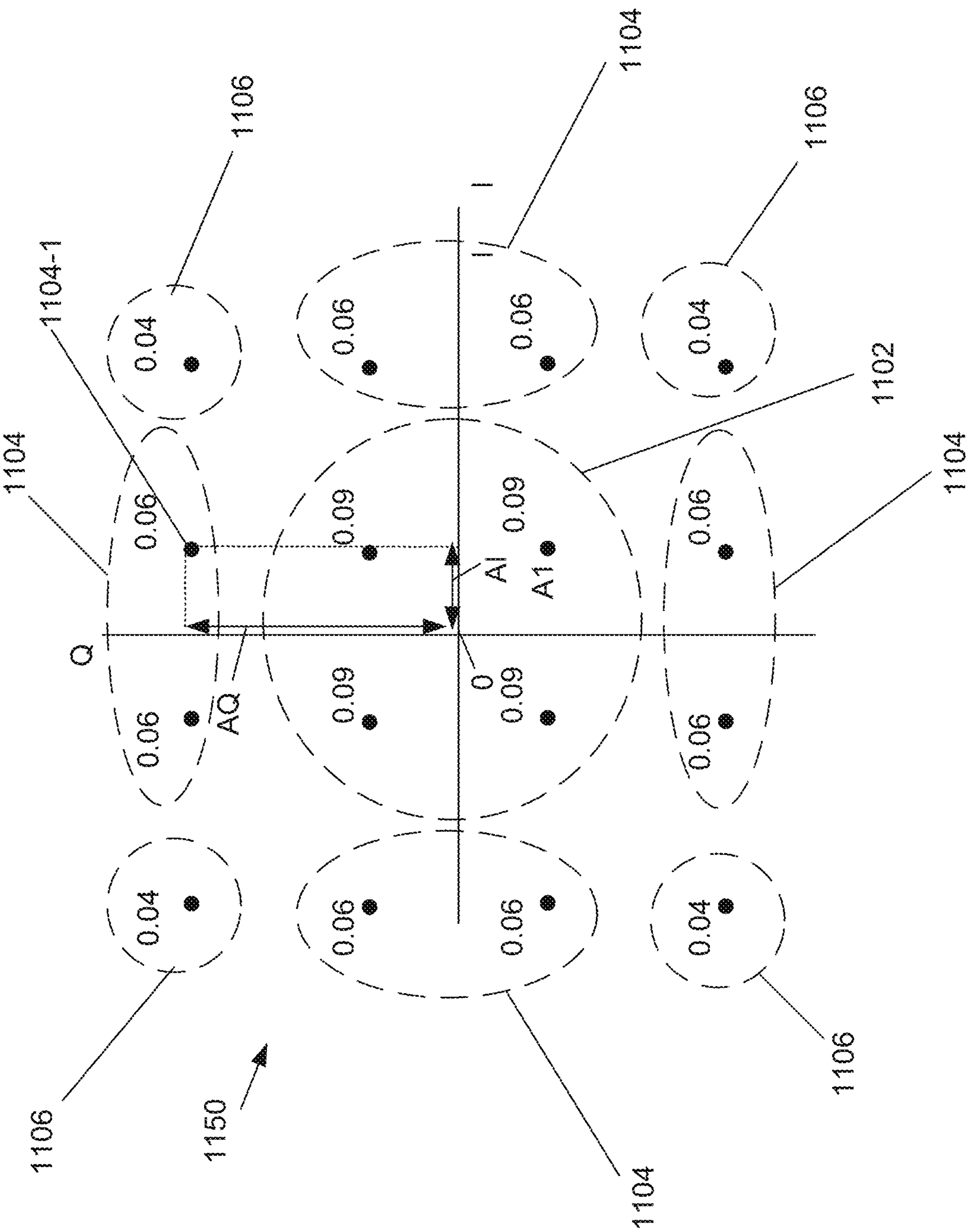
FIG. 11 illustrates an example of a constellation and transmission probabilities for the codewords shown in FIG. 10.

In the example shown in FIG. 10, each codeword has three "1"s and two "0"s. The three "1"s represent a 60% probability (3/5) of transmission of a lower amplitude (i.e., inner constellation point) of the in-phase component and a 60% probability of low amplitude (inner constellation point) of the quadrature component. Consistent with the present disclosure, FIG. 11 shows an example of a 16 QAM constellation 1100. Each point of the constellation is labeled with its corresponding transmission probability, which is determined based on codewords similar to those shown in FIG. 10. Each point may be defined by an in-phase amplitude and a quadrature amplitude. Each amplitude being defined by the alphabet {0, 1, 2}, where symbols 1 and 2 define points having a particular distance from the origin 0 of the IQ plane 1150 and the 0 symbol identifies which whether the constellation point is located along the positive or negative sections of the I and Q axes. Thus, for example, point 1104-1 is defined by an amplitude along the I axis corresponding to first symbol (the "0" of the alphabet) that designates the positive I axis, in this example. The I amplitude further being defined by second/third symbols (the "1" and "2") of the alphabet, such that the amplitude has a magnitude AI in FIG. 11. Point 1104-1 is further defined by an amplitude along the Q axis corresponding to first symbol (the "0" of the alphabet) that designates the positive Q axis, in this example. The amplitude further being defined by second/third symbols (the "1" and "2") of the alphabet, such that the amplitude has a magnitude AQ in FIG. 11. The remaining points in the constellation are defined in a similar fashion by codewords encoded and decoded, as described below.

In the example shown in FIG. 11, the codewords designate a 60% probability of transmission of lower amplitude in-phase and quadrature components and result in the transmission probabilities for the constellation points shown in FIG. 11. Namely, each of the inner (low amplitude) points 1102 with amplitude A1 have a 9% symbol transmission probability; each of middle (intermediate) points 1104 has a 6% symbol transmission probability; and each of outer (high) amplitude points 1106 has a 4% symbol transmission probability. Thus, points 1102 are transmitted more frequently than points 1104, which, in turn, are transmitted more frequently than points 1106. The sum of each of these probabilities is one (100%). The fixed-point processing of input bit sequences described herein may be employed to encode and decode codewords corresponding to the probability distribution shown in FIG. 11 or any other probability distribution. Examples of other codewords and corresponding probability distributions for a 64 QAM constellation (optical signals modulated in accordance with a 64 QAM modulation format) are discussed below with reference to FIGS. 34-38. Such codewords may also generated in a manner similar to that described above in which the codewords may define amplitude along the I and Q axes that define each constellation point. Consistent with the present disclosure, based on such codewords, optical signals modulated with the modulators disclosed herein may generate sequences of modulation symbols, each corresponding to a respective constellation points (e.g., symbols 0010 and 0000 associated with a respective one of points 1106; symbols 1111 and 0111 associated with a respective one of points 1102) in FIG. 11, wherein certain symbols, such as those associated with constellation points 1102 (having amplitude A1), for example, are transmitted more frequently than modulation symbols associated with constellation points 1106 having amplitude A3. Encoding and decoding of such symbols and codewords is discussed in greater detail below.

Figure 12:
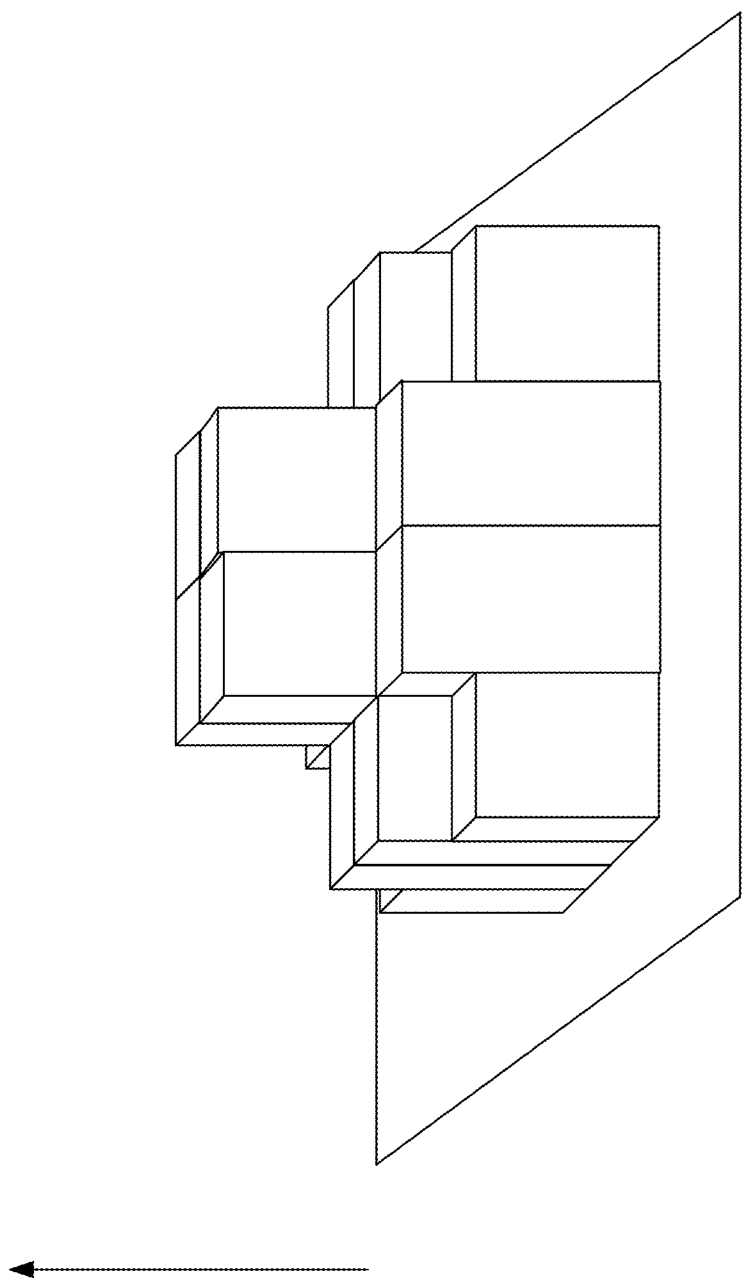
FIG. 12 graphically illustrates a transmission probability distribution corresponding to the probabilities shown in FIG. 11.

FIG. 12 illustrates a three-dimensional representation 1200 of the symbol transmission probabilities shown in FIG. 11.

Preferably, each input sequence is mapped one-to-one to a corresponding codeword. Such one-to-one mapping will next be described with reference to FIG. 13, which shows one-to-one mapping for the exemplary input bit sequences and codewords shown in FIG. 10.

Figure 13:
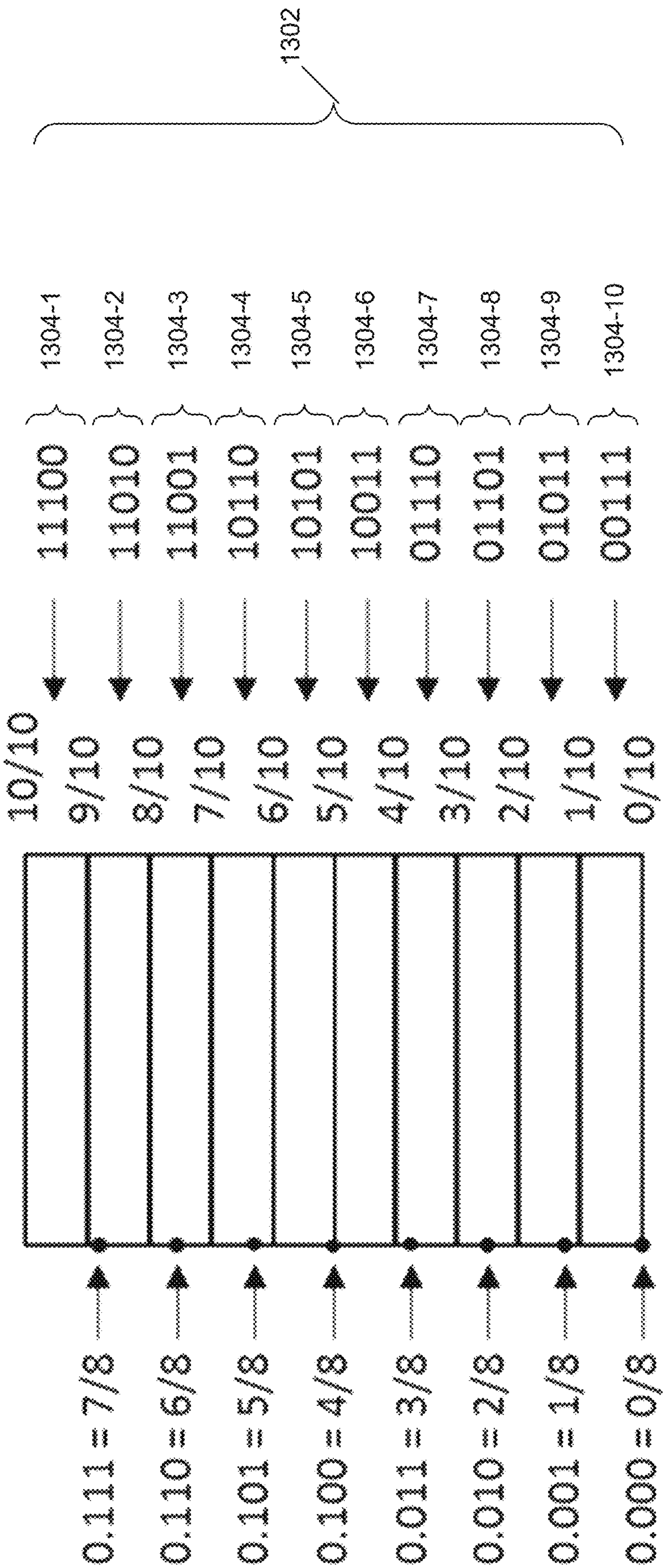
FIG. 13 illustrates an example of on-to-one mapping consistent with an aspect of the present disclosure.

By way of explanation, the total number of codewords, N, with the desired empirical distribution may be calculated as follows:

$$N = \prod_{i=0}^{M-1} \binom{n - \sum_{j=0}^{i-1} n_j}{n_i},$$

where $$\binom{b}{a}$$

is b choose a function, an encoded codeword consists of n symbols, each symbol 'i' is selected from {0, 1, . . . , M−1}, $n_i$ is the total number of symbol 'i' in the codeword, $n_i$'s are predetermined by a desired probability distribution, and $n=n_0+n_1+ \ldots +n_{M-1}$. All N codewords are equally probable. Assume that the codewords are lexicographically ordered (according to the rule 0<1<2< . . . <M−1). The probability interval from 0 to 1 may be partitioned by N disjoint sub-intervals each of length 1/N. Such sub-intervals in probability interval 1302 are shown in FIG. 13, as sub-intervals 1304-1 to 1304-10 for the exemplary input bit sequences and codewords shown in table 1000 of FIG. 10 (the code words having a Hamming weight of 3). Each subinterval 1304 corresponds to one of the lexicographically ordered codewords. Assume k is chosen such that $k \le \log_2 N$. Thus $1/N \le 2^{-k}$. Considering the partitioning structures of the unit interval by the input bit sequences and by the codewords, each subinterval of length $2^{-k}$ which is indicated by one of the input bit sequences corresponding to at least one distinct codewords of the desired codebook. Thus, for each input bit sequence, there is at least one codeword available to be addressed. This guarantees the existence of one-to-one mapping between the information bit sequences and codewords of desired distributions.

It is noted that there is no need to use all the available codewords. Each input bit sequence is associated with a unique codeword to assure the one-to-one mapping. As further shown in FIG. 13, one-to-one mapping exists between each input sequence and a corresponding codeword.

By way of further explanation and, as noted above, the desired distribution in the example shown in table 1000, p(0)=0.4 (outer points—high amplitude), and p(1)=0.6 (inner points—low amplitude). Such probability is equivalent to a constant hamming weight of 3 within length 5 for all binary codewords. The distribution in this example is not only preserved for each codeword of a codebook but is also preserved at each time instance within the codebook. In other words, any specific symbol (e.g., first symbol) of the codewords follows the desired distribution. This together with arranging the codewords lexicographically enable a simple streaming encoding and decoding which is explained in the following.

The input bit sequence determines the unique probability subinterval 1304 of length $2^{(-k)}$ over the interval [0,1) in a binary search format. The first bit divides the interval [0,1) into two disjoint subintervals of equal length [0, 0.5) and [0.5 1) and selects one. The lower interval is selected if the bit is zero and vice versa. The second bit divides the first selected subinterval into two disjoint smaller subintervals each of length 0.25 and select the lower if it is zero and the upper if it is one. This continues until all the input bits are consumed and the desired subinterval of length $2^{(-k)}$ is selected.

Each time that the probability interval is refined, the number of candidate codewords reduces. The encoding procedure does not need to wait until the final probability subinterval is known. As soon as the probability subinterval becomes small enough such that all the candidate codewords are stared with the same symbol, the encoder 402 sends out the first encoded symbol. Knowing the first encoded symbol, the number of candidate codewords is reduced. The remaining uncoded symbols follow a refined desired distribution as the first symbol is known at this time. This procedure is continued and every time that the selected probability subinterval is small enough to point out to a set of codewords all with the same new prefixed symbol, encoder 402 will send out the symbol and process the next symbol to be encoded. When the target probability subinterval of length $2^{(-k)}$ is selected, there might be multiple codewords available to be chosen from. Any of them can be selected as the desired codeword but preferably the smallest one is selected. This is equivalent to padding the input bit sequence with enough zeros and continue partitioning the probability subinterval until only one codeword is available within the target probability subinterval.

Accordingly, with reference to the example shown in FIG. 14, assume that the input bit sequence is "101" the corresponding codeword "10110" may be selected in the following manner. Initially, the first bit of the input bit sequence "101" is identified as "1" and used to selects the upper half of the lexicographically arranged codewords. Since each of these selected codewords begins with a "1", and the finally selected codeword is included in these codewords, a "1" may be stored as being the first symbol (or bit in this example) of the finally selected codeword. The next bit of the input bit sequence "101" is "0" which selects the lower half of the previously selected lexicographically arranged codewords. The second bit of some of these codewords is a "0" while the second bit of others is a "1". Accordingly, no determination can be made at this stage as to the second bit of the finally selected codeword. The third bit of the input bit sequence, "1", selects, from the remaining codewords (11001, 10110, and 10101) the upper two codewords—namely, 11001 and 10110. Since the second, as well as the third through fifth bits of the selected codewords 11001 and 10110 are either a "0' or a "1', final selected of the codeword does not occur until a fourth or "pad" bit, which in this case, is a "0", is used to select the lower codeword 10110. At which point, the second through fifth bits may be stored in an output buffer as being part of the finally selected codeword. It is noted that at each step, the selected probability interval 1304 contains the final probability subinterval corresponding to the encoded sequence no matter what the rest of the uncoded input bit sequence is.

Figure 14:
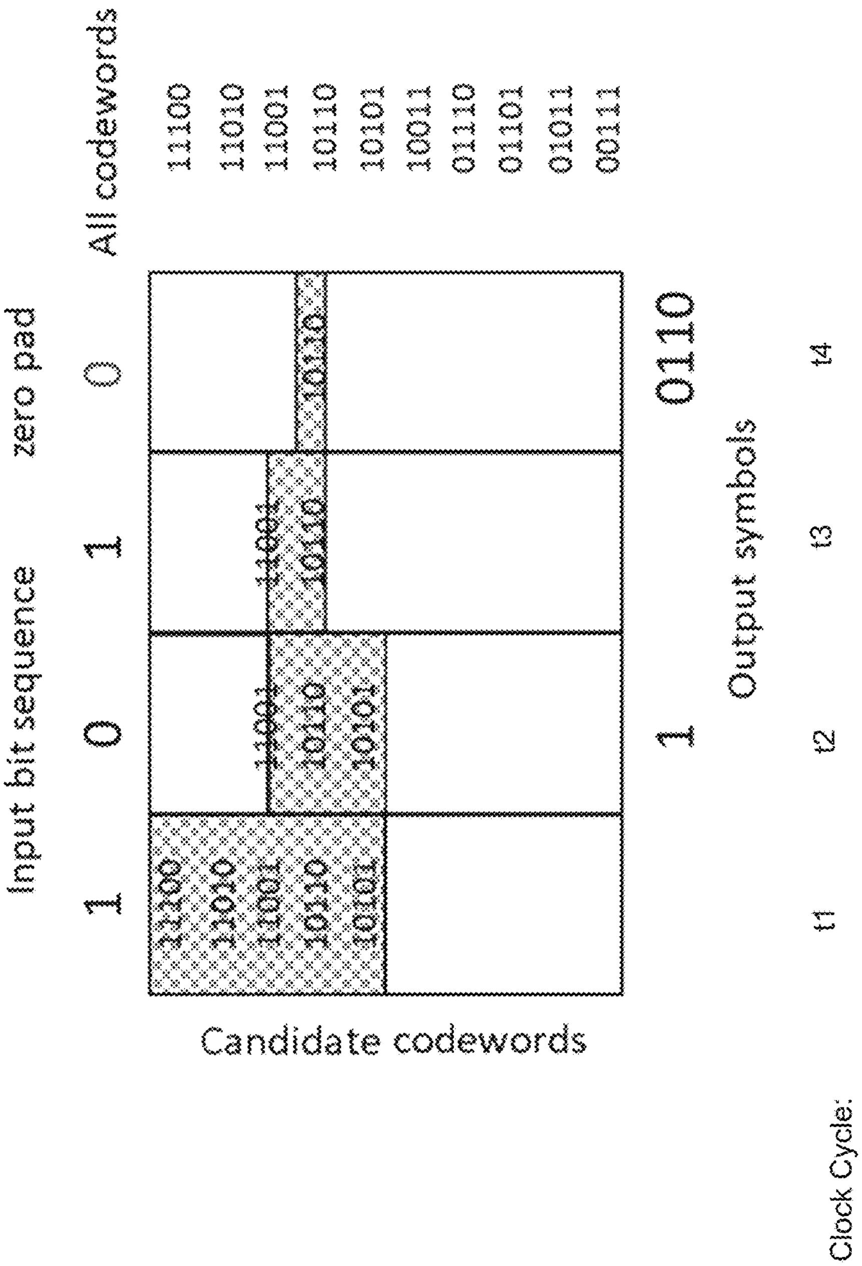
FIG. 14 illustrates an example of encoding an input bit sequence to generate one of the codewords shown in FIG. 10.

As further shown in FIG. 14, however, during clock cycles t1 and t3 no codeword symbols are generated, while during time clock cycle t2 one codeword symbol (a "1") is generated, and during clock cycle t4 four codeword symbols ("0110") are generated. A look-up table may be provided to supply codeword symbols based on the encoding process described above, and such look-up tables can used if the codewords have a short length. However, the size of the lookup table may be large, and thus unsuitable, for relatively long codewords.

Accordingly, consistent with the present disclosure, an apparatus and method are provided for outputting a codeword symbol during each clock cycle.

A fixed-point process for encoding an input bit sequence based on fixed-point representations of such input data sequence consistent with the present disclosure will next be described with reference to FIGS. 15-19*c*.

Figure 15:
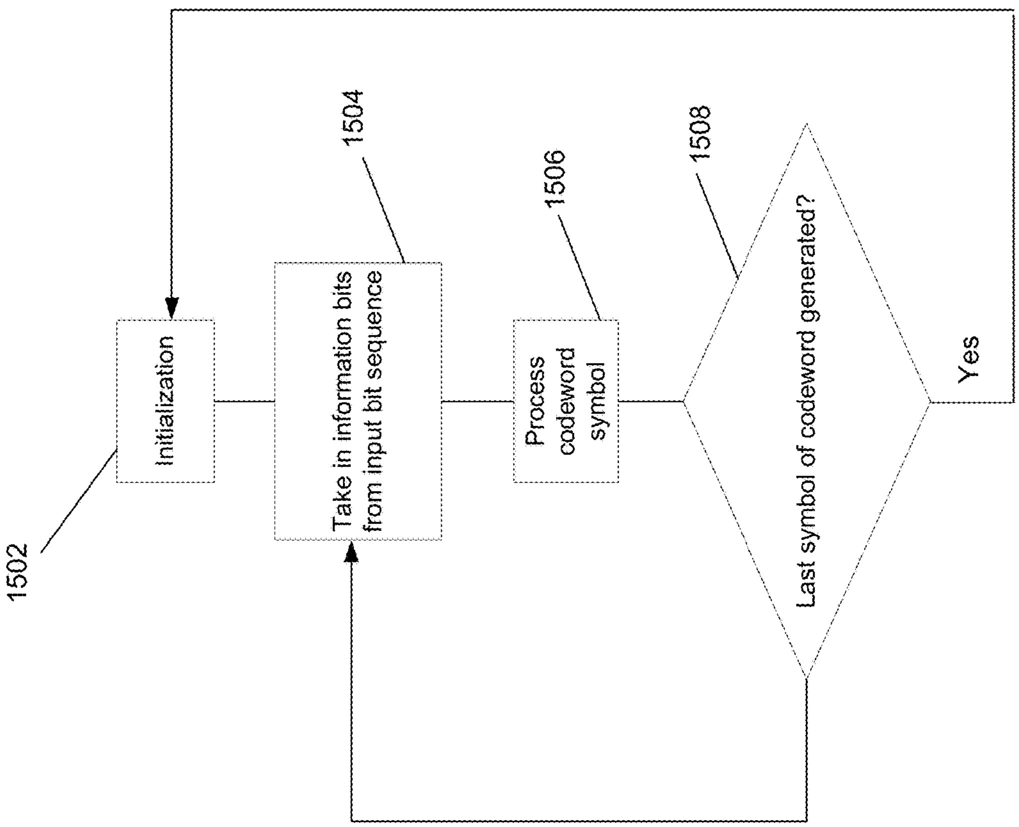
FIG. 15-17 illustrates a features of an example of a distribution matching encoder module consistent with an aspect of the present disclosure.

The overall encoding process 1500 carried out by DM encoder 402 is shown in FIG. 15. In a first step (1502), parameters (described below) are initialized, and, in a second step (1504) a certain number of information bits are input for processing. In a third step (1506), a codeword symbol is processed and output, and, in a fourth step (1508), a determination is made as to whether the last symbol of the codeword has been generated. If any ungenerated codeword symbols remain, additional bits are input, and, if all input bits of the sequence have been consumed, 0 bits may be added (step 1504 is repeated) followed step 1506. If all symbols of the codeword have been generated, however, the encoding process 1500 is repeated for the next input bit sequence to the encoder.

Figure 16:
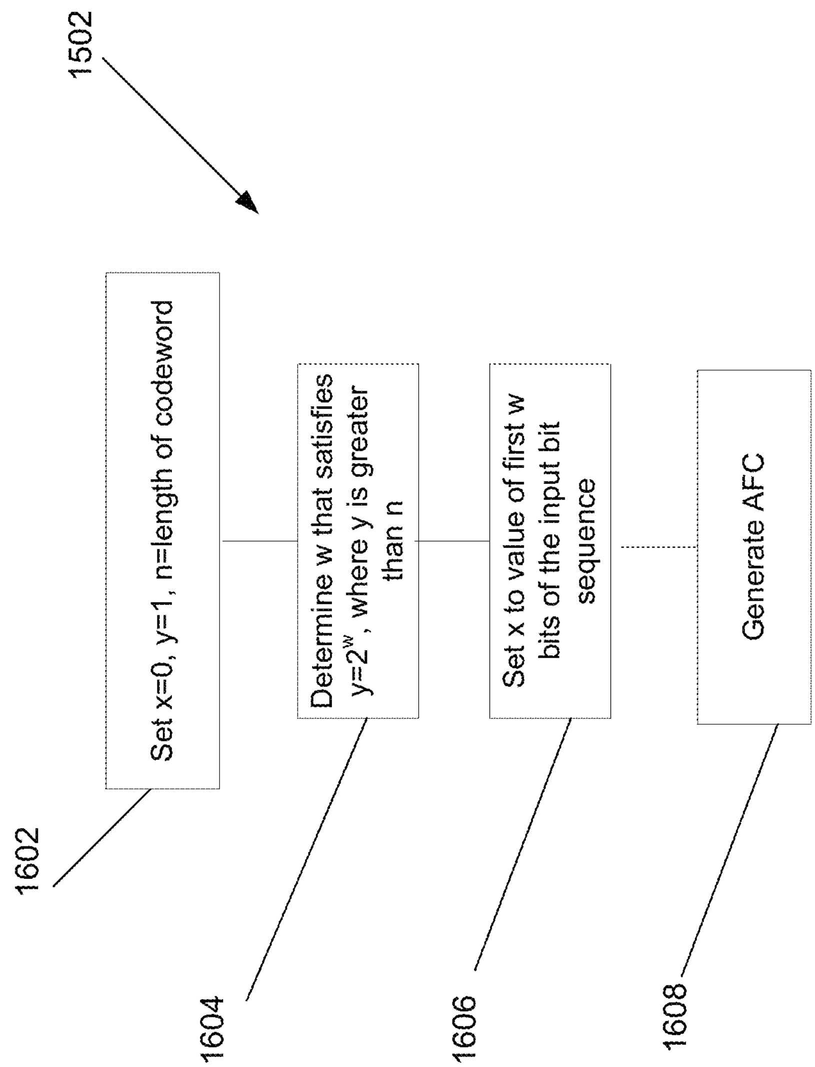

Initialization step 1502 is shown in greater detail in FIG. 16. In a first step of the initialization, parameter x is set to 0, y is set to 1, and n is set to be equal to the length of the codeword (step 1602). Parameters x and y are described in greater detail below.

As noted above, each codeword is within a probability interval between 0 and 1. In one example, one or more of the selected sub-interval, updated AFC, x, and y may constitute a fixed-point representation of the input data sequence. In encoding the input bit or data sequence, the probability interval from 0 to 1 is mapped to an integer interval from 0 to y, where $2^{w} \leq y < 2^{w+1}$ (w is described below). The mapped interval is referred to herein as the "integer probability interval" (IPI). The IPI is partitioned according to an accumulated frequency count ("AFC") model, which corresponds to the codeword symbols remaining after particular codeword symbol has been output and the number of such remaining codeword symbols designating particular amplitudes. The length of each subintervals of the IPI is proportional to the length of the corresponding subintervals on AFC and resembles the cumulative distribution of the codeword symbols in integer domain and within interval 0 to y. w is chosen large enough such that any non-zero probability sub-interval in the AFC model is mapped to a non-zero integer sub-interval within 0 to y. To satisfy this condition, y is preferably greater than or equal to n.

Initially, y is set to 2 W, such that y is also greater than or equal to n, as noted above (step 1604). Parameter x is initialized with the first w MSB bits of the input bit sequence (step 1606). x is located within one of the subintervals of the IPI and such subinterval corresponds to the first codeword symbol.

Figure 17:
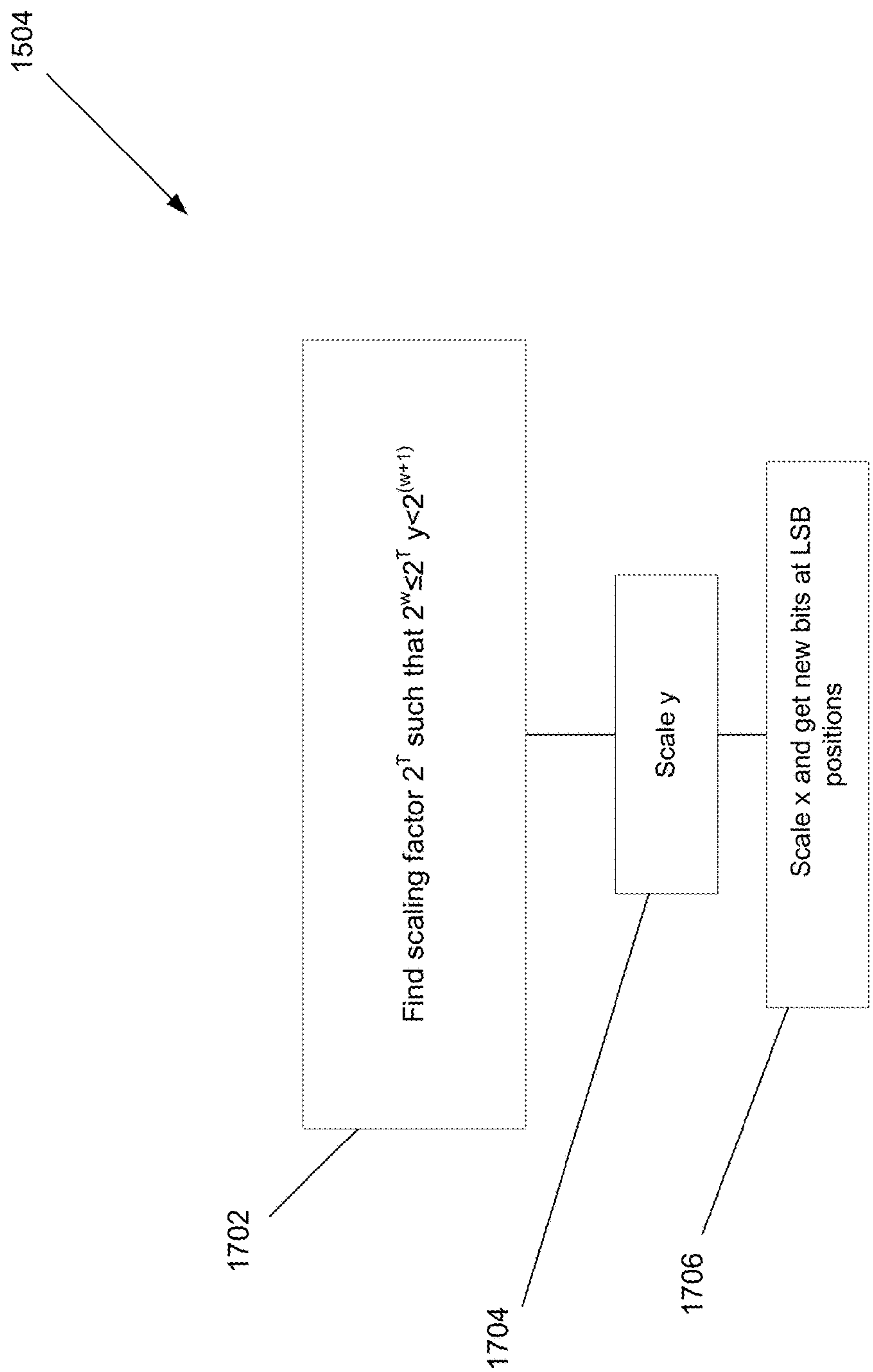

Next, the AFC is updated to reflect that n-1 codeword symbols remain after the first codeword symbol is generated (step 1608). The process then progresses to step 1504 (FIG. 17).

Figure 18:
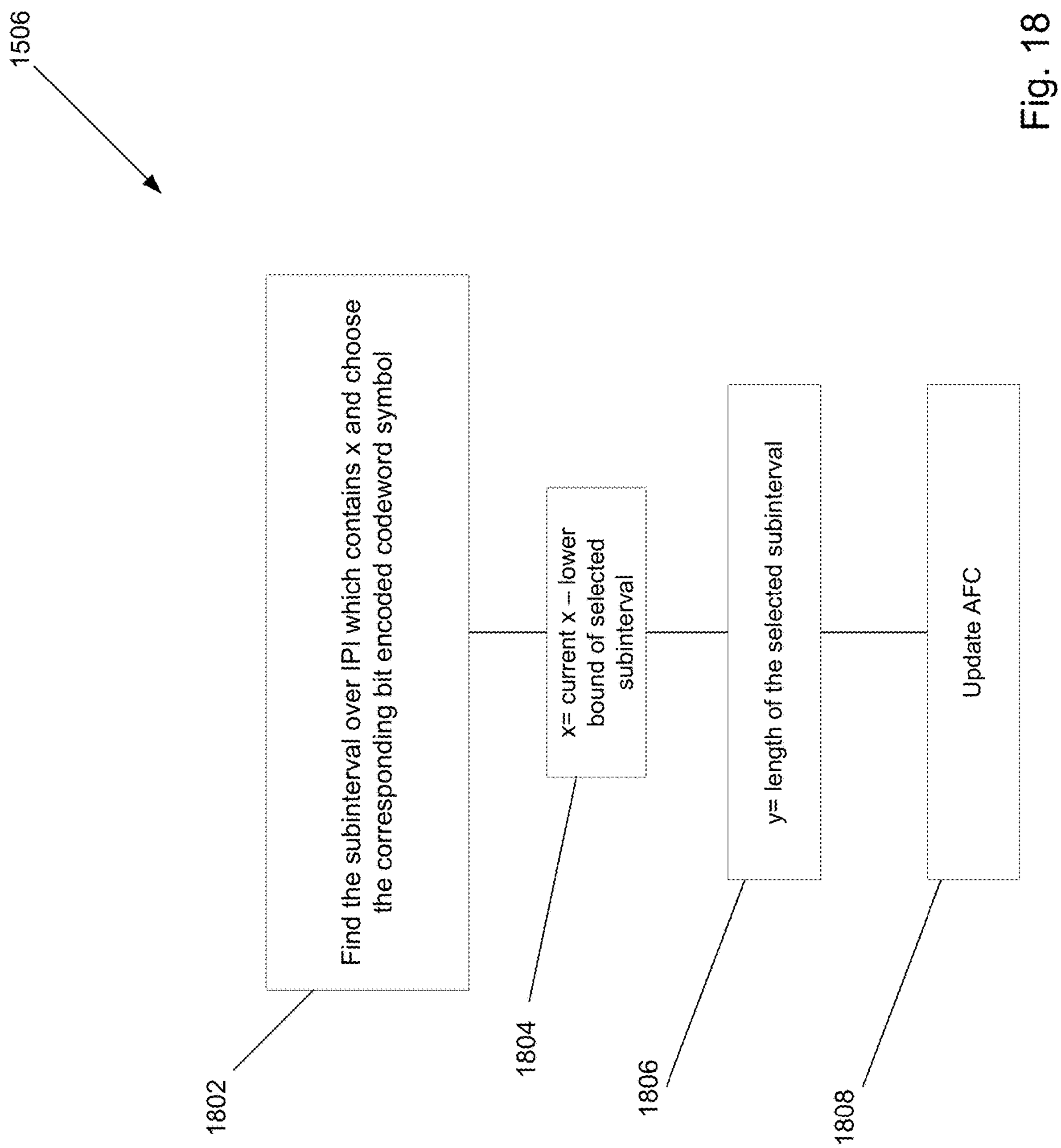
FIG. 18 illustrate steps of an encoding method consistent with an additional aspect of the present disclosure.

To further encode the input bit sequence and generate new encoded symbols, the selected subinterval on IPI is further partitioned according to the updated AFC model. However, in order to ensure that the partitioning does not alter the actual probability distribution, a scaling factor T by an integer power of 2 is determined that satisfies $2^w \leq 2^T y < 2^{(w+1)}$ (step 1702). y is then scaled accordingly in step 1704, and x is updated to be scaled by the same parameter as y. In addition, new bits from the input bit sequence is added to x at LSB locations of x (step 1706). The encoding process next moves to step 1506, which is shown in FIG. 18.

In processing the codeword symbol (step 1506), the subinterval over the IPI which contains x is selected and the codeword symbol is output (step 1802). x is then updated by calculating the distance of the current x from the beginning of the selected subinterval (step 1804). y is updated by the length of the selected subinterval (step 1806), and the AFC model is also updated as the frequency count of one of the symbols has changed (step 1808). This may affect some or all of the entries of the AFC model. At this point, the encoding of the first symbol is complete for a particular input bit sequence.

The encoding process carried out by DM encoder 402 will next be described by way of a specific example in which one of the bit sequences (101) shown in table 1000 (FIG. 10) is encoded generate the codeword 10110.

Figure 19A:
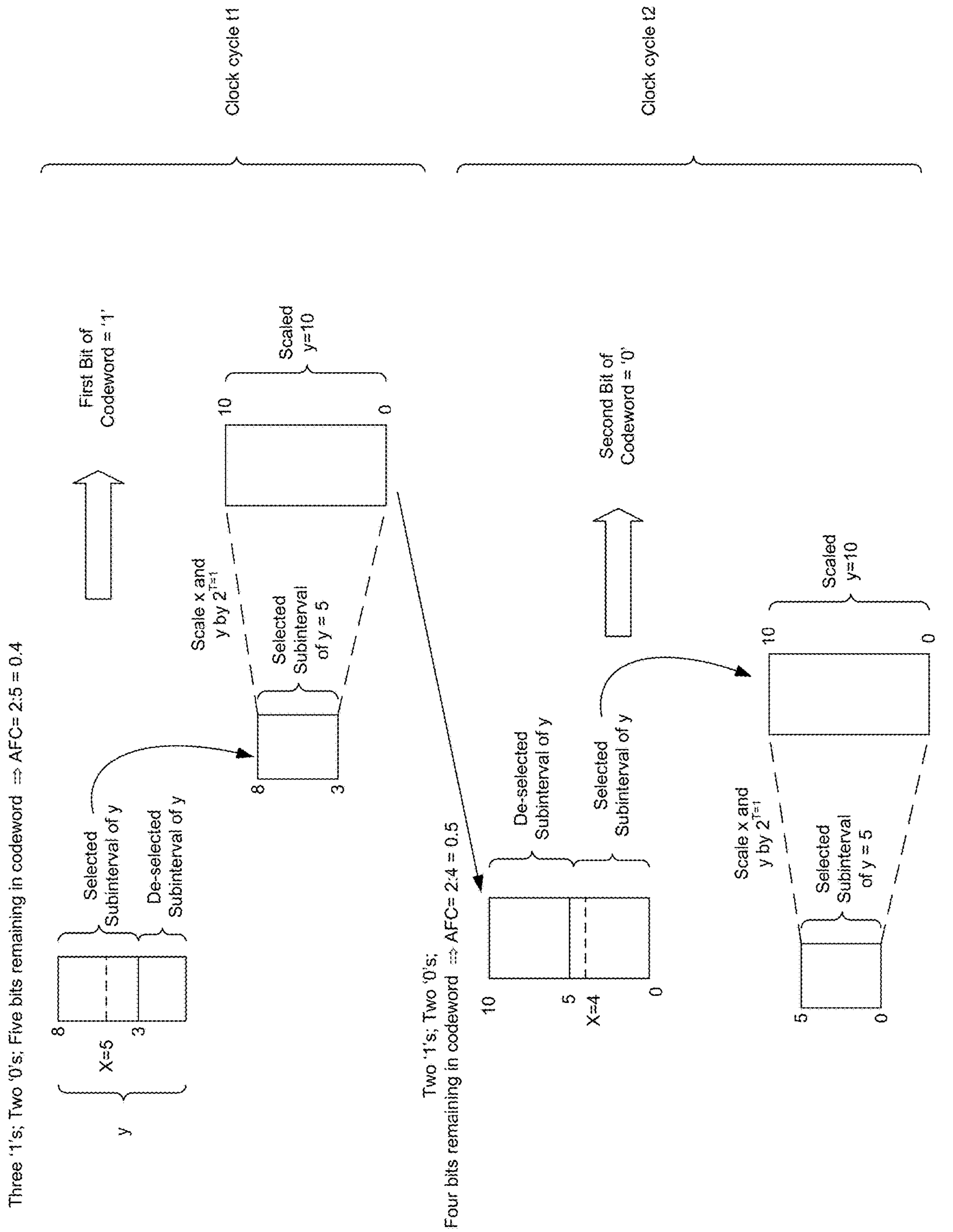
FIGS. 19*a*-19*c* illustrate an example of a method for encoding an input bit sequence to generate one of the codewords shown in FIG. 10.

As shown in FIG. 19*a*, during clock cycle t1, y is set to be greater than n (the codeword length) an is set equal to $2^w$. Since n=5, y is set equal to 8, which is the lowest number that is a power of 2 that is greater than 5. Accordingly, w is set equal to 3 ($8=2^3$). Accordingly, the first w (3) bits of the input bit sequence are processed. Here, the first three bits (which is all the bits of the in this example) are "101". x is set equal to value of these bits, which is 5. Accordingly, x=5 and y=8. As noted above, the probability interval (y) is partitioned into subintervals based on the AFC. In this example, the AFC is three "1"s and two "0"s. Accordingly, y is divided into two subintervals based on the AFC 2:5. The first "lower" subinterval has an upper bound of 3 (⅖*8=3 (rounded to the nearest integer)) and a lower bound of 0, and the "upper" subinterval has a lower bound of 3 and an upper bound of 8. Since x=5 falls in the upper subinterval, the upper subinterval is selected, thereby designating a the first codeword symbol as a "1".

The selected subinterval having a length of 5 (8−3) is then scaled by a factor of $2^T$ such that $2^w \leq 2^T y < 2^{(w+1)}$ (w=3). Accordingly, T=1, such that both x and y are scaled by a factor of 2 ($2^{T=1}$). The updated probability interval (the length of the scaled y) is therefore 10. x is updated to be the difference between the current value of x and the lower bound of the selected interval. Here, the updated x is therefore equal to 2 (5-3=2). Such updated x is scaled by the same factor of 2 ($2^{T=1}$). Accordingly, the scaled and updated x is equal to 4 ($2*2^1$). At this point additional bits from the bit sequence may be added to x. In this example, however, the bit sequence is only three bits long, and such bits were consumed in generating the first codeword symbol. Accordingly, in this example, a "0" may be added to x.

In the next clock cycle (t2), the updated probability interval is partitioned according to the updated AFC. Namely, since one codeword symbol has been output, four codeword symbols remain. Moreover, since, of these remaining codeword symbols two must be a "1" and two must be a "0", the upper and lower subintervals are partitioned at 5. Since, as noted above, x is updated to equal 4, and four falls within the lower subinterval bounded by 0 and 5, the lower subinterval is selected to thereby designate the second codeword symbol as a "0".

As further shown during the second clock cycle in FIG. 19*a*, the selected lower subinterval having a length of 5 is scaled by factor of $2^{T=1}$ such that $2^w \leq 2^T y < 2^{(w+1)}$ (w=3). Accordingly, y is scaled to equal 10. In addition, x is updated to be the difference between the current x and the lower bound of the selected interval times the scaling factor. Here, x is updated to be equal to 8 ($(4-0)*2^1=8$).

Figure 19B:
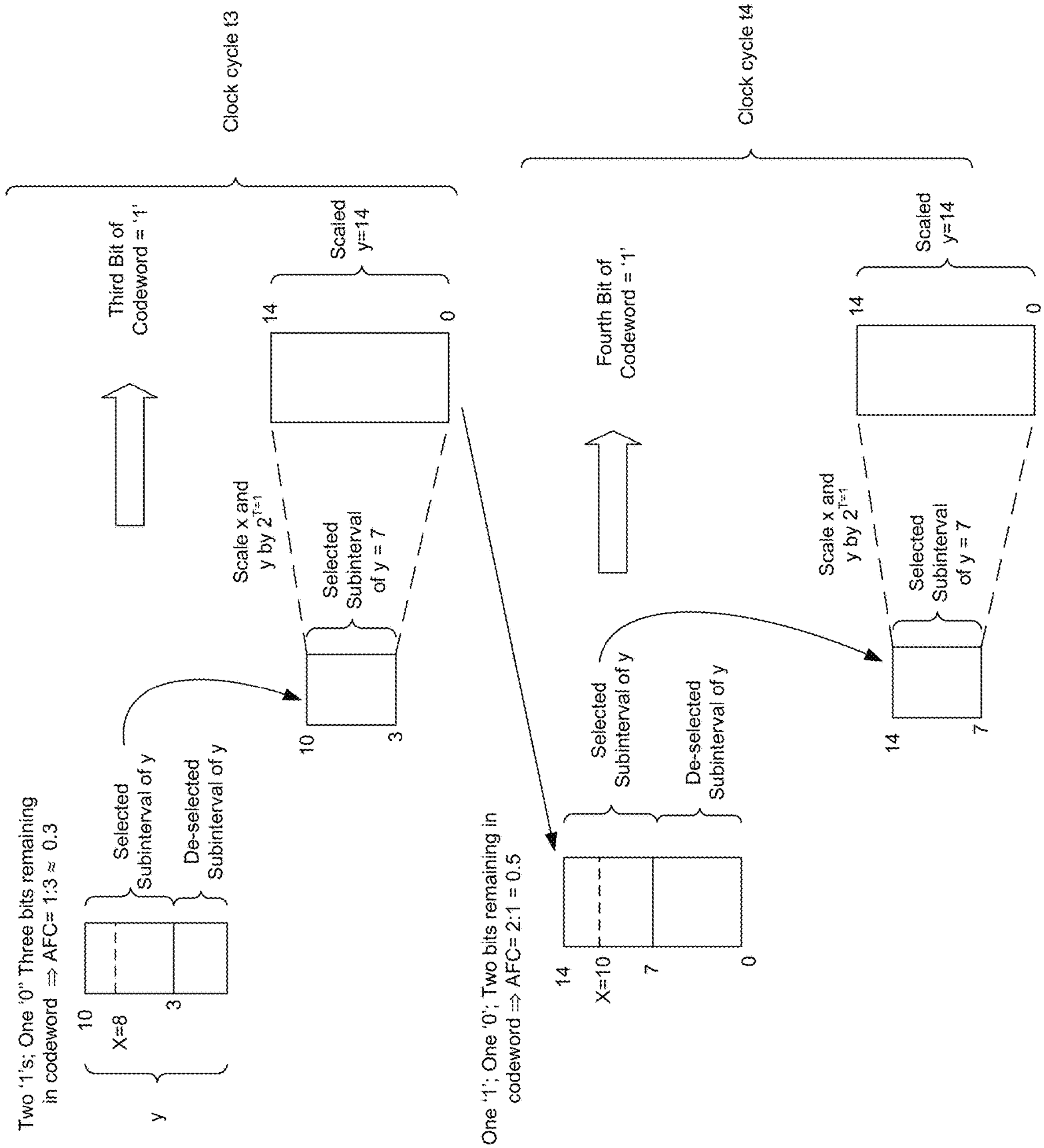
Figure 19C:
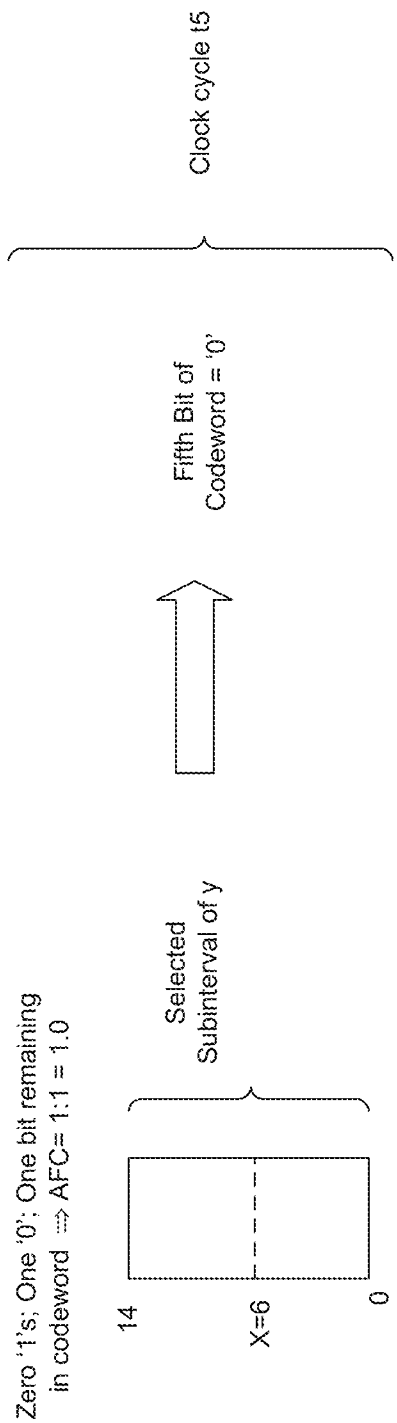

As shown in FIG. 19*b*, during clock cycle t3, the probability interval (scaled y) is partitioned according to the updated AFC model in which three codeword bits remain (after two have been output) and, of those remaining codeword bits, one is a "0" and two are "1"s. Accordingly, the probability interval is partitioned into two subintervals, such that the lower subinterval has a lower bound of 0 and an upper bound of 3, and the upper subinterval has a lower bound of 3 and an upper bound of 10. x, as noted above is updated to be equal to 8 and therefore is located in the upper subinterval. Accordingly, the third codeword symbol is designated as a "1" and the upper subinterval having a length of 7 is selected.

The selected subinterval is scaled, in a manner similar to that described above by $2^{T=1}$ so that the scaled probability interval is updated to be equal to 14. x is updated as before to be the difference between the current x and the lower bound of the selected subinterval times $2^{T=1}$. Accordingly, the updated x equal 10 ($(8-3)*2^{T=1}=10$).

In clock cycle t4, the updated x is determined to be within the upper subinterval (7<10<14) to thereby designated the fourth codeword symbol as a "1". In addition, the upper subinterval is selected.

As further shown in FIG. 19*b*, the selected subinterval is scaled by a factor 2 as before so that the probability interval (scaled y) equals 14. Since only one codeword symbol remains, however, the probability interval is not partitioned and there is no upper subinterval. x, which is updated to be equal the difference between the current x and the lower bound of the selected interval is set equal to 6 ($6=(10-7)*2^{T=1}$). Accordingly, since there is no upper subinterval, x falls within the "lower" or only remaining subinterval to thereby designate the last codeword symbol as a "0". See clock cycle t5 in FIG. 19*c*.

Thus, as shown in the above example, for each clock cycle t1 to t5, DM encoder 402 outputs one of the symbols of the codeword.

Section 3—Decoding Codewords to Generate and Output Bit Sequence

An illustrative example of a decoding scheme will next be described with reference to FIG. 20. In this example, the codeword 10110 noted above is decoded to output the corresponding data sequence 101. Here, in this example, decoding involves selecting subintervals of successive probability intervals based on the remaining symbols of the incoming codeword in accordance with a fixed-point process based on a fixed-point representation of the codeword.

Figure 20:
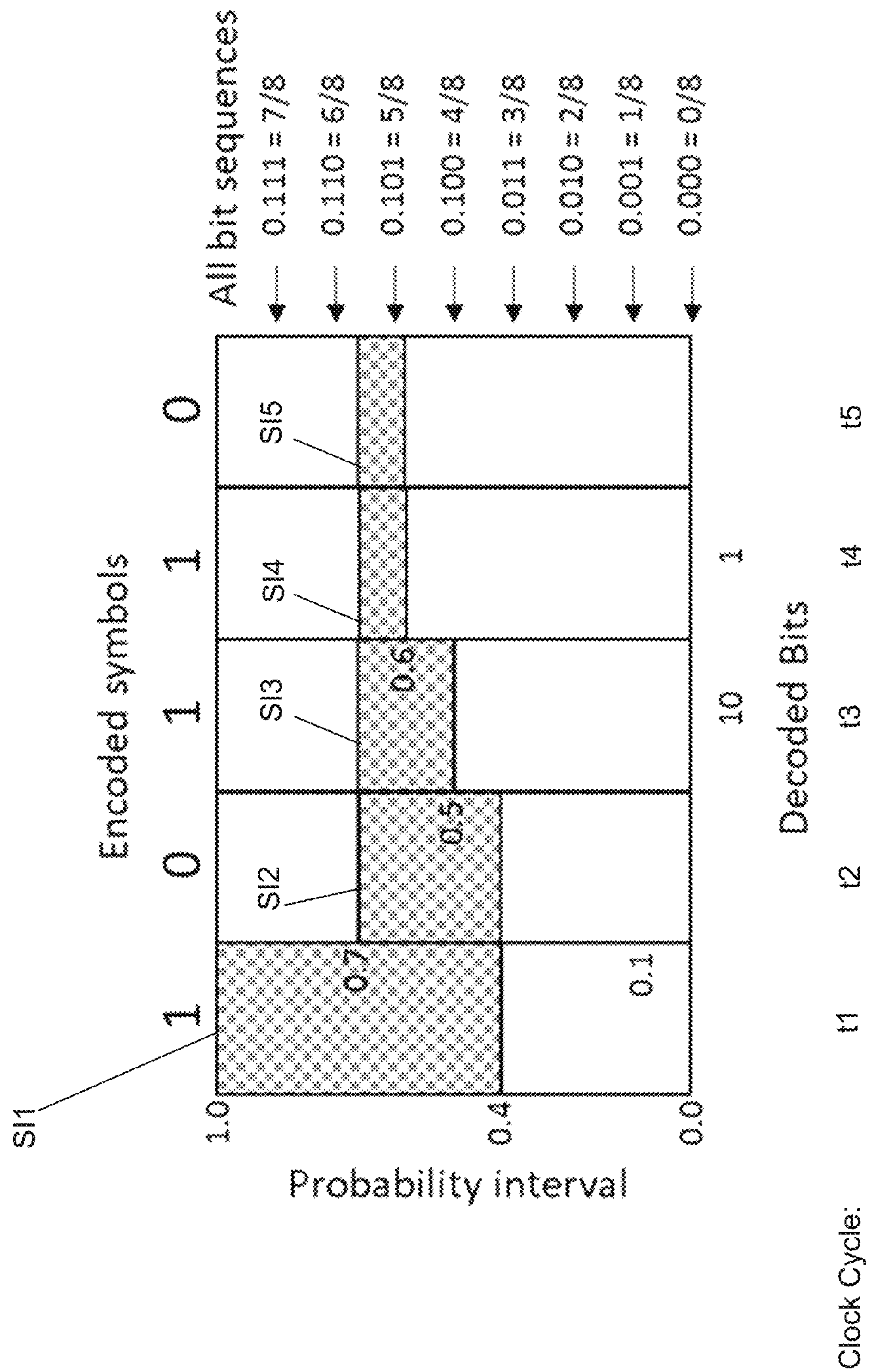
FIG. 20 illustrates an example of decoding one of the codewords shown in FIG. 10 to generate an output bit sequence.

As further shown in FIG. 20, the first probability interval during clock cycle t1 extends from 0.0 to 1.0. As noted above, there are two "0"s in the codeword and the total number of symbols in the codeword is 5. Accordingly, the partition between the upper and lower subintervals in this example is at 0.4. The first bit of the codeword is a "1" thereby designating during clock cycle t1 the upper subinterval SI1 in FIG. 20 that has a length of 0.6. During clock cycle t2, the selected subinterval during clock cycle t1 becomes the new probability interval. Since, during clock cycle t2, there are four codeword symbols remaining, of which two symbols are "0"s, the partition is set at half (2/4) the length of the new probability interval, as measured from the lower bound of the probability interval (0.4). Accordingly, the partition is located at 0.7, and the second codeword symbol, which is a "0" selects the lower subinterval, which is bounded by 0.4 and 0.7.

During these two intervals the first bit of the bit sequences that fall within the probability intervals during clock cycles t1 and t2 is either a "0" or a "1". Accordingly, not decoded bits of the bit sequence cannot yet be identified. During clock cycle t3, however, three codeword symbols remain of which one is "0" to thereby partition the new probability interval into a lower subinterval bounded by 0.4 and 0.5 and an upper subinterval bounded by 0.5 and 0.7. Since the third codeword symbol is a "1", the upper subinterval is selected corresponding to only bit sequences 101 and 100. Since both of these sequences have the same first two bits, "10", these bits may be output.

During clock cycle t4, the upper interval bounded of the new probability interval bounded is selected by the fourth codeword symbol, which is a "1". The selected subinterval corresponds to sequence 101, and, therefore, the last bit (a "1") is output. No other bits are output during clock cycle t5.

The above example illustrates how probability intervals and subintervals within those intervals are selected by incoming codeword symbols may be used to decode the codeword to output a corresponding bit sequence. A fixed-point precision scheme for decoding incoming codewords, such that the codeword symbols and or the decoded bit sequences are represented by a fixed number of digits, whereby the decoded bit sequence is output every n clock cycles will next be described with reference to FIGS. 21-27.

Generally, the decoding process is implemented successively; i.e., processing one encoded symbol at a time. In this case, decoder 836, for example, need not wait until the entire codeword has been received and is available for processing. Rather, decoding may begin soon as the first encoded symbol is available. For a codeword length n, the decoder engine runs n times to successively process each symbol of the codeword. Put another way, each symbol of the received codeword is processed during a respective clock cycle, such that, after n clock cycles, the entire codeword may be decoded and the corresponding bit sequence is output, although with each clock cycle, a variable number of bits may be decoded.

Figure 21:
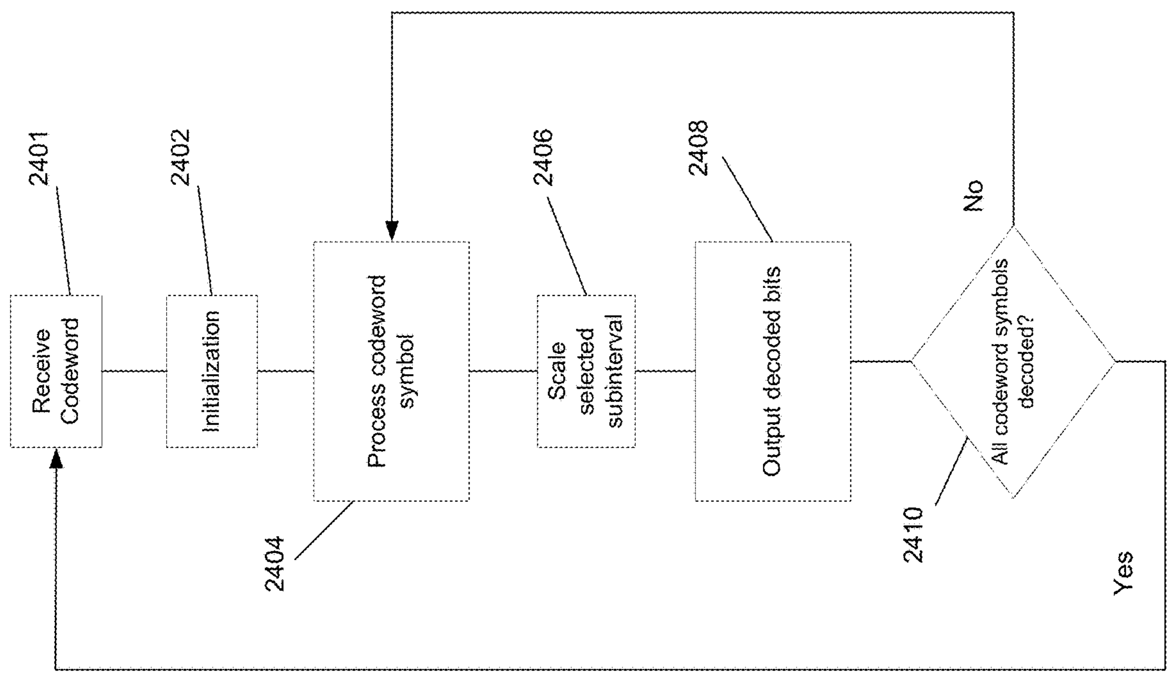
FIGS. 21-26 and 27*a*-27*c* illustrate steps of a decoding method consistent with a further aspect of the present disclosure.

FIG. 21 illustrates a flow chart of a process 2400 for decoding a received codeword consistent with an aspect of the present disclosure. In a first step (2401), a codeword is received. Next, various parameters used in decoding the received codeword are initialized (step 2402), and, in third step (2404) a symbol of the codeword is processed. In step 2406, a selected subinterval is scaled, and, in step 2408, decoded bits are output to a temporary buffer. In step 2410, once all decoded bits of the sequence have been decoded, such bits are output, and a new codeword is received. Otherwise, the next codeword symbol is processed.

Figure 22:
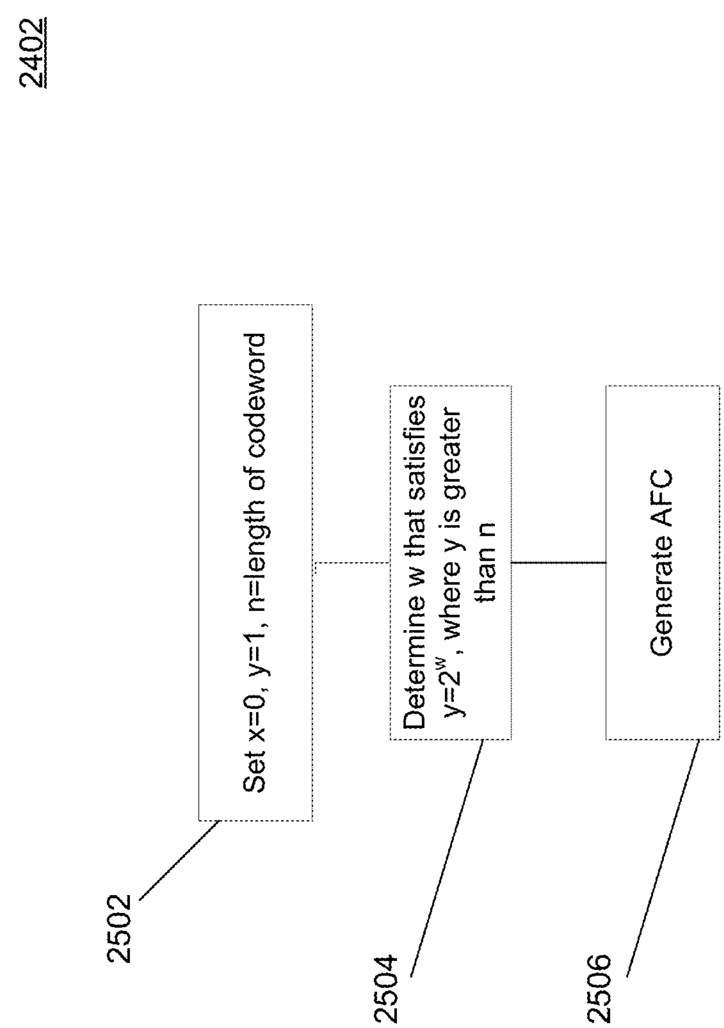

FIG. 22 illustrates initialization step 2402 in greater detail. Parameters x and y, noted above, are set to 0 and 1, respectively, and n is set to be equal to the length of the codeword, i.e., the number of symbols in the codeword. x corresponds to the sequence of decoded bits. When the last encoded symbol is processed after n clock cycles, for example, x represents the complete sequence of information bits.

In step 2504, w is calculated to satisfy $y=2^w$, wherein y is the lowest integer greater than n. For example, if n is equal to 5, the lowest integer that is greater than 5 and satisfies $y=2^w$ is 8, such that w=3 ($2^3=8$). The AFC is generated based on the codeword length n and a desired distribution (step 2506). As noted above, the AFC corresponds to the codeword symbols remaining after particular codeword symbol has been output and the number of such remaining codeword symbols designating particular amplitudes.

In this example, one or more of x, y, the selected subinterval, and the updated AFC may constitute a fixed-point representation of the codeword.

The IPI used in decoding the received codeword may be identical to the IPI model initially generated by encoder 402. During each clock cycle or stage of the decoding process, the IPI is partitioned according to the AFC such that the length of each subinterval of the IPI is proportional to the length of the corresponding subintervals on AFC, as in the encoding process described above. The encoded symbol sequence is compressed according to the AFC model such that the final selected probability interval on IPI includes the data sequence. See, for example, time interval t5 of FIG. 20.

Figure 23:
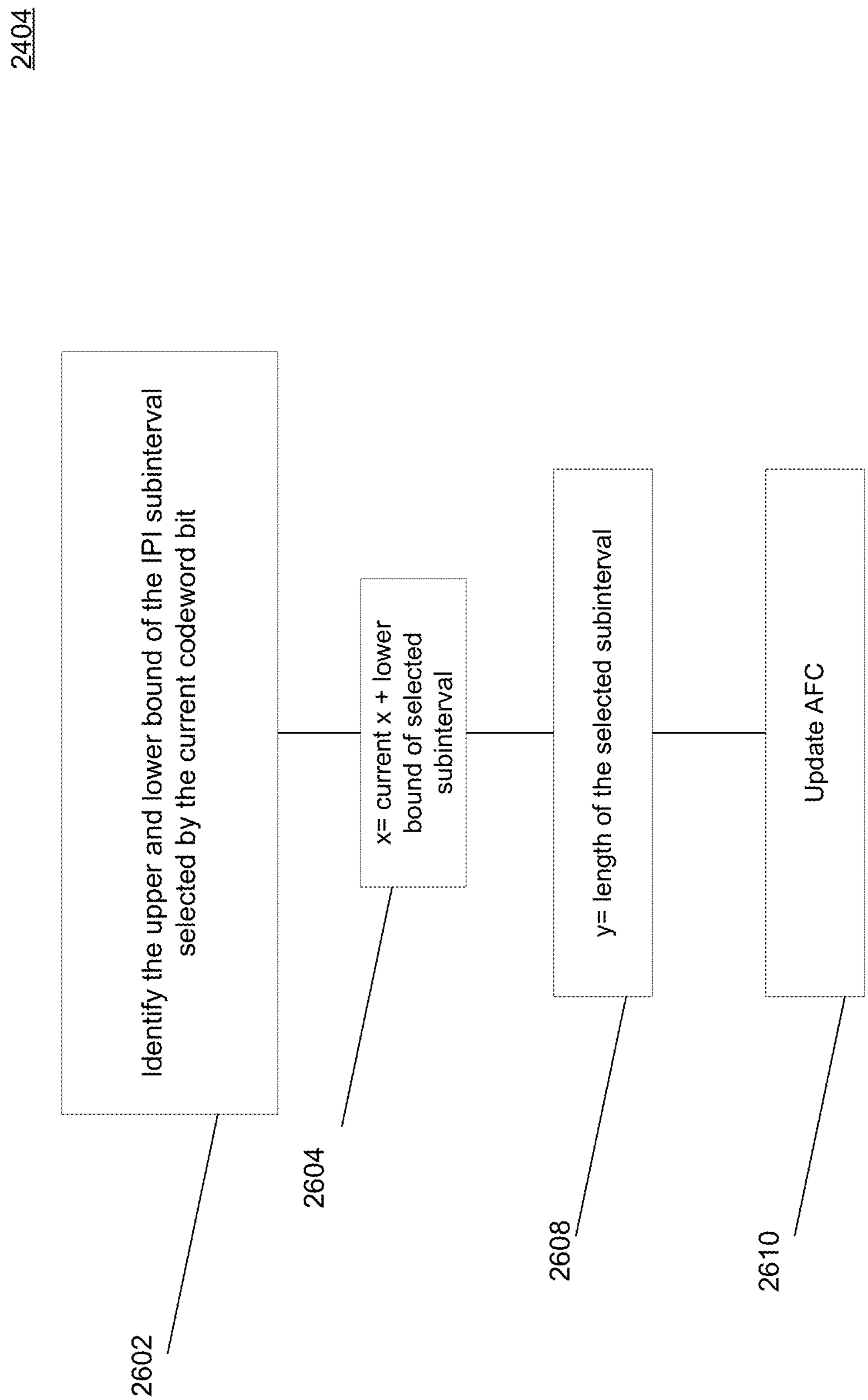
Figure 24:
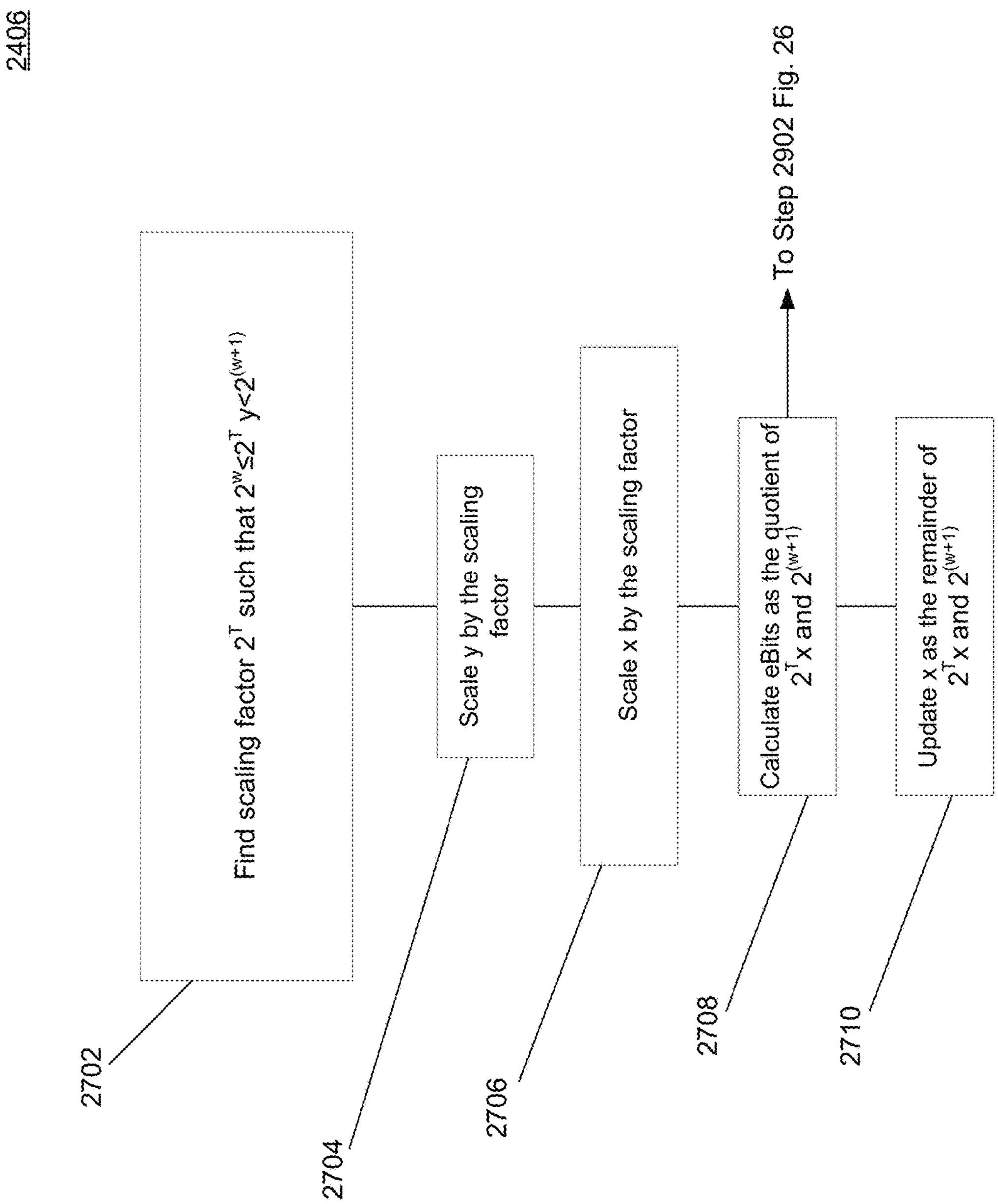
Figure 25:
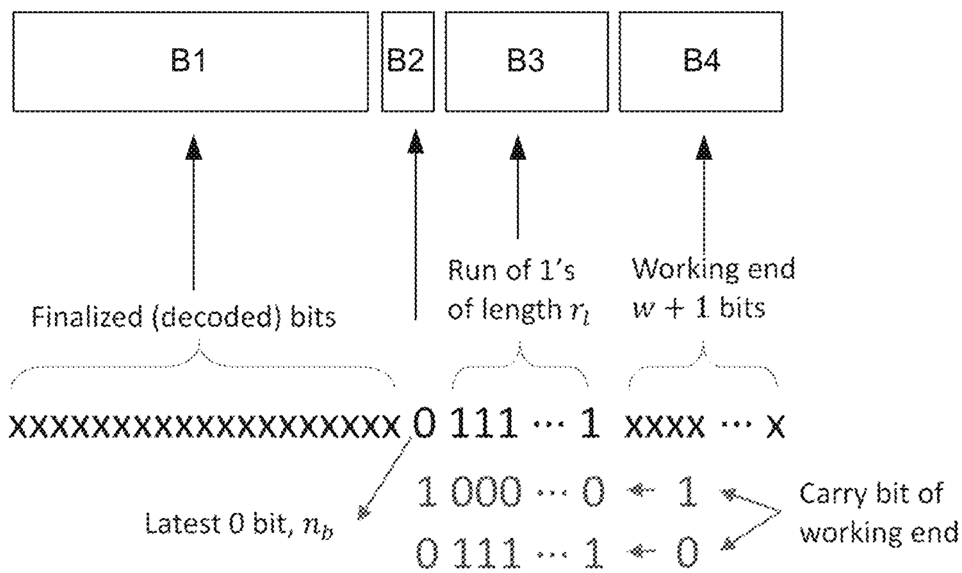
Figure 26:
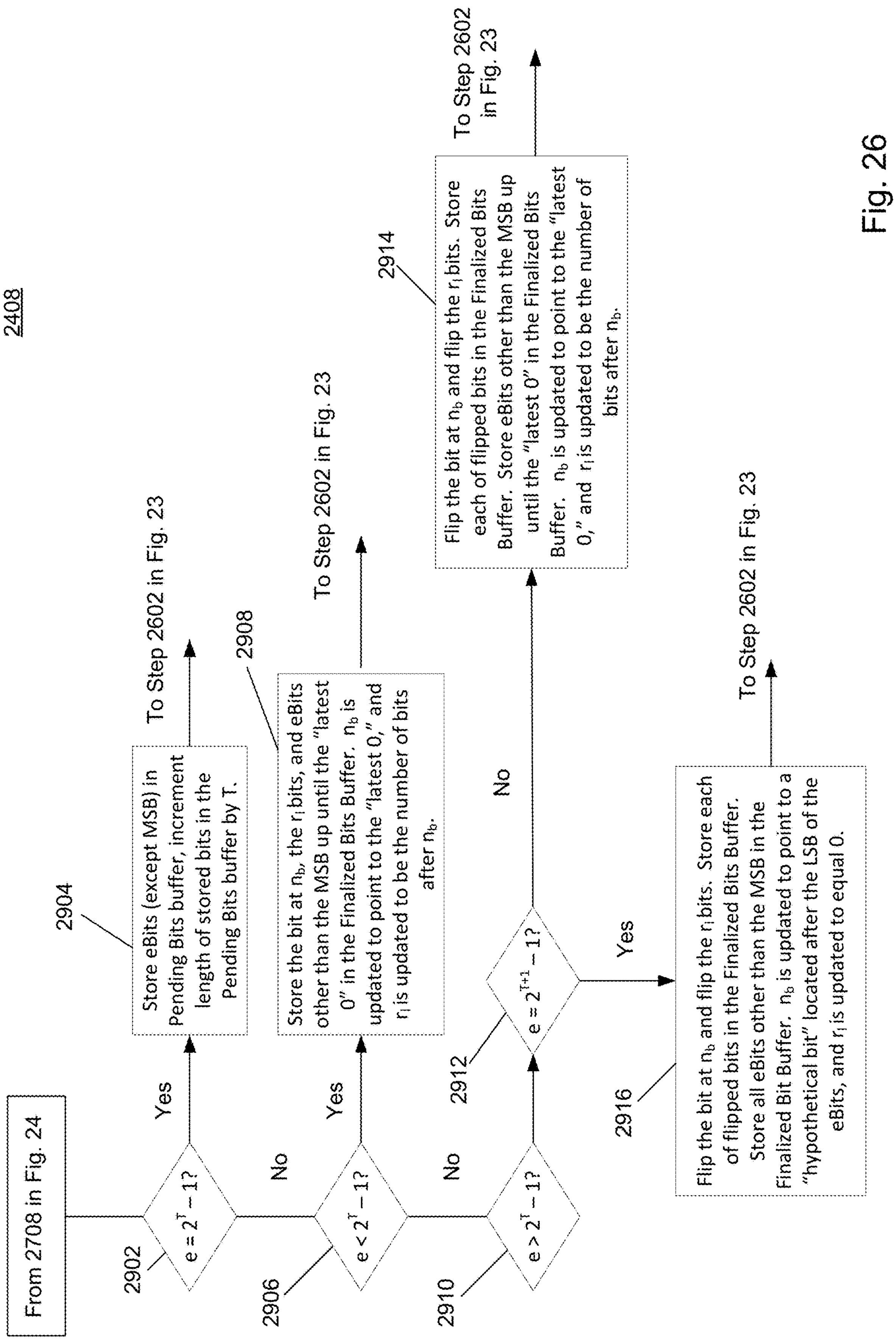

As shown in FIG. 23, which shows step 2404 in greater detail, once the AFC and the IPI are defined, the upper and lower bounds of each subinterval may be defined, and the codeword symbol selects one of the subintervals. For example, if the IPI is divided into "upper" and "lower" subintervals, and x falls within the upper subinterval, that "upper" subinterval is selected (step 2602). x may then be updated by adding the beginning of the selected subinterval to the current x (step 2604), and y may be replaced by the length of selected subinterval (step 2602). The AFC model may also be updated as the frequency count of one of the symbols has changed (e.g., after one of the codeword symbols has been processed, the total number of remaining symbols, as well as the types of symbols, has changed).

In order to decode the next codeword symbol, the selected subinterval should be large enough to be refined by the updated AFC model with no information loss from the AFC model. This is performed by determining a scaling factor, $2^T$, such that the selected subinterval on IPI satisfies $2^w \leq y*2^T < 2^{(w+1)}$ (step 2702). Both y (step 2704) and x (step 2706) are scaled, i.e., multiplied by, the same factor, $2^T$. Next, "eBits" (discussed in greater detail below) are calculated as the quotient of $2^T x$ and $2^{(w+1)}$ (step 2708), and x is updated as the remainder of $2^T x$ and $2^{(w+1)}$ (step 2710).

The decoding procedure described above may be repeated until the last codeword symbol is processed. At each step, x and y parameters are updated and scaled as noted above. Although the bit width length of y is always less than or equal to w+1, the bitwidth length of x increases to a maximum equal to the to the number of input information bits when the decoding procedure is completed. For a practical implementation, in which the length of the input bit sequences can be a finite arbitrarily large, currently available circuitry may not be able to accommodate a very large bit width length for x. In addition, the encoder and decoder modules may be used to accommodate bit sequences at different data rates, such that, for a fixed FEC overhead, the bit width length of x may be different from one data rate to another. Accordingly, the encoder and decoder preferably should also accommodate such different rates.

Consistent with a further aspect of the present disclosure, the most significant (MSB) bits of x may be temporarily stored in a buffer or other memory, which it is determined that such MSB bits will not change due to subsequent processing of remaining codeword symbols due to carry bits. That is, according to principles of binary addition, in which when an integer number is incremented by 1, all bits from the latest 0 bit (0 bit with least binary weight) to the end (bit with binary weight $2^0$) is affected by the addition operation. The most significant 0 bit turns to 1, and all the 1 bits after that turn to 0. No bit with more significant weight than such "latest 0 bit" is changed. Similarly, decoded bits may be output to the temporary buffer as finalized bits prior to output, since they will not change due to further processing. FIG. 28 illustrates registers or buffers B1 to B4 that may respectively store four parts of x after scaling by $2^T$.

Buffer B1, the temporary buffer noted above (also referred to herein as the "Finalized Bits Buffer"), may store the bits that have been decoded, and buffer B2 may store a zero bit ("latest 0 bit"). The latest 0 bit is referred to herein as $n_b$. $n_b$ is initialized at 0 but may change to 1 depending on the carry bit from the series of bits in buffer B4 (the "working end w+1 bits"). The third part of x is a sequence of 1 bits of variable length $r_l$ and may be stored in a third buffer B3 (also referred to herein as the "Pending Bits Buffer"), and the fourth part of x has a length of w+2 bits. The MSB of the fourth part of x constitutes a carry bit for the rest of the sequence. If this carry bit is 0, it does not affect the previous bits. However, if the carry bit is 1, all the bits from the latest 0 bit to the end of the series of 1 bits of length $r_l$ are flipped. By providing $n_b$ and $r_l$, x need only hold the last w+2 bits Scaling x by a proper power of 2, for example $2^T$, is equivalent to shift left x by T bits. e may be defined as the quotient of $2^T$x and $2^{w+1}$ and is the ejected bits of $2^T$x from buffer B4 storing the "working" w+1 least significant bits of x (see FIG. 25). The bit width length of e can be up to T+1 bits, and the binary representation of e is referred to eBits. (see step 2708 in FIG. 24). The MSB of the ejected bits (bit with binary weight $2^T$) is the carry bit which determines whether $n_b$ and the sequence of 1 bits following it are flipped. The remainder of the ratio of $2^T$x and $2^{w+1}$ is the new x or updated x. In this case the bitwidth length of x is restricted to at most w+1 bits. A method to determine whether to send bits to buffer B1 will next be described with reference to FIG. 26.

As noted above, e is calculated in step 2708 of FIG. 24. In step 2902, a determination is made as to whether $e=2^T-1$. If yes, the eBits (except MSB) are stored in the Pending bits buffer (B2). In addition, the length (or bit length) of stored bits in the Pending Bits buffer is incremented by T, and the method advances to the next step of inputting the next codeword symbol, followed by step 2602 and the remaining steps discussed above (Step 2904).

If e does not equal $2^T-1$, the method advances to step 2906 in which a determination is made as to whether $e<2^T-1$. If so, the bit at $n_b$, the $r_l$ bits, and eBits other than the MSB up until the "latest 0" are stored in the Finalized Bits Buffer (B1). In addition, $n_b$ is updated to point to the "latest 0," and $r_l$ is updated to be the number of bits after $n_b$ (step 2908). The next codeword symbol is received, and the method advances to step 2602 and the remaining steps discussed above.

If $e>2^T-1$ (step 2910), a further determination is made as to whether $e=2^{T+1}-1$ (step 2912). If so, the bit at $n_b$ and the $r_l$ bits are flipped, i.e., changed from 0 to 1 or vice versa. The flipped bits are then stored in the Finalized Bits Buffer (B1). In addition, all eBits other than the MSB are stored in the Finalized Bits Buffer (B1). $n_b$ is updated to point to a location after the LSB of the eBits, and $r_l$ is updated to equal 0 (step 2916). Since there is no bit after the LSB of the eBits, such location is referred to as a "hypothetical bit." The next codeword symbol is received, and the method advances to step 2602 and the remaining steps discussed above.

It is noted that, if $e=2^{T+1}-1$, the eBits will not be flipped by processing further symbols because x is upper bounded by x+y, which is the upper bound of the selected subinterval. It is further noted that the finalized decoded bits are common throughout the range of the selected subinterval.

If e is not equal to $2^{T+1}-1$, the bit at $n_b$ and the $r_l$ bits are flipped. Each of flipped bits in then stored in the Finalized Bits Buffer (B1). In addition, eBits other than the MSB up until the "latest 0" are stored in the Finalized Bits Buffer (B1). Further, $n_b$ is updated to point to the "latest 0," and ri is updated to be the number of bits after $n_b$ (step 2914). The next codeword symbol is received, and the method advances to step 2602 and the remaining steps discussed above.

An example of the decoding method consistent with the present disclosure will next be described with referenced to FIGS. 30*a*-30*c* and 31 in which the codeword having the symbols noted above, 10110, is decoded to yield bit sequence 101.

Figure 27A:
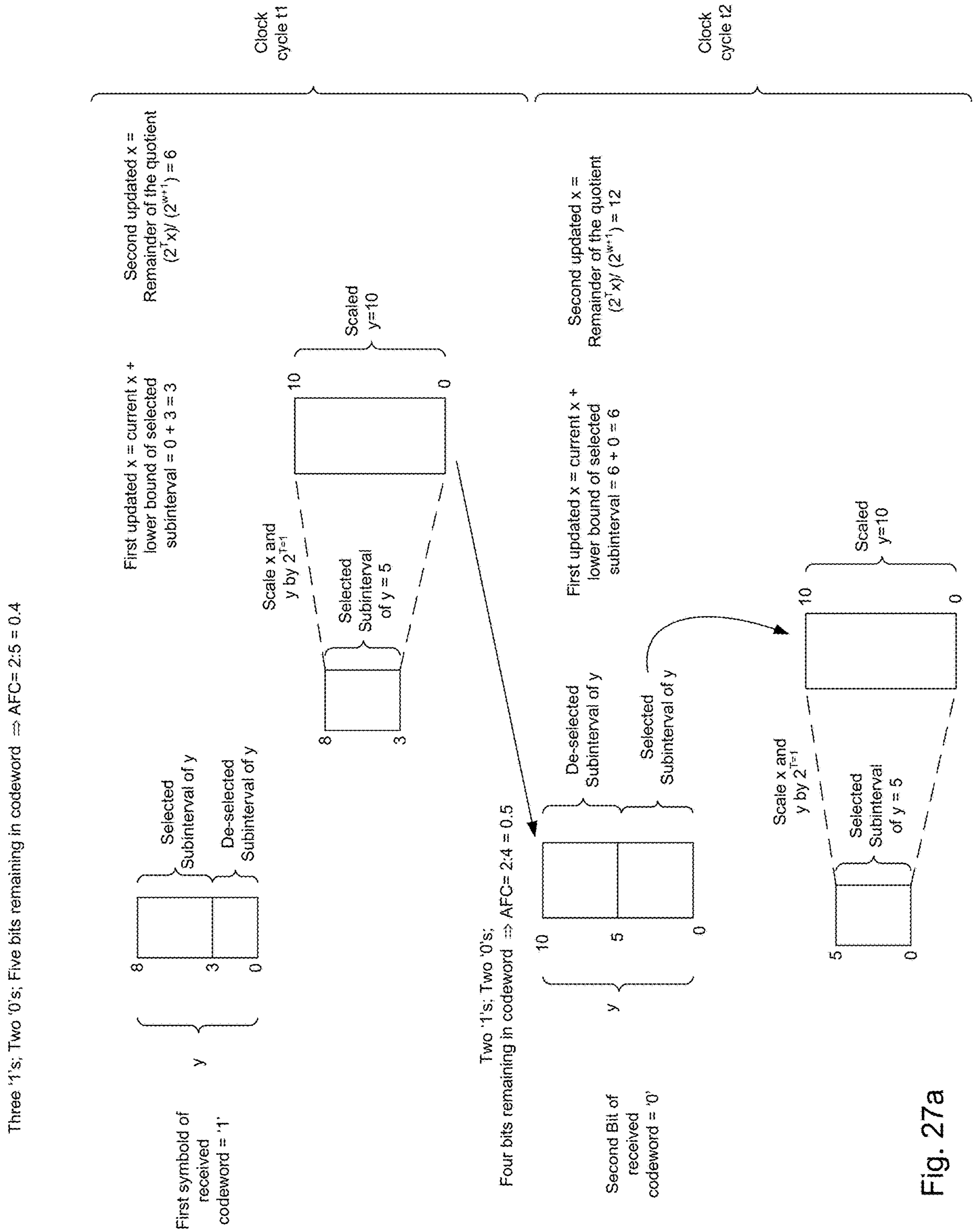

During clock cycle t1 shown in FIG. 27*a*, the AFC is set to ⅖ (two "0"s and five bits or symbols total). Accordingly, the probability interval (IPI) is set to 8 for reasons discussed above in connection with FIG. 19*a*. Based on the AFC, y is partitioned to have a lower subinterval bounded by 0 and 3 and an upper sub-interval bounded by 3 and 8. Since the first symbol (bit in this example) is a "1", the upper subinterval is selected. x is first updated to equal the current x plus the lower bound of the selected interval. Since x was initialized at 0, and the lower bound of the selected subinterval is 3, x is updated to equal 3. x, however, is further updated to equal the remainder of the quotient $(2^T x)/(2^{w+1})$, such that x=6 (T=1 and w=3 for reasons noted above). Y is scaled to have a length of 10.

During clock cycle t2, the second bit, 0, of the codeword is received. The lower subinterval is selected, which is bounded by 5 and 0 based on the updated AFC (two "0"s and 4 bits total). x is first updated to be 6 and further updated as the quotient remainder of $(2^T x)/(2^{w+1})$. The selected subinterval becomes the updated y (IPI), which is then scaled, such that is bounded by 0 and 10, as shown in FIG. 27*a*.

Figure 27B:
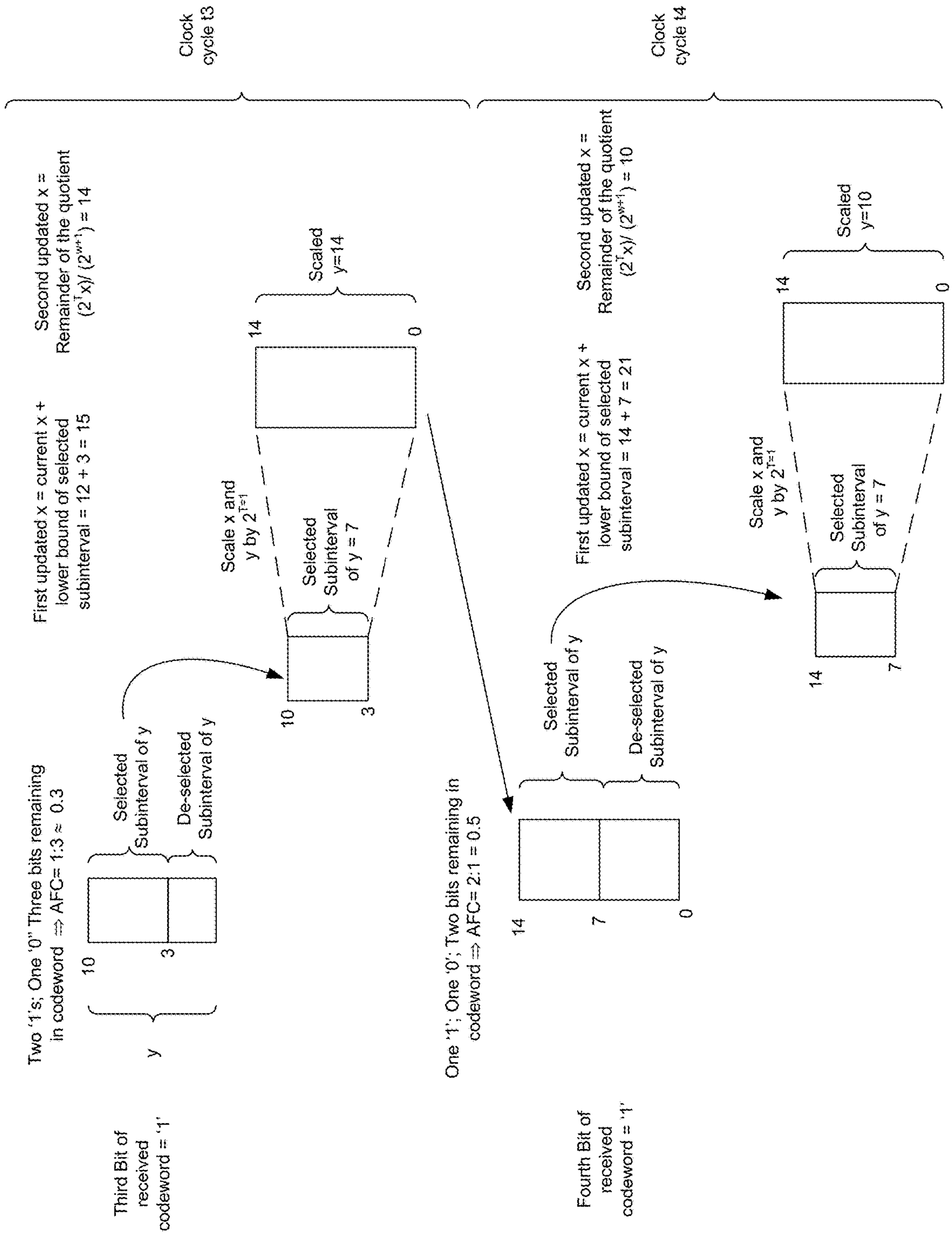

Next, in clock cycle t3 shown in FIG. 27*b*, based on an updated AFC (one "0" and 3 bits total), the upper interval bounded by 3 and 10 is selected by the third bit of the codeword, which is a "1". x is updated to be 15 based on the lower bound of the selected subinterval and further updated to be remainder of $(2^T x)/(2^{w+1})$ or 14. The selected subinterval is then scaled to equal 14, as further shown in FIG. 27*b*.

Figure 27C:
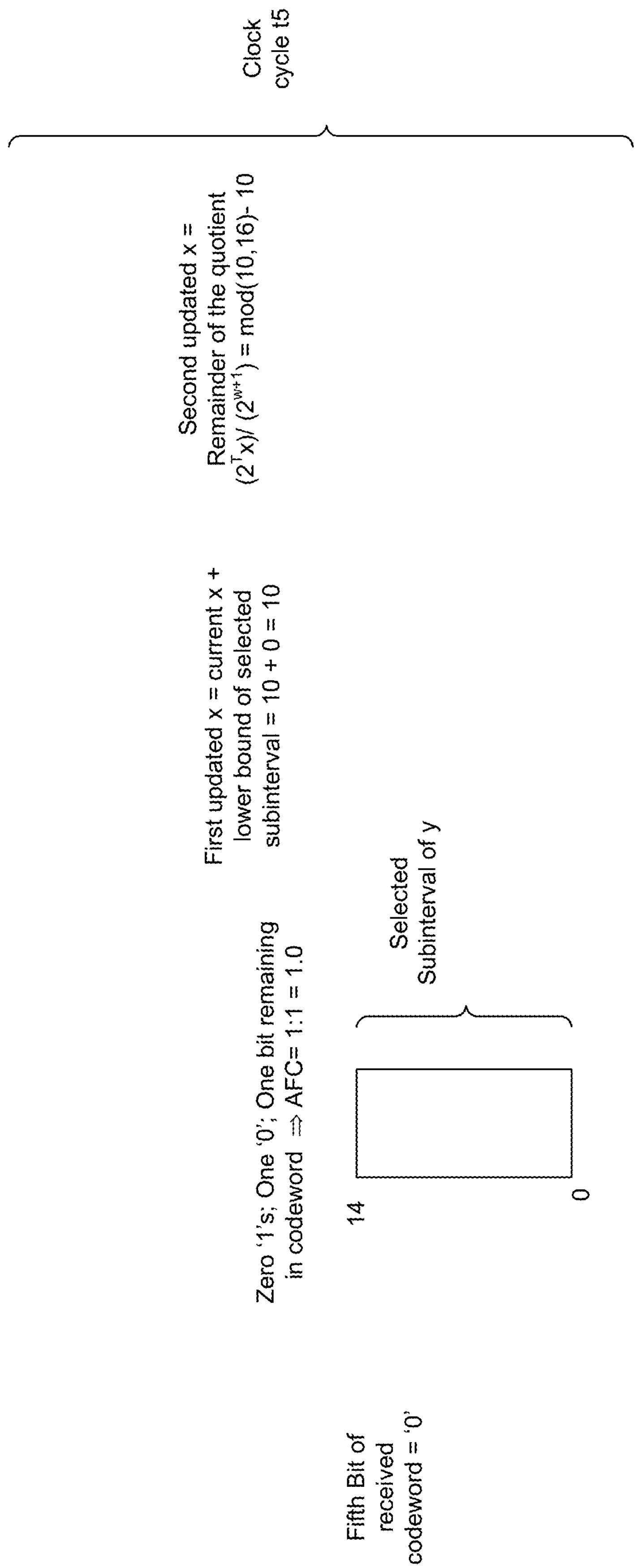

In the next clock cycle, t4, the AFC is updated to be 1:2 (one "0" and two bits total). Since the received fourth bit of the codeword is a "1", the upper subinterval of y is selected. x is updated to be 21 based on the lower bound of the selected subinterval and is further updated to be the remainder of $(2^T x)/(2^{w+1})$ or 10. y is scaled by a factor of 2, so that the scaled and updated y is equal to 14. Lastly, during the fifth cycle, t5, the AFC model is updated based on one "0" and "1" bit remaining in the codeword. x is further updated based on the lower bound of the selected subinterval to equal 10, as shown in FIG. 27*c* and further updated to equal the remainder of the quotient $(2^T x)/(2^{w+1})$ or 0.

FIG. 28 illustrates the contents of buffers B1 to B4. By way of example, additional buffers B5 and B6 are shown as storing the carry bit and eBits noted above, respectively. As shown in FIG. 28, the carry bit is 0 and the ebits equal 0 during both clock cycles t1 and t2. Further during clock cycle t2, however, the latest "0" bit, $n_b$ is stored in buffer B2.

During clock cycle t3, Ebits equal 01, such that the MSB of the eBits is 0. e, therefore, is equal to $2^T-1$ ($2^1-1=1$). Accordingly, per step 2904, the eBits (except the MS) is stored in the Pending Bits buffer (B3), and the length of the stored bits in the Pending Bits buffer is incremented by T=1. Here, the eBit 1 is stored in B3 to thereby create a run of "1" of length rl equal to 1. $n_b$ is stored in B2 is zero.

Next, in clock cycle t4, the eBits equal 3 (binary "11"). Accordingly, the conditions set for the in steps 2901 and 2912 are satisfied, such that bit at $n_b$ is flipped (from 0 to 1) and the bit stored in buffer B3 (the one bit of the Run of "1"s of length rl=1) is flipped (changed from "1" to "0"). Both flipped bits are stored in the Finalized Bit Buffer (B1). In addition, all eBits other than the MS are stored in buffer B1. Accordingly, in this example, the only bit other than the MSB of the eBits is a "1". Accordingly, bit "1", "0", and "1" are stored in the finalized bit buffer (B1) corresponding to the data sequence 101 noted above.

In clock cycle t5, the decoding process terminates for the codeword. A new codeword may then be received and the method returns to step 2401 of shown in FIG. 21.

The decoding algorithm can be terminated in different ways. In one example, DM decoder 910 (shown in FIG. 9) run n−1 times, i.e., for n−1 clock cycles. For the last run (the last clock cycle), the symbol processing is performed. When scaling (steps 2702, 2704, 2706) the following are generated: e=0, and T=0, if x==0; otherwise e=1 and T=0.

The alternative approach is to keep track of the summation of the number of left bit shifts that possibly happens at each run of the decoder module. Let $T_i$ be the number of required left bit sift at the i-th run (clock cycle) of the decoder module 910. $L_i$ satisfies: $L_i=L_{i-1}+T_i$, where $L_i$ is calculated at each clock, and as soon as $L_i$ becomes greater than the total number of desired bits, the algorithm is terminated. The termination procedure in this case is performed by passing e=0, and T=0 if x==0; and e=1 and T=0 otherwise.

As noted above, during each run or clock cycle, encoder module 402, encodes one codeword symbol to realize the desired modulated symbol probability distribution. This will be repeated until all the desired symbols are generated. After n runs (clock cycles) of the encoder engine, the AFC model freezes with all entries equal to zero. Thus, no further symbol is generated as no further refinement happens on IPI.

The decoding process is implemented successively; i.e., processing one symbol at a time. In this case the decoder need not need to wait until the entire encoded symbol sequence is available to start the decoding. Instead, decoder 910 may start the decoding process as soon as the first encoded symbol is received or made available. Fixed-point encoding and decoding allows for a simpler design and can be realized with fewer integrated circuit gates than would otherwise could be achieved with a floating point-based process. In addition, such fixed-point processing may be employed to encode and decode arbitrarily large codewords having any alphabet. Accordingly, the probability distributions can be tailored for any constellation, such as constellation associated with m-QAM modulation formats, where m is an integer greater than or equal to 16, such 16-QAM, 64-QAM, and 256-QAM, and having 3, 4, 5 or more amplitude levels.

In the above examples, each modulated optical signal output from each of the Tx Blocks 12-1 to **12-*n* is associated with a respective laser, such as laser 508 (see FIG. 5) and each carries data indicative of a corresponding codeword. Accordingly, each such modulated optical signal or channel has a desired transmission probability distribution, as further discussed above. Consistent with the present disclosure, however, multiple channels or subcarriers may be output from each of optical source, such as OS-1 shown in FIG. 2**, and each such subcarrier may carry data indicative of a corresponding codeword. Accordingly, each subcarrier may have a desired transmission probability distribution, as further discussed above.

Figure 29:
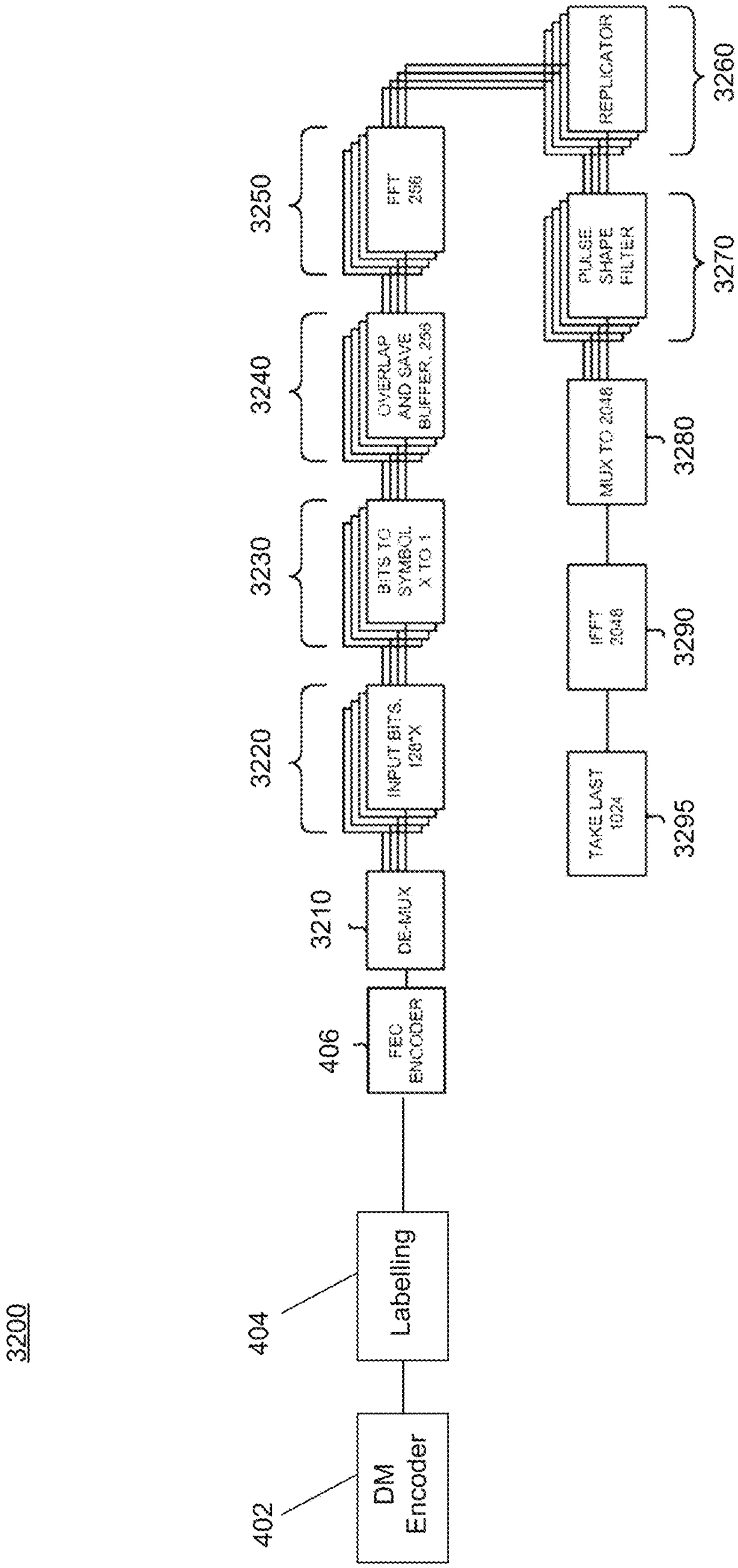
FIG. 29 illustrates an additional example of a portion of an optical transmitter consistent with an aspect of the present disclosure.
Figure 30:
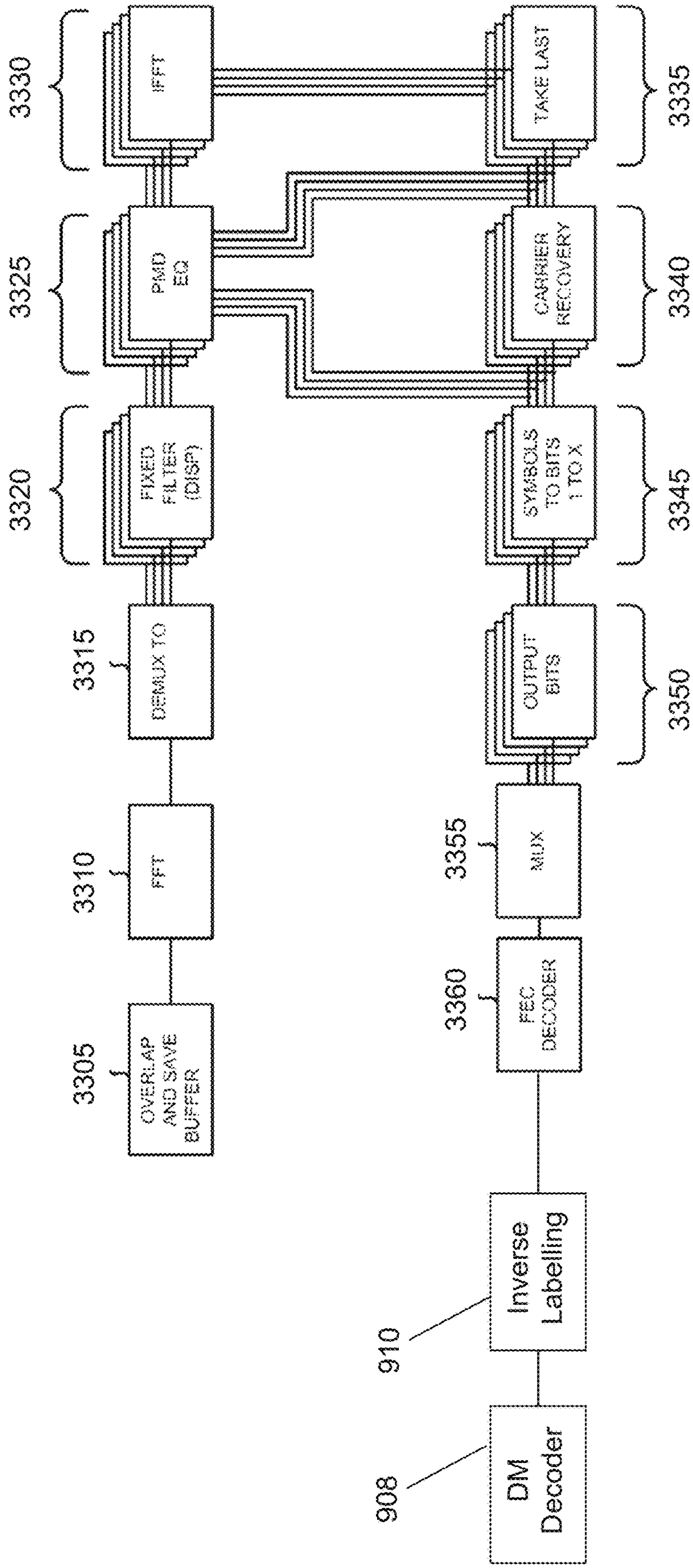
FIG. 30 illustrates an additional example of a portion of an optical receiver consistent with an aspect of the present disclosure.

FIG. 29 shows an example of circuit block CB1-1 that may be employed to generate digital subcarriers and based on such digital subcarrier optical subcarriers or Nyquist subcarriers that may not overlap in frequency may be output from the TX blocks 12. Moreover, such Nyquist subcarriers may each be modulated in accordance with a desired probability distribution, as noted above.

As shown in FIG. 29, CB1-1 (shown as transmitter block 3200) may include a DM encoder (402), labelling (404), and FEC encoder (406) circuits similar to or the same as that discussed above in connection with FIG. **4*a*. However, FEC encoder circuit 406 may, instead of supplying bits or symbols to QAM mapper 408, supply such bits or symbols to a demultiplexer or de-mux component 3210, which demultiplexes the bits received from FEC encoder 406. In this example, de-mux component 3210 may separate the stream of bits into groups of bits associated with four subcarriers, however, it is understood that de-mux components may separate the received bits into another number of subcarriers. In some implementations, the bits may be separately or jointly encoded for error correction in de-mux component 3210, using forward error correction. De-mux component 3210 may use the error correction encoding to separate the bits for the different subcarriers. De-mux component 3210 may be designed to systematically interleave bits between the subcarriers. De-mux component 3210 may also be designed to generate timing skew between the subcarriers to correct for skew induced by link 16 (see FIG. 1). De-mux component 3210 may provide each group of bits to a corresponding input bits component 3220. Input bits component 3220** may process 128*X bits at a time, where X is an integer.

Bits to symbol component 3230 may map the bits to symbols on the complex plane. For example, bits to symbol component 3230 may map a number of bits to a symbol in a 16 QAM constellation, although m-QAM constellations are contemplated herein, where m is an integer that is greater than or equal to 16. Overlap and save buffer 3240 may buffer a predetermined number of symbols. Overlap and save buffer 3240 may receive a desired number of symbols at a time from bits to symbol component 3230. Thus, overlap and save buffer 3240 may combine new symbols, from bits to symbol component 3230, with the previous symbols received from bits to symbol component 3230.

FFT component 3250 may receive symbols from overlap and save buffer 3240 and convert the symbols to the frequency domain using, for example, a fast Fourier transform (FFT). FFT component 3250 may form frequency bins or bit sequences corresponding to frequency components of the subcarriers as a result of performing the FFT. Replicator component 3260 may replicate the frequency bins to form additional frequency bins (e.g., for T/2 based filtering of the subcarrier) to thereby increase the sample rate.

Pulse shape filter 3270 may apply a pulse shaping filter to the frequency bins to calculate transitions between the symbols and the desired spectrum so that the corresponding optical subcarriers can be packed together spectrally during transmission. Pulse shape filter 3270 may also be used to introduce timing skew between the subcarriers to correct for timing skew induced by link 230. Mux component 3280 may receive the subcarriers (from the pulse shape filters 3270) and multiplex them together to form an element vector.

IFFT component 3290 may receive the element vector to convert back to the time domain. IFFT component 3290 may convert the signal to the time domain using, for example, an inverse fast Fourier transform (IFFT). Take last component 3295 may select a predetermined number of the last samples output from IFFT component 3290 and output such samples to DAC 310 and DAC 312, for example.

Figure 5:
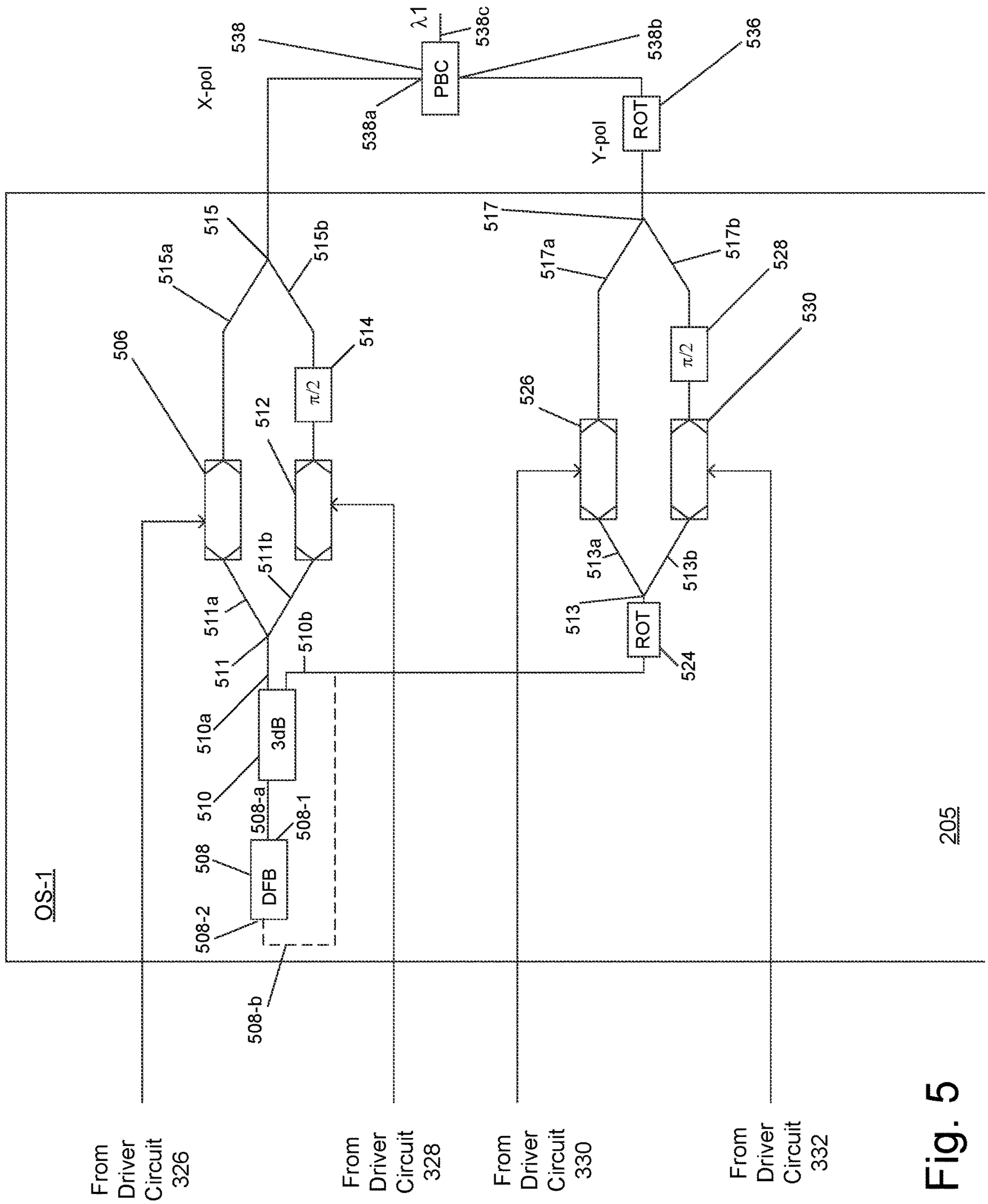
FIG. 5 illustrates a portion of transmit photonic integrated circuit consistent with the present disclosure.

While FIG. 5 shows circuitry 3200 as including a particular quantity and arrangement of functional components, in some implementations, circuitry 3200 may include additional functional components, fewer functional components, different functional components, or differently arranged functional components.

As noted above, the outputs of the DAC 310 and 312 may provide inputs to driver circuits 326, which, in turn, supply drive signals to modulators 506 and 512. As further discussed above, based on such drive signals, the modulators output modulated optical signals. Here, such modulated optical signals may include optical subcarriers corresponding to the digital subcarriers discussed in connection with FIG. 29.

It is noted that additional circuitry, similar to that shown in FIG. 29 may also be employed to generate outputs to DACs 314 and 316 that supply signals to drivers 330 and 332 (see FIG. 3). As noted above, such drive signals may be used to drive modulators 526 and 530 to output optical subcarriers. The optical subcarriers output at 515 in FIG. 5 may be carried by a TE or X component of the modulated optical signals, while the optical subcarriers generated at 517 in FIG. 5 may be carried by the TM or Y component of the modulated optical signal.

As noted above, optical signals are transmitted from a transmit end of optical communication path or link 16 to a receive end. Optical subcarriers, as further noted above, similarly propagate along the path or link 16 to a receiver. The optical subcarrier, in a manner similar to that described above, are likewise provided to a an optical demultiplexer 20 or power splitter shown in FIG. 1, and power split portions of the optical subcarriers are provided to a polarization beam splitter, as shown in FIG. 7. The TE and TM components of the optical subcarriers are mixed with local oscillator light in a manner similar to that described above, and the resulting mixing products are provided to photodiodes 709, 711, 713, and 715, as further shown in FIG. 7.

The outputs of the photodiodes are subject to further processing by circuitry in circuit block CB3-1, including analog-to-digital conversion (ADC) circuits 818, 820, 822, and 824 show in FIG. 8.

As further shown in FIG. 8, the outputs of ADC circuits 818, 820, 822, and 824 provide digital outputs that may be processed by a digital signal processor (DSP) including, in the case of subcarrier transmission noted above, the circuitry shown in FIG. 30. Namely, samples output from ADC circuits 818, 820, 822, and 824 may be provided to overlap and save buffer 3305, which may receive such samples from the ADC circuits, and combine those samples with previously received samples to form vector elements. FFT component 3310 may receive the vector elements from overlap and save buffer 3305 and convert the vector elements to the frequency domain using, for example, a fast Fourier transform (FFT). FFT component 3310 may convert the vector elements to corresponding frequency "bins" or sequences as a result of performing the FFT.

De-mux component 3315 may receive the frequency bins from FFT component 3310. De-mux component 3315 may demultiplex the frequency bins to element vectors, for example, one element vector for each of subcarrier. Filter 3320, which may be a fixed filter, may apply a filtering operation for, for example, dispersion compensation and may compensate for the relatively slow varying parts of the channel. Fixed filter 3320 may also compensate for skew across subcarriers introduced in the link or skew introduced intentionally in one of optical transmitters 12.

PMD component 3325 may apply polarization mode dispersion (PMD) equalization to compensate for PMD and polarization rotations. PMD component 3325 may also receive and operate based upon feedback signals from take last component 3335 and/or carrier recovery component 3340.

IFFT component 3330 may covert the element vectors (after processing by fixed filter component 3340 and PMD component 3325) back to the time domain as a predetermined number of samples. IFFT component 3330 may then convert the element vectors to the time domain using, for example, an inverse fast Fourier transform (IFFT). Take last component 3335 may select the last q (q being a positive integer) samples from IFFT component 3330 and output the q samples to carrier recovery component 3340.

Carrier recovery component 3340 may apply carrier recovery to compensate for transmitter and receiver laser linewidths. In some implementations, carrier recovery component 3340 may perform carrier recovery to compensate for frequency and/or phase differences between the transmit signal and the signal from local oscillator 701 (see FIG. 7). After carrier recovery, the data may be represented as symbols in the QPSK constellation. In some implementations, as described above, the output of take last component 3335 and/or carrier recovery component 3340 could be used to update PMD component 3325.

Symbols to bits component 3345 may receive the symbols output from carrier recovery component 3340 and map the symbols back to bits. For example, symbol to bits component 3345 may map one symbol, in a constellation, to X bits, where X is an integer. In some implementations, the bits could be decoded for error correction using, for example, FEC. Output bits component 3350 may output j*X (j being an integer) bits at a time.

Mux component 3355 may combine the subcarriers together and undo the systematic interleaving introduced in de-mux component 3210 (see FIG. 29). FEC decoder 3360 may process the output of mux component 3355 to remove errors using forward error correction. Next, the output of FEC decoder 3360 may be supplied to inverse labelling circuitry 910, which supplies further outputs to DM decoder circuit 908, as described above. DM decoder 908, in turn, decodes the output of inverse labelling circuit 910 to supply the original bit sequence in a manner the same as or similar to that described above.

Figure 31:
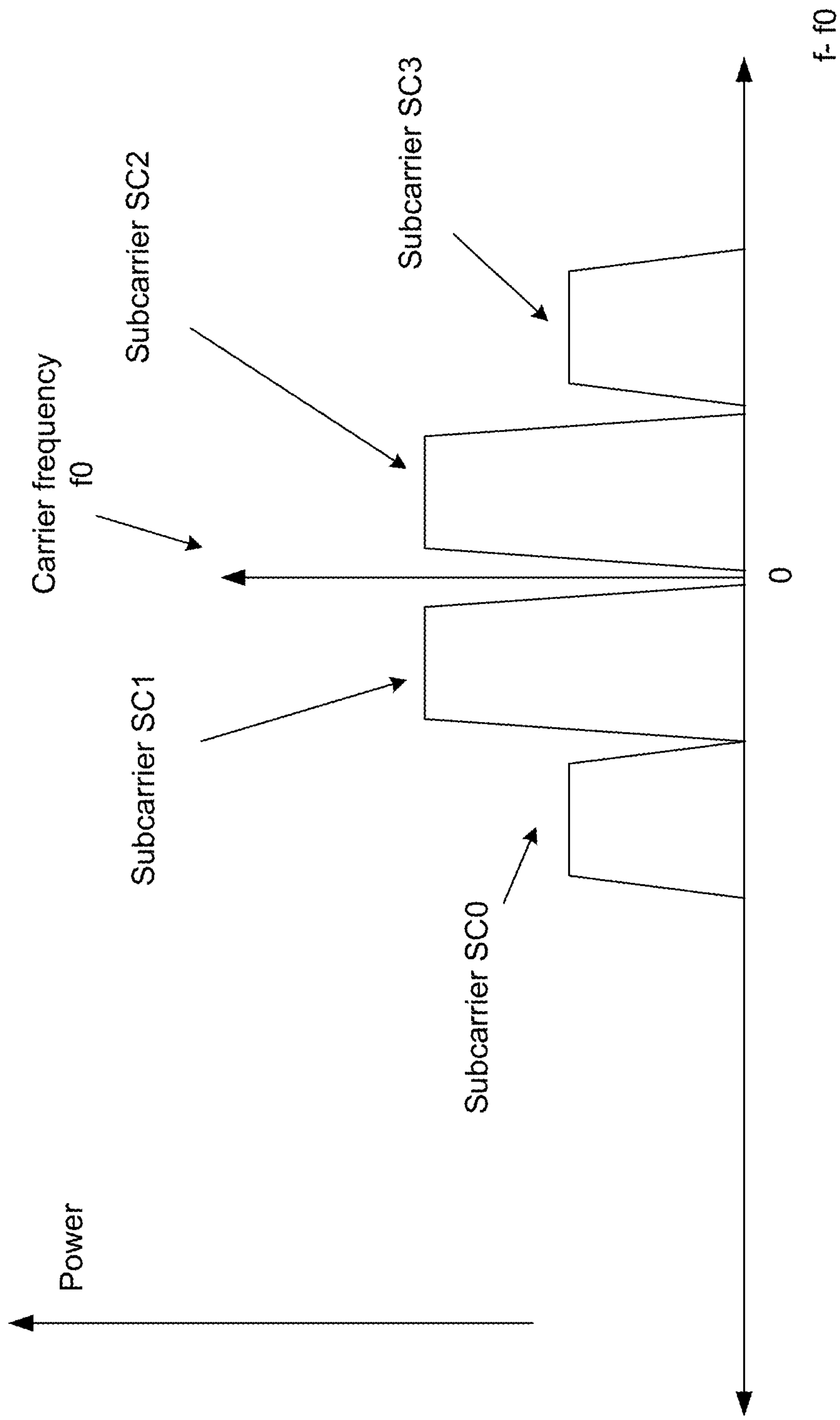
FIG. 31 illustrates an example a spectrum including representations of sub-carriers in the frequency domain consistent with an aspect of the present disclosure.

FIG. 31 illustrates an example of subcarriers SC0 to SC3 output from one of TX blocks 12 (see FIG. 1) including the circuitry shown in FIG. 29. As shown in FIG. 31, subcarriers SC0 to SC3 may not spectrally overlap with one another and may be, for example, Nyquist subcarriers, which may have a frequency spacing equal to or slightly larger than the individual subcarrier baud-rate.

As further shown in FIG. 31, subcarriers may also have spectra that are provided above (subcarriers SC2 and SC3) and below (subcarriers SC0 and SC1) a carrier frequency f0, which may correspond to a center frequency of the laser (e.g., laser 508). As further shown in FIG. 31, subcarriers SC0 and SC3 may, due to transmission impairments along optical communication path 16, be selectively attenuated, and, therefore, may have less power than subcarriers SC1 and SC2. Alternatively, subcarriers SC0 and SC3 may having a higher bit error rate (BER) than subcarriers SC1 and SC2. Consistent with an aspect of the present disclosure, subcarriers SC0 and SC3 may be modulated in accordance with a transmission probability distribution having an associated spectral efficiency (SE) that may be less than the SE (and corresponding transmission probability distribution) of subcarriers SC1 and SC2. In particular, symbols associated with inner points of the constellation associated with subcarriers SC0 and SC3 may be transmitted more frequently and with a higher first probability than symbols associated with outer points of the constellation that are transmitted with a lower second probability. Likewise, symbols associated with inner points of the constellation associated with subcarriers SC1 and SC2 may be transmitted more frequently and with a higher third probability than symbols associated with outer points of the constellation that are transmitted with a lower fourth probability. Further, in this example, the first probability associated with the inner symbols carried by SC0 and SC3 is greater than the third probability associated with the inner symbols carried by SC1 and SC2, such that SC0 and SC3 have a greater SNR (lower SE) to offset impairments noted above. SC1 and SC2 may, in this example, have fewer impairments than SC0 and SC3, and thus may be transmitted with a higher SE than that of SC0 and SC3, and a transmission probability distribution may be selected for SC0 and SC3 to realize such higher SE. Thus, in the example shown in FIG. 31, subcarriers may be transmitted with different transmission probability distributions tailored to a desired SE for each subcarrier so that the transmission rate or baud rate for each subcarrier may be optimized.

Figure 32:
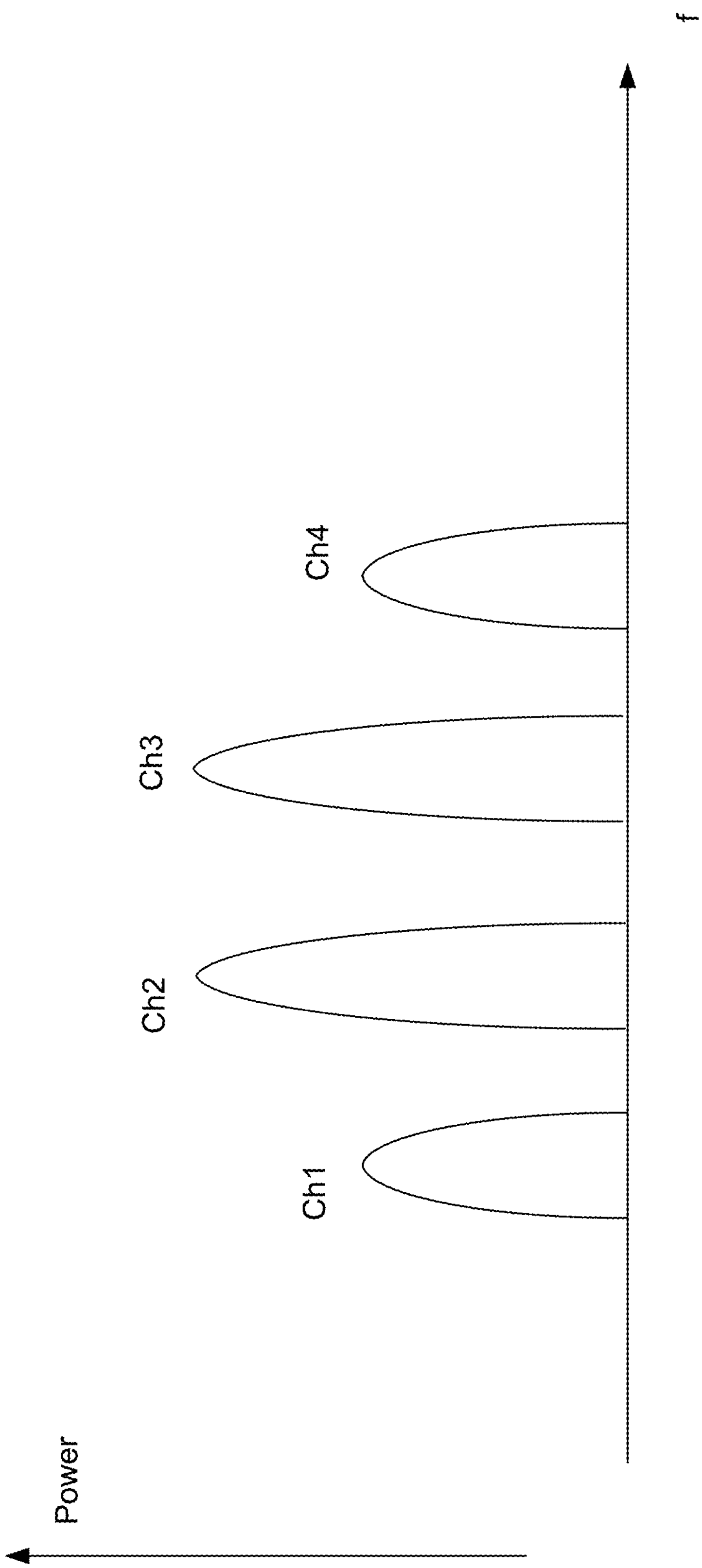
FIG. 32 illustrates an example of a spectrum including representations of channels in the frequency domain consistent with the present disclosure.

As shown in FIG. 32, similar optimization may be achieved in connection with individual channels, in which each channel is generated by light corresponding to a corresponding one of a plurality of lasers, each one having the same or similar construction as laser 508, as opposed to the subcarriers described above which are generated from light output from one laser.

In FIG. 32, channels Ch1 and Ch4 may, due to transmission impairments along optical communication path 16, be selectively attenuated, and, therefore, may have less power than channels Ch2 and Ch3. Alternatively, channels Ch1 and Ch4 may have a higher BER than channels Ch2 and Ch3. Consistent with a further aspect of the present disclosure, channels or optical signals Ch1 and Ch4 may be modulated in accordance with a transmission probability distribution having an associated spectral efficiency (SE) that may be less than the SE (and corresponding transmission probability distribution) of channels or optical signals Ch1 and Ch4. In particular, symbols associated with inner points of the constellation associated with channels ch1 and Ch4 may be transmitted more frequently and with a higher first probability than symbols associated with outer points of the constellation that are transmitted with a lower second probability. Likewise, symbols associated with inner points of the constellation associated with channels Ch2 and Ch3 may be transmitted more frequently and with a higher third probability than symbols associated with outer points of the constellation that are transmitted with a lower fourth probability. Further, in this example, the first probability associated with the inner symbols carried by Ch1 and Ch4 is greater than the third probability associated with the inner symbols carried by Ch2 and Ch3, such that channels Ch1 and Ch4 have a greater SNR (lower SE) to offset the impairments noted above. Channels Ch2 and Ch3 may, in this example, have fewer impairments than channels Ch1 and Ch4, and thus may be transmitted with a higher SE than that of Ch1 and Ch4, and a transmission probability distribution may be selected for Ch2 and Ch3 to realize such higher SE. Thus, in the example shown in FIG. 32, channels may be transmitted with different transmission probability distributions tailored to a desired SE for each channel so that the transmission rate or baud rate for each channel may be optimized.

Figure 33:
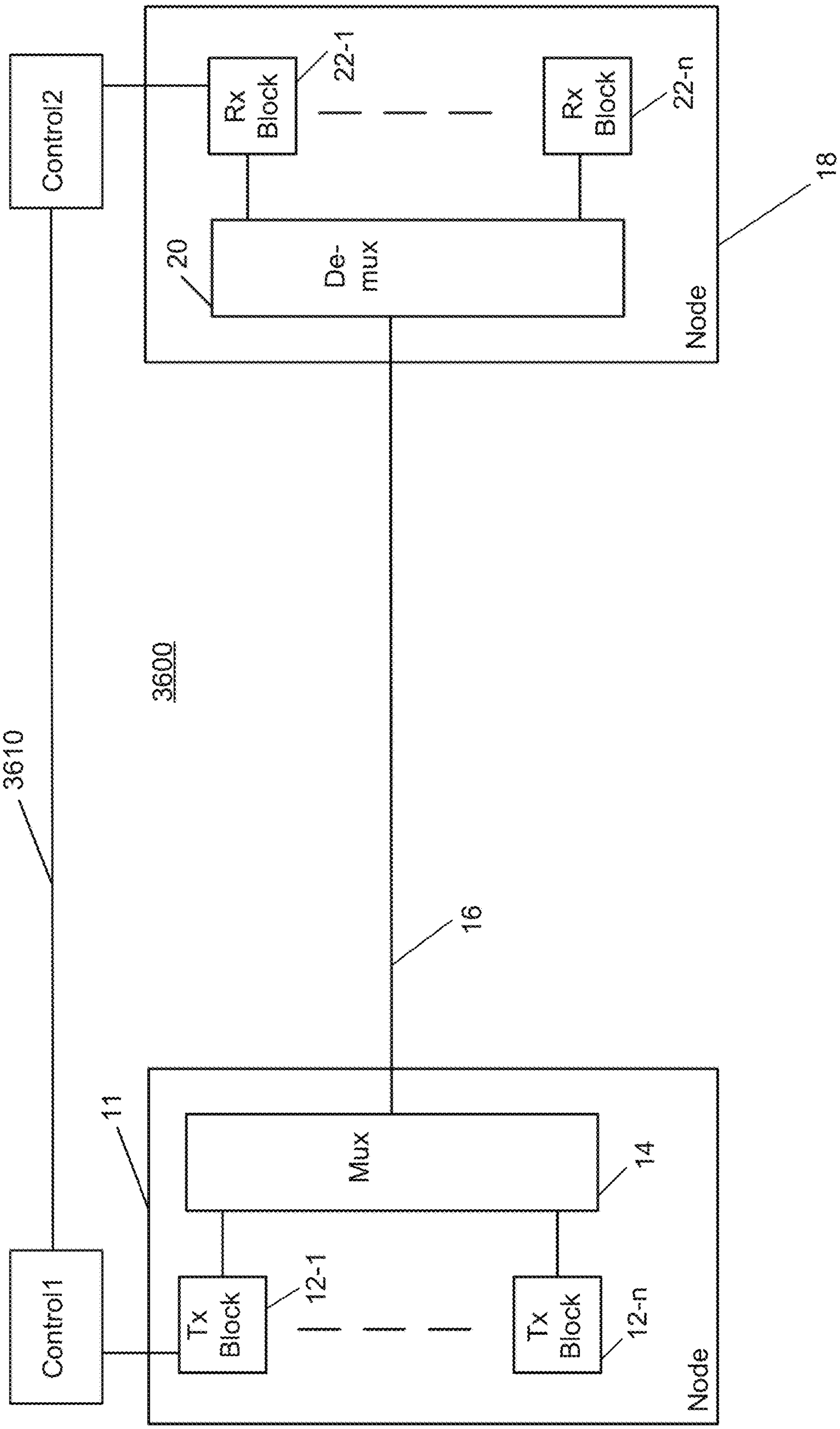
FIG. 33 illustrates a further example of an optical communication system consistent with the present disclosure.

An example of a communication system 3600 consistent with an additional aspect of the present disclosure will next be described with reference to FIG. 33. System 3600 is similar to system 100 described above in connection with FIG. 1 but further includes first and second control circuits Control1 and Control2. Control circuit Control2 may receive network monitoring parameters, such as bit error rate (BER), SNR, and or other information indicative of the performance or such parameters associated with one or more channels and/or subcarriers. Such information may be received from Rx Blocks 22 in node 18 shown in FIG. 33. In one example, such information may be conveyed to control circuit Control1 by an out-of-band signal, such as an optical service channel to node 11. Based on such information, control circuit Control1 may, in turn, provide control signals to one or more of Tx block 12. Based on such control signals, further signals may be provided to DM encoder 402, for example, to generate codewords associated with a desired transmission probability distribution, resulting in an optimized SE. Accordingly, for example, system 3600 may operate based on feedback provided by Rx blocks 22 and control circuit Control2 to optimize the transmission probability distribution of one or more of the channels and/or subcarriers output from one or more of Tx blocks 12 shown in FIG. 33.

In the above example, the codeword symbols may be binary in that each symbol may have one of two values, such as a '1' or a '0'. Consistent with a further aspect of the present disclosure, however, and as shown in FIGS. 34-37, the above techniques involving floating point processing for encoding and decoding codewords may also be extended to non-binary codewords in which each symbol of the codeword may have one of a plurality of values where a number of the plurality of values is more than two. FIG. 34 illustrates a table showing examples of input bit sequences and corresponding codewords for a 64 QAM modulated optical signal having the constellation 3550 shown in FIG. 35. In particular, the table shown in FIG. 34 shows one-to-one mapping of bit sequences of length k=5 to codewords of length n=6 with 4 alphabets {0, 1, 2, 3} or amplitudes along the I and Q axes. Here, as in FIG. 11, the '0' of the alphabet define defines whether the point is along the positive or negative sections of the I and Q axis, and the remaining points defines the magnitude of the I and Q amplitudes that are associated with each point. The coding and decoding of the codewords disclosed herein would require excessive calculations using conventional methodologies, such as infinite precision techniques or lookup tables, and would not be practical. The difficulties associated with such conventional techniques are even more pronounced if the codewords are relatively large, e.g., in excess of 200 symbols or on the other of 1000 symbols. Consistent with the present disclosure, however, any length codeword with any alphabet (and corresponding codewords) may be readily encoded and decoded on a symbol-by-symbol basis and over n clock cycles (where n is the number of symbols in the codeword) using fixed point processing.

Figure 35:
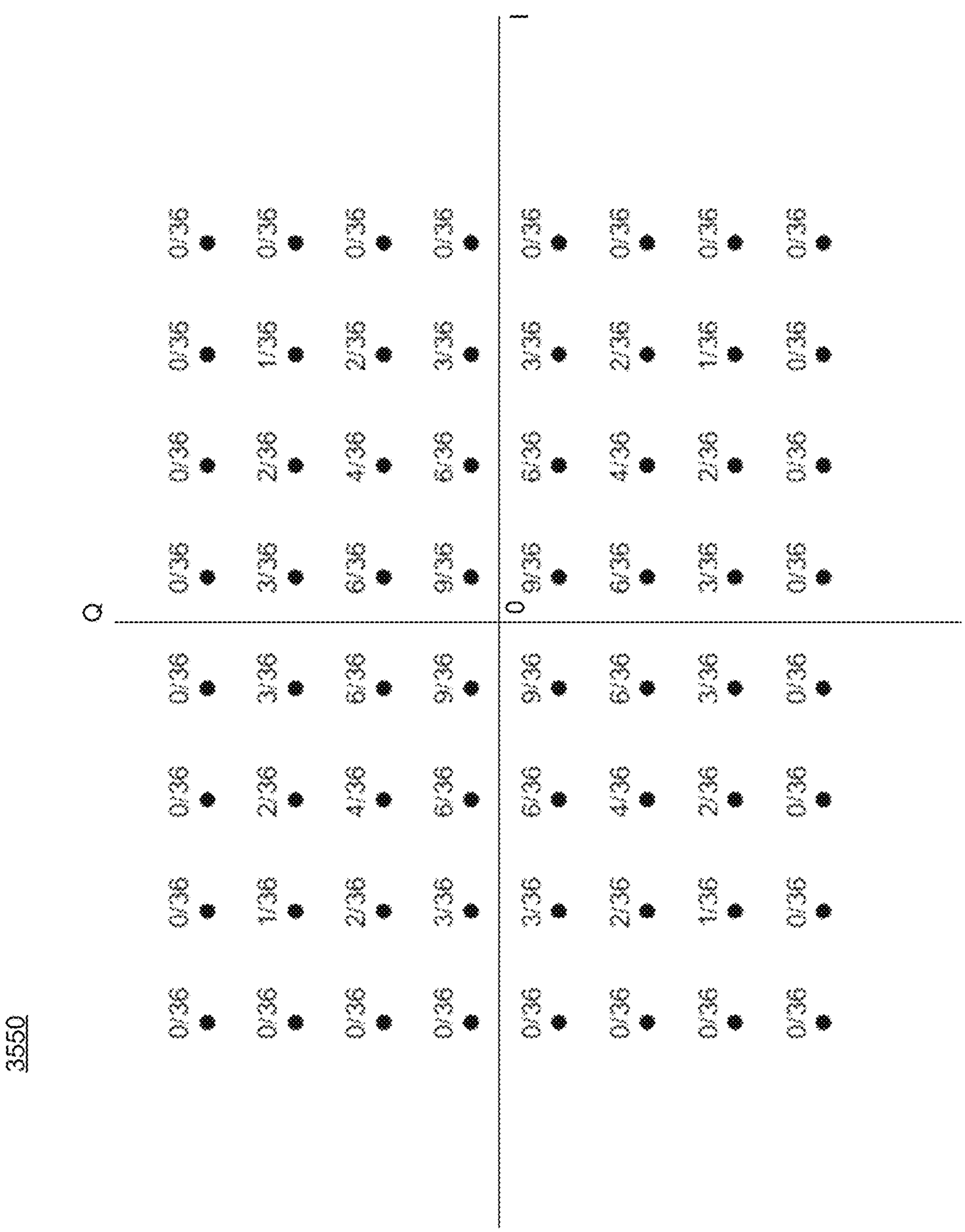
FIG. 35 illustrates a constellation of points and corresponding transmission probabilities for each point consistent with the present disclosure.
Figure 36:
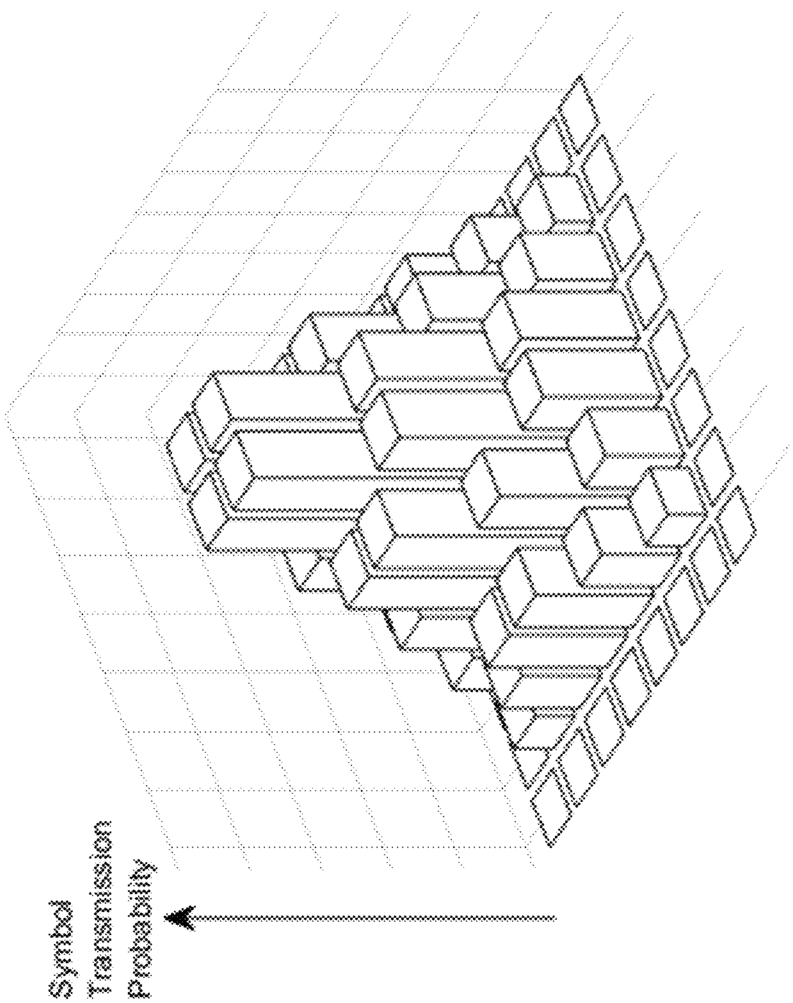
FIG. 36 shows a graphical representation of a probability distribution corresponding to the constellation point probabilities shown in FIG. 35.
Figure 37:
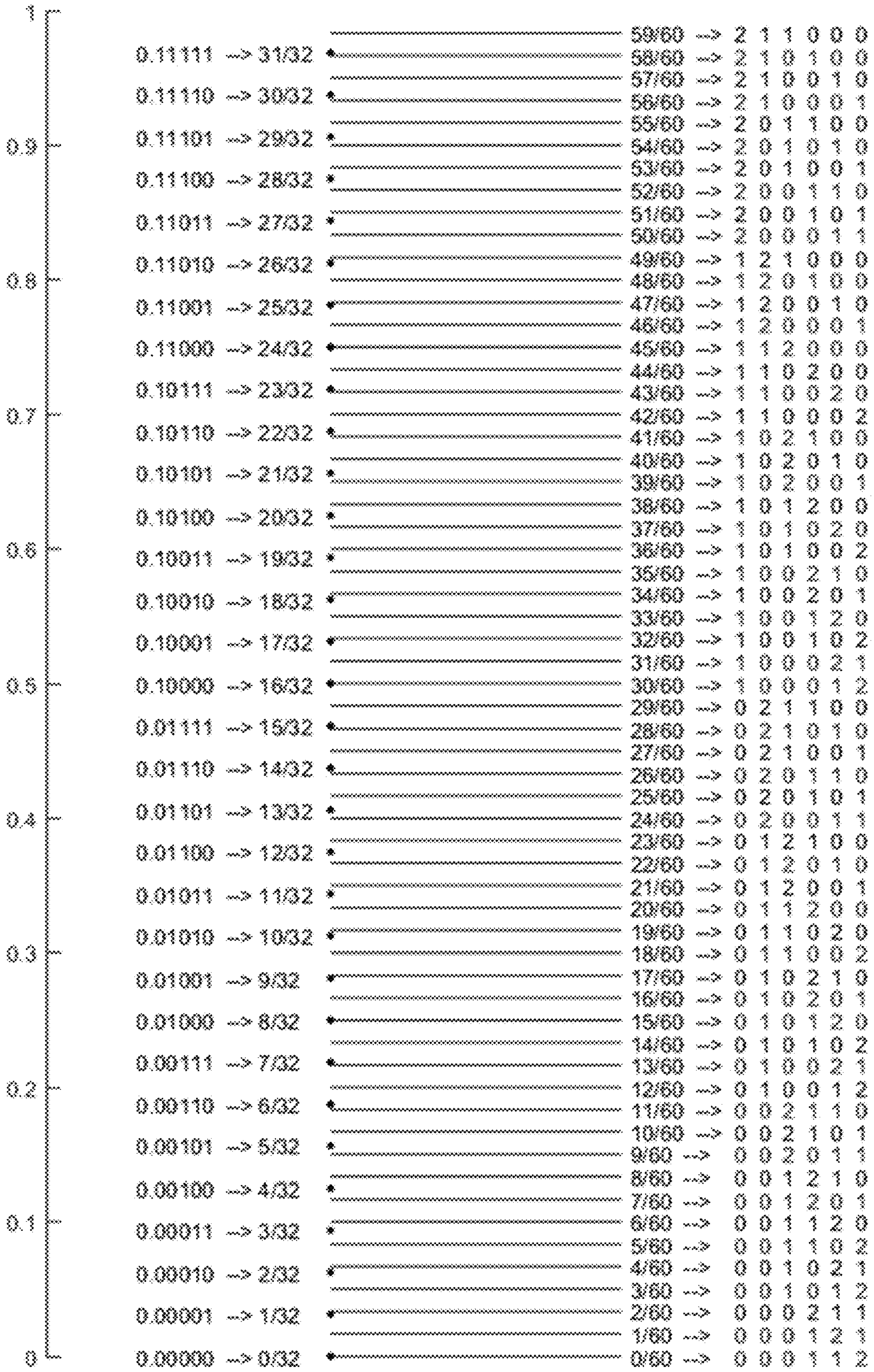
FIG. 37 shows a mapping in accordance with an example consistent with the present disclosure.

FIG. 35 further illustrates the probability distributions associated with each of the points in constellation 3550 (in an I Q plane having I and Q axes) based on the codeword symbols shown in FIG. 34 and the mapping shown in FIG. 37. FIG. 36 shows a graphical representation of a probability distribution corresponding to the constellation point probabilities shown in FIG. 35. In one example, the constellation points and probabilities shown in FIGS. 37-40 may be used to modulate subcarriers and channels noted above with the circuitry and methods noted above.

The desired probability distribution of alphabets is 3/6, 2/6, 1/6, and 0/6 translates to symbols 0, 1, 2, and 3, respectively, within a codeword of length n=6. Accordingly, for a given n, there is a total of 60 codewords with the desired distribution of the symbols. Among them, 32 of the codewords are chosen to create the one-to-one mapping between 5-bit input sequences and the codewords.

Figure 38:
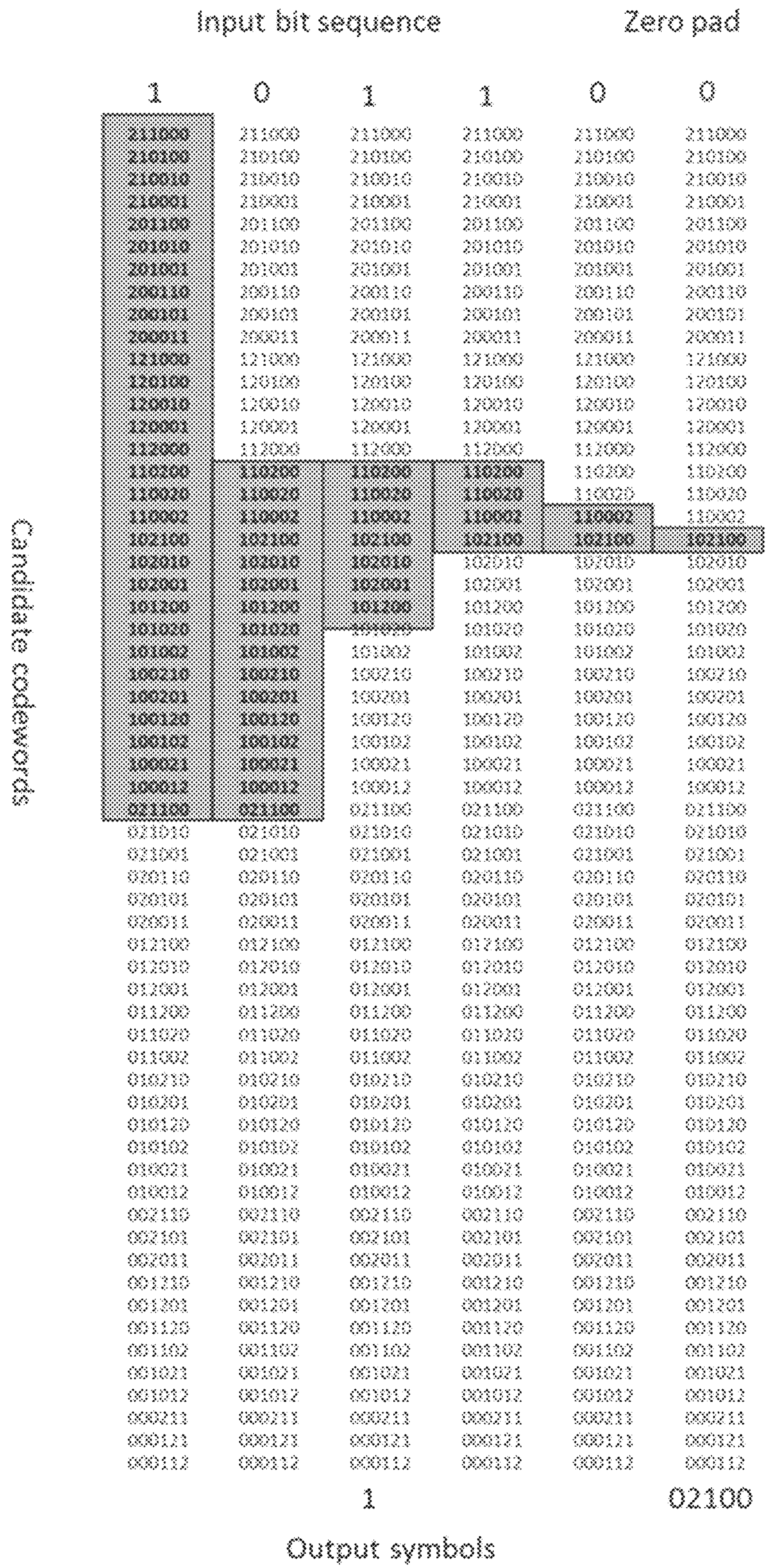
FIGS. 38 and 39 illustrate further examples of encoding and decoding consistent with the present disclosure.
Figure 39:
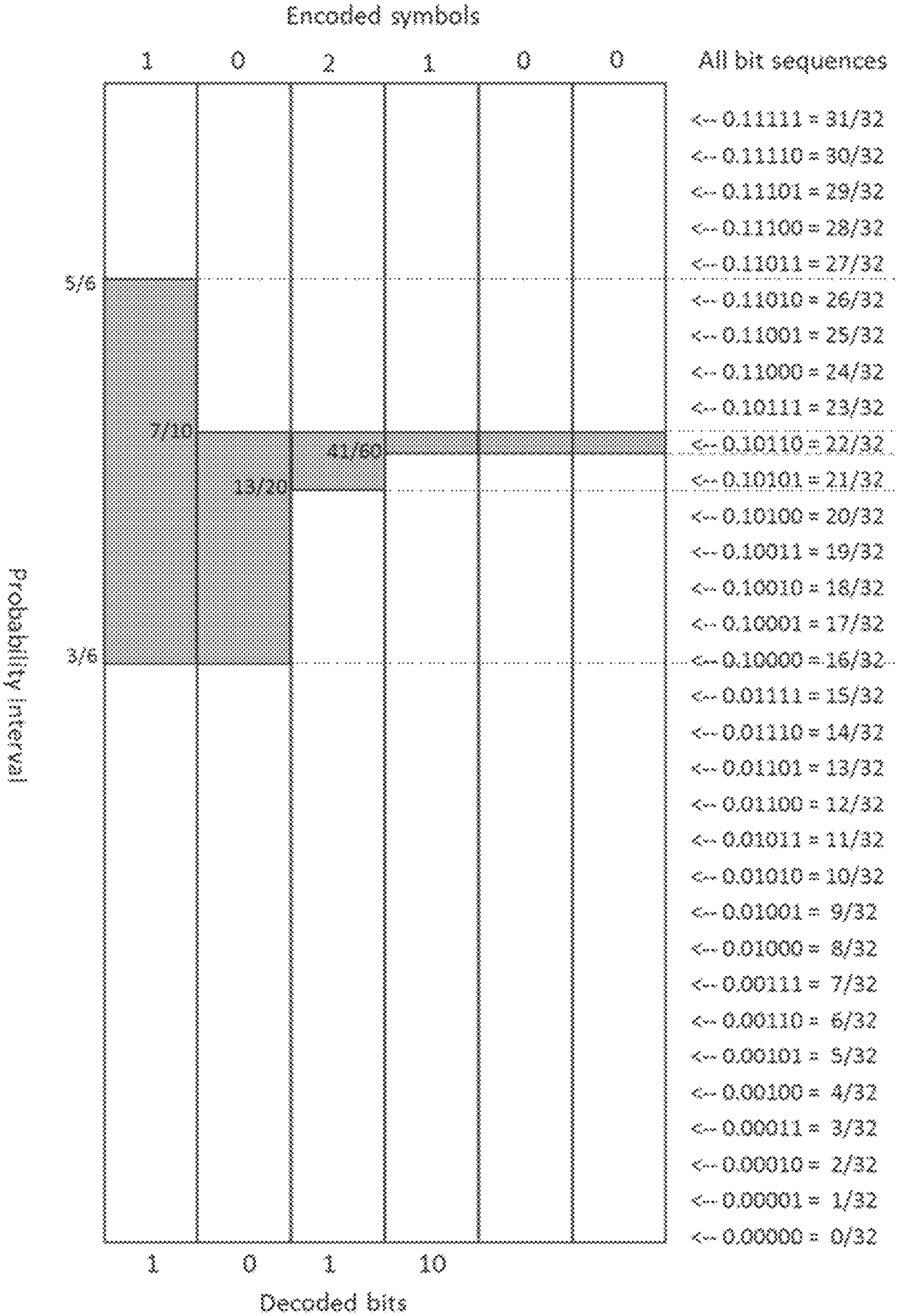

FIG. 38 illustrates conceptually an encoding procedure of the bit sequence "10110" to the codeword "102100", and FIG. 39 illustrates conceptually decoding procedure of the codeword "102100" to the bit sequence "10110".

Other embodiments will be apparent to those skilled in the art from consideration of the specification. For example, although probability distributions are disclosed above in which symbols associated with inner (lower amplitude) constellation points are transmitted with a higher probability than symbols associated with the outer constellation points, it is understood that codewords may be encoded and decoded in a manner similar to that described above to provide probability distributions in which symbols associated with the outer constellation points are transmitted more frequently and with higher probability than symbols associated with the inner constellation points. It is intended that the specification and examples be considered as exemplary only, with a true scope and spirit of the invention being indicated by the following claims.

What is claimed is:

1. An apparatus, comprising:

a local oscillator laser that supplies local oscillator light;

an optical hybrid circuit that receives an incoming optical signal and the local oscillator light, the incoming optical signal being modulated in accordance with an m-quadrature modulated optical signal, where m is greater than or equal to 16;

a photodetector circuit that receives an optical output from the optical hybrid circuit and generates electrical signals;

a decoder circuit that receives a codeword based on the electrical signals, the codeword includes n codeword symbols, where n is an integer, the codeword being indicative of a distribution of modulation symbols carried by the incoming optical signal such that first ones of the modulation symbols having an associated first amplitude are transmitted more frequently than second ones of the modulation symbols having an associated second amplitude that is different than the first amplitude; and a clock circuit that generates a clock signal, wherein the decoder circuit processes each of the modulation symbols during a corresponding one of a plurality of clock cycles of the clock signal, such that, during n clock cycles of the plurality of clock cycles of the clock signal, the decoder circuit outputs a data sequence based on the code word and fixed point representations of the codeword, where k is an integer.

2. An apparatus in accordance with claim 1, wherein third ones of the modulation symbols having an associated third amplitude are transmitted less frequently than the first and second ones of the modulation symbols.

3. An apparatus in accordance with claim 2, wherein fourth ones of the modulation symbols having an associated fourth amplitude are transmitted less frequently than the first, second, and third ones of the modulation symbols.

4. An apparatus, comprising:

a local oscillator laser that supplies local oscillator light;

an optical hybrid circuit that receives an incoming optical signal and the local oscillator light, the incoming optical signal being modulated in accordance with an m-quadrature modulated optical signal, where m is greater than or equal to 16;

a photodetector circuit that receives an optical output from the optical hybrid circuit and generates electrical signals;

a decoder circuit that receives a codeword based on the electrical signals, the codeword includes n codeword symbols, where n is an integer, the codeword being indicative of a distribution of modulation symbols carried by the incoming optical signal such that first ones of the modulation symbols having an associated first amplitude are transmitted more frequently than second ones of the modulation symbols having an associated second amplitude that is different than the first amplitude; and a clock circuit that generates a clock signal, wherein the decoder circuit outputs, during n clock cycles of the clock signal and based on fixed point representations of the codeword, a data sequence based on the codeword, the data sequence having k bits, where k is an integers; and an inverse labelling circuit converting each of a plurality of binary or non-binary symbols to a corresponding one of the n codeword symbols.

5. An apparatus in accordance with claim 4, further including a forward error correcting (FEC) decoding circuit that decodes in-phase and quadrature symbols, in accordance with a forward error correction code, to provide the plurality of binary or non-binary symbols.

6. An apparatus in accordance with claim 5, wherein the binary or non-binary symbols do not include parity bits.

7. An apparatus in accordance with claim 5, further including a multiplexer that multiplexes the in-phase and quadrature symbols and supplies the multiplexed in-phase and quadrature symbols to the FEC decoding circuit.

8. An apparatus comprising:

a local oscillator laser that supplies local oscillator light;

an optical hybrid circuit that receives an incoming optical signal and the local oscillator light, the incoming optical signal being modulated in accordance with an m-quadrature modulated optical signal, where m is greater than or equal to 16;

a photodetector circuit that receives an optical output from the optical hybrid circuit and generates electrical signals;

a decoder circuit that receives a codeword based on the electrical signals, the codeword includes n codeword symbols, where n is an integer, the codeword being indicative of a distribution of modulation symbols carried by the incoming optical signal such that first ones of the modulation symbols having an associated first amplitude are transmitted more frequently than second ones of the modulation symbols having an associated second amplitude that is different than the first amplitude; and a clock circuit that generates a clock signal, wherein the decoder circuit outputs, during n clock cycles of the clock signal and based on fixed point representations of the codeword, a data sequence based on the codeword, the data sequence having k bits, where k is an integers, and, wherein the decoder circuit calculates a parameter, x, based on one of the n codeword symbols, calculates a parameter, y, such that y is greater than n, and determines that x is within a sub-interval of y corresponding to said one of the n codeword symbols.

9. An apparatus in accordance with claim 8, wherein the encoder circuit determines y, such that y further satisfies:

$$2^w \leq y \leq 2^{w+1}$$

where w is a lowest integer, such that y is greater than n.

10. An apparatus in accordance with claim 8, wherein the decoder circuit multiplies parameter x by a scaling factor and multiplies y by the scaling factor.

11. An apparatus in accordance with claim 8, wherein said one of the n codeword symbols is a first one of the n codeword symbols, the encoder circuit redefining the sub-interval based on a number remaining codeword symbols after the first one of the n codeword symbols is output.

12. An apparatus in accordance with claim 11, wherein first ones of the remaining codeword symbols have a first value and second ones of the remaining codeword symbols have a second value.

13. An apparatus in accordance with claim 11, wherein each of the remaining codewords symbols has a respective one of a plurality of values, a number of the plurality of values being greater than two.

14. An apparatus in accordance with claim 8, further including a memory that stores selected ones of the k bits of the data sequence prior to outputting the data sequence.

15. An apparatus in accordance with claim 14, wherein the memory is a buffer.

16. An apparatus, comprising:

a local oscillator laser that supplies local oscillator light;

an optical hybrid circuit that receives an incoming optical signal and the local oscillator light, the incoming optical signal being modulated in accordance with an m-quadrature modulated optical signal, where m is greater than or equal to 16;

a photodetector circuit that receives an optical output from the optical hybrid circuit and generates electrical signals;

a decoder circuit that receives a codeword based on the electrical signals, the codeword includes n codeword symbols, where n is an integer, the codeword being indicative of a distribution of modulation symbols carried by the incoming optical signal such that first ones of the modulation symbols having an associated first amplitude are transmitted more frequently than second ones of the modulation symbols having an associated second amplitude that is different than the first amplitude; and a clock circuit that generates a clock signal, wherein the decoder circuit outputs, during n clock cycles of the clock signal and based on fixed point representations of the codeword, a data sequence based on the codeword, the data sequence having k bits, where k is an integers, wherein the first amplitude is less than the second amplitude.

17. An apparatus, comprising:

a decoder circuit including:

an input that receives a codeword, the codeword includes n codeword symbols, where n is an integer, the codeword being indicative of a distribution of modulation symbols carried by an optical signal modulated in accordance with an m-quadrature modulated optical signal (QAM) where m is greater than or equal to 16, first ones of the modulation symbols having an associated first amplitude are transmitted more frequently than second ones of the modulation symbols having an associated second amplitude that is different than the first amplitude; and a clock circuit that generates a clock signal, wherein the decoder circuit processes each of the modulation symbols during a corresponding one of a plurality of clock cycles of the clock signal, such that, during n clock cycles of the plurality of clock cycles of the clock signal, the decoder circuit outputs a data sequence having k bits based on the codeword and fixed point representations of the codeword, where k is an integer.

18. An apparatus in accordance with claim 17, further including:

a local oscillator laser that supplies local oscillator light;

an optical hybrid circuit that receives the optical signal and the local oscillator light;

a photodetector circuit that receives an optical output from the optical hybrid circuit and generates electrical signals, the decoder circuit that receives the codeword based on the electrical signals.

19. An apparatus in accordance with claim 17, wherein third ones of the modulation symbols having an associated third amplitude are transmitted less frequently than the first and second ones of the modulation symbols.

20. An apparatus in accordance with claim 19, wherein fourth ones of the modulation symbols having an associated fourth amplitude are transmitted less frequently than the first, second, and third ones of the modulation symbols.

21. An apparatus in accordance with claim 17, further including a memory that stores selected ones of the k bits of the data sequence in a buffer prior to outputting the data sequence.

22. An apparatus in accordance with claim 21, wherein the memory is a buffer.

23. An apparatus, comprising:

a decoder circuit including:

an input that receives a codeword, the codeword includes n codeword symbols, where n is an integer, the codeword being indicative of a distribution of modulation symbols carried by an optical signal modulated in accordance with an m-quadrature modulated optical signal (QAM) where m is greater than or equal to 16, first ones of the modulation symbols having an associated first amplitude are transmitted more frequently than second ones of the modulation symbols having an associated second amplitude that is different than the first amplitude; and a clock circuit that generates a clock signal, wherein, based on fixed point representations of the codeword, the decoder circuit outputs, during n clock cycles of the clock signal, a data sequence based on the codeword, the data sequence having k bits, where k is an integer; and an inverse labelling circuit converting each of a plurality of binary or non-binary symbols to a corresponding one of the n codeword symbols.

24. An apparatus in accordance with claim 23, further including a forward error correcting (FEC) decoding circuit that decodes in-phase and quadrature symbols, in accordance with a forward error correction code, to provide the plurality of binary or non-binary symbols.

25. An apparatus in accordance with claim 24, wherein the binary or non-binary symbols do not include parity bits.

26. An apparatus in accordance with claim 24, further including a multiplexer that multiplexes the in-phase and quadrature symbols and supplies the multiplexed in-phase and quadrature symbols to the FEC decoding circuit.

27. An apparatus, comprising:

a decoder circuit including:

an input that receives a codeword, the codeword includes n codeword symbols, where n is an integer, the codeword being indicative of a distribution of modulation symbols carried by an optical signal modulated in accordance with an m-quadrature modulated optical signal (QAM) where m is greater than or equal to 16, first ones of the modulation symbols having an associated first amplitude are transmitted more frequently than second ones of the modulation symbols having an associated second amplitude that is different than the first amplitude; and a clock circuit that generates a clock signal, wherein, based on fixed point representations of the codeword, the decoder circuit outputs, during n clock cycles of the clock signal, a data sequence based on the codeword, the data sequence having k bits, where k is an integer, wherein the decoder circuit calculates a parameter, x, based on one of the n codeword symbols, calculates a parameter, y, such that y is greater than n, and determines that x is within a sub-interval of y corresponding to said one of the n codeword symbols.

28. An apparatus in accordance with claim 27, wherein the encoder circuit determines y, such that y further satisfies:

$$2^w \le y \le 2^{w+1}$$

where w is a lowest integer, such that y is greater than n.

29. An apparatus in accordance with claim 27, wherein the decoder circuit multiplies parameter x by a scaling factor and multiplies y by the scaling factor.

30. An apparatus in accordance with claim 27, wherein said one of the n codeword symbols is a first one of the n codeword symbols, the encoder circuit redefining the sub-interval based on a number remaining codeword symbols after the first one of the n codeword symbols is output.

31. An apparatus in accordance with claim 30, wherein first ones of the remaining codeword symbols have a first value and second ones of the remaining codeword symbols have a second value.

32. An apparatus in accordance with claim 30, wherein each of the remaining codewords symbols has a respective one of a plurality of values, a number of the plurality of values being greater than two.

33. An apparatus, comprising:

a decoder circuit including:

an input that receives a codeword, the codeword includes n codeword symbols, where n is an integer, the codeword being indicative of a distribution of modulation symbols carried by an optical signal modulated in accordance with an m-quadrature modulated optical signal (QAM) where m is greater than or equal to 16, first ones of the modulation symbols having an associated first amplitude are transmitted more frequently than second ones of the modulation symbols having an associated second amplitude that is different than the first amplitude; and a clock circuit that generates a clock signal, wherein, based on fixed point representations of the codeword, the decoder circuit outputs, during n clock cycles of the clock signal, a data sequence based on the codeword, the data sequence having k bits, where k is an integer, wherein the first amplitude is less than the second amplitude.

* * * * *